(12) United States Patent
Yasumura

(10) Patent No.: US 7,167,384 B2
(45) Date of Patent: Jan. 23, 2007

(54) SWITCHING POWER CIRCUIT

(75) Inventor: Masayuki Yasumura, Kanagawa (JP)

(73) Assignee: Sony Corporation (JP)

( * ) Notice: Subject to any disclaimer, the term of this patent is extended or adjusted under 35 U.S.C. 154(b) by 70 days.

(21) Appl. No.: 10/527,129

(22) PCT Filed: Aug. 13, 2004

(86) PCT No.: PCT/JP2004/011950

§ 371 (c)(1),
(2), (4) Date: Mar. 8, 2005

(87) PCT Pub. No.: WO2005/020416

PCT Pub. Date: Mar. 3, 2005

(65) Prior Publication Data

US 2006/0037461 A1   Feb. 23, 2006

(30) Foreign Application Priority Data

Aug. 21, 2003 (JP) ............................ 2003-297625
Aug. 21, 2003 (JP) ............................ 2003-297626
Sep. 19, 2003 (JP) ............................ 2003-328685

(51) Int. Cl.
*H02M 7/217* (2006.01)
*H02M 3/335* (2006.01)

(52) U.S. Cl. ............... 363/127; 363/21.02; 363/21.06; 363/21.14; 363/89

(58) Field of Classification Search .................. 363/17, 363/21.02, 21.06, 21.14, 88, 89, 98, 125, 363/126, 127, 132

See application file for complete search history.

(56) References Cited

U.S. PATENT DOCUMENTS

| | | | |
|---|---|---|---|
| 6,256,214 B1* | 7/2001 | Farrington et al. | 363/127 |
| 6,459,600 B1* | 10/2002 | Farrington et al. | 363/127 |
| 6,490,183 B1* | 12/2002 | Zhang | 363/127 |
| 6,804,125 B1* | 10/2004 | Brkovic | 363/127 |

FOREIGN PATENT DOCUMENTS

| | | |
|---|---|---|
| JP | 11-332233 | 11/1999 |
| JP | 2001-119940 | 4/2001 |
| JP | 2003-230274 | 8/2003 |

* cited by examiner

*Primary Examiner*—Jessica Han
(74) *Attorney, Agent, or Firm*—Lerner, David, Littenberg, Krumholz & Mentlik, LLP

(57) ABSTRACT

A switching power circuit in which a synchronous rectification circuit of the winding voltage detection system by use of a resistance device is provided on the secondary side of a compound resonance type converter, whereby a high power conversion efficiency can be obtained, and a reduction in the circuit scale through circuit simplification can be had. The gap length of an insulated converter transformer is enlarged to set the coupling coefficient at about 0.8, and the numbers of turns of the primary winding and the secondary windings are so set that the induced voltage level in the secondary winding is not more than 2 V/T. This causes the secondary-side rectified current to be in a continuous mode even under a heavy load condition by setting the magnetic flux density of the core in the insulated converted transformer to be not more than a predetermined value. Further, with inductors inserted into each rectified current circuit on the secondary side, the back electromotive forces in the inductors suppress a backward current generated in the rectified current, whereby a further reduction in the reactive power can be obtained.

11 Claims, 25 Drawing Sheets

SWITCHING POWER CIRCUIT

TECHNICAL FIELD

The present invention relates to a switching power circuit provided as a power source in various electronic apparatuses.

BACKGROUND ART

As switching power circuits, those adopting a switching converter of, for example, a fly-back converter type, a forward converter type or the like are widely known. In these switching converters, the switching operation waveform is a rectangular waveform and, therefore, there is a limitation in suppressing the switching noises. In addition, due to their operation characteristics, it is known that there is also a limitation in enhancing the power conversion efficiency.

In view of the foregoing, a variety of switching power circuits based on a resonance type converter have been proposed and put to practical use. The resonance type converter makes it possible to easily obtain a high power conversion efficiency, and to realize a low-noise property because the switching operation waveform is a sinusoidal waveform. Besides, the resonance type converter has the merit that it can be composed of a comparatively small number of component parts.

The circuit diagram shown in FIG. 27 shows one example of a switching power circuit including a resonance type converter, as an example of the prior art. In the power circuit shown in this figure, a separately excited current resonance type converter is combined with a partial voltage resonance circuit.

In the power circuit shown in the figure, first, for a commercial AC power source AC, a full-wave rectifying and smoothing circuit composed of a bridge rectification circuit Di and one smoothing capacitor Ci is provided. The full-wave rectifying operation of the bridge rectification circuit Di and the smoothing capacitor Ci produces a rectified and smoothed voltage Ei (DC input voltage) between both ends of the smoothing capacitor Ci. The rectified and smoothed voltage Ei is at a level corresponding to the equal fold of the AC input voltage VAC.

A current resonance type converter for performing switching by being supplied with the DC input voltage is composed by connecting two switching devices Q1, Q2, which are composed of MOS-FETs, in half-bridge coupling, as shown in the figure. Damper diodes DD1, DD2 composed of body diodes are connected in parallel between the respective drain and source of the switching devices Q1, Q2, according to the direction shown in the figure.

In addition, a partial resonance capacitor Cp is connected in parallel to the portion between the drain and source of the switching device Q2. The capacitance of the partial resonance capacitor Cp and the leakage inductance L1 of the primary winding N1 form a parallel resonance circuit (partial voltage resonance circuit). As a result, there is obtained a partial voltage resonance operation showing a voltage resonance only when the switching devices Q1, Q2 are turned OFF.

In this power circuit, an oscillating drive circuit 2 composed of a general-purpose IC, for example, is provided for driving the switching of the switching devices Q1, Q2. The oscillating drive circuit 2 has an oscillating circuit and a drive circuit. The oscillating circuit and the drive circuit operate to impress a drive signal (gate voltage) at a required frequency on each of the gates of the switching devices Q1, Q2. This ensures that the switching devices Q1, Q2 perform switching operations so that they are alternately turned ON/OFF at a required switching frequency.

An insulated converter transformer PIT transmits the switching outputs of the switching devices Q1, Q2 to the secondary side. One end of the primary winding N1 of the insulated converter transformer PIT is connected to the connection point (switching output point) between the source of the switching device Q1 and the drain of the switching device Q2 through series connection of a primary-side parallel resonance capacitor C1, whereby the switching outputs are transferred.

Besides, the other end of the primary winding N1 is connected to a primary-side earth.

Here, the capacitance of the series-connected resonance capacitor C1 and the leakage inductance L1 of the insulated converter transformer PIT including the primary winding N1 form a primary-side series resonance circuit for causing the operation of a primary-side switching converter to be of a current resonance type.

According to the foregoing, with the primary-side switching converter shown in this figure, there are obtained an operation of the current resonance type by the primary-side series resonance circuit (L1-C1) and a partial voltage resonance operation by the above-mentioned partial voltage resonance circuit (Cp//L1).

In other words, the power circuit shown in the figure adopts a type in which a resonance circuit for causing the primary-side switching converter to be of the resonance type is combined with another resonance circuit. Such a switching converter as this will hereinafter be referred to as a compound resonance type converter.

Though illustration is omitted here, as a structure of the insulated converter transformer PIT, for example, an EE type core formed by combining E type cores formed of ferrite material is provided. Then, the primary winding N1 and a secondary winding (N2A, N2B) which will be described next are wound around a center magnetic leg of the EE type core while the winding portions are divided on the primary side and on the secondary side.

As the secondary winding of the insulated converter transformer PIT, the secondary windings N2A, N2B bisected by center tapping are wound. In the secondary windings N2A, N2B, alternating voltages according to the switching outputs transferred to the primary winding N1 are excited.

In this case, the center tap between the secondary windings N2A, N2B is connected to a secondary-side earth. A full-wave rectification circuit composed of rectifying diodes D01, D02 and a smoothing capacitor $C_O$ is connected to the secondary windings N2A, N2B, as shown in the figure. This ensures that a secondary-side DC output voltage $E_O$ is obtained as the end-to-end voltage of the smoothing capacitor $C_O$. The secondary-side DC output voltage $E_O$ is supplied to the side of a load (not shown), and is shuntedly inputted as a detection voltage for a control circuit 1 which will be described next.

The control circuit 1 supplies the oscillating drive circuit 2 with a detection output according to a variation in the level of the secondary-side DC output voltage $E_O$. The oscillating drive circuit 2 drives the switching devices Q1, Q2 in such a manner that the switching frequency is varied according to the detection output of the control circuit 1 inputted thereto. With the switching frequency of the switching devices Q1, Q2 thus varied, the level of the secondary-side DC output voltage is stabilized.

Operation waveforms in the case where the power circuit configured as shown in this figure is operated under a low-voltage large-current load condition are shown in FIG. 28. The operation waveforms shown in FIG. 28 were obtained by measurements under the conditions of an AC input voltage VAC=100 V and a load power $P_O$=100 W. Here, the low-voltage large-current condition is a condition where the secondary-side DC voltage is $E_O$=5 V and the primary-side series resonance current, which is the switching current of the primary-side switching converter, is $I_O$=25 A.

In addition, the experimental results concerning the operation waveforms shown in FIG. 28 were obtained under the following conditions and the following settings of the component parts of the power circuit and the like.

First, the numbers of turns of the secondary windings N2A, N2B and the primary winding N1 are so set that the induced voltage level per T (turn) of the secondary-side winding is 5 V/T; specifically, the secondary windings N2A=N2B=1 T, and the primary winding N1=30 T.

Besides, a gap of about 1.0 mm is formed at the center magnetic leg of the EE type core of the insulated converter transformer PIT. This leads to a coupling coefficient of about 0.85 between the primary winding N1 and the secondary windings N2A, N2B.

In addition, the primary-side series resonance capacitor C1=0.068 μF and the partial voltage resonance capacitor Cp=330 pF are selected, and 50 A/40 V Shottky diodes are selected as the rectifying diodes $D_O1$, $D_O2$.

In the waveform diagrams shown in FIG. 28, the end-to-end voltage V1 of the switching device Q2 corresponds to the ON/OFF condition of the switching device Q2. Specifically, the end-to-end voltage V1 assumes the form of a rectangular wave being at zero level over the period T2 in which the switching device Q2 is ON and being clamped at a predetermined level over the period T1 in which the switching device Q2 is OFF. As for the switching current IDS2 flowing through the switching device Q2//damper diode DD2, it is in negative polarity by flowing through the damper diode DD2 at the time of turning ON, is then inverted to positive polarity and flows along the drain→source of the switching device Q2, as shown in the period T2; in the period T1, it is at zero level due to turning-OFF.

In addition, the switching device Q1 performs switching so as to be turned ON/OFF alternately relative to the switching device Q2. Therefore, the switching current IDS1 flowing through the switching device Q1//damper diode DD1 assumes a waveform with a phase shift of 180° relative to the switching current IDS2.

The primary-side series resonance current $I_O$ flowing through the primary-side series resonance circuit (C1-L1) connected to a point between the switching output point of the switching devices Q1, Q2 and the primary-side earth assumes a waveform obtained by composing a sinusoidal wave component as the resonance current of the primary-side series resonance circuit (C1-L1), which corresponds to the composite waveform of the switching current IDS1 and the switching current IDS2, with a sawtooth wave component generated by the excitation inductance of the primary winding N1.

In this case, the measurement condition, i.e., the load power $P_O$=100 W, is a heavy load condition approximate to the maximum of the load condition for the power circuit shown in FIG. 27; under the condition tending to take such a heavy load within the relevant load power range, the rectified current on the secondary side is in a discontinuous mode.

Thus, as shown in FIG. 28, the secondary winding voltage V2 generated in the secondary winding N2A has a waveform being clamped at a predetermined absolute value level only over the period in which the primary-side series resonance current $I_O$ flows in the sinusoidal waveform and being at zero level over the period in which the sawtooth wave component due to the excitation inductance flows as the primary-side series resonance current $I_O$. In the secondary winding N2B, a waveform obtained by inverting the secondary winding voltage V2 is generated.

Therefore, the rectified current I1 flowing through the rectifying diode $D_O1$ and the rectified current I2 flowing through the rectifying diode $D_O2$ flow respectively in the periods DON1, DON2 in which the primary-side series resonance current $I_O$ flows in the sinusoidal waveform, and neither of them flows during the other periods. Namely, the rectified currents on the secondary side flow discontinuously into the smoothing capacitor.

The forward voltage drop of the rectifying diodes $D_O1$, $D_O2$ composed of Shottky diodes is 0.6 V, and, in the secondary-side operation as above-mentioned, the rectified currents I1, I2 are on a fairly high level of 35 Ap, as shown also in the figure; therefore, the conduction loss due to these rectifying diode devices is conspicuous, resulting in a large power loss. As an actual measurement result, the DC→DC power conversion efficiency at the time of the DC input voltage (rectified and smoothed voltage Ei)=100 V remains at about 82%.

In view of this, as a technology for reducing the conduction loss of the rectified current on the secondary side, there is known a synchronous rectification circuit in which rectification is performed by a low-ON-resistance MOS-FET. As such a synchronous rectification circuit, an example of the configuration based on a winding voltage detection system is shown in FIG. 29.

Incidentally, in FIG. 29, only the configuration on the secondary side of the insulated converter transformer PIT is shown. The configuration on the primary side is assumed to be the same as in FIG. 27. In addition, as a constant voltage control system, there is adopted a switching frequency control system in which the switching frequency of the primary-side switching converter is variably controlled according to the level of the secondary-side DC output voltage $E_O$.

Besides, as the power circuit adopting the secondary-side configuration shown in FIG. 29, one which corresponds to the same low-voltage large-current condition (VAC=100 V, load power $P_O$=100 W, $E_O$=5 V, $I_O$=25 A) as in the case of FIG. 27 is adopted.

In this case also, one-side ends of the secondary windings N2A, N2B having an equal number of turns are connected by the center tap, and the center tap output is connected to the positive terminal of the smoothing capacitor $C_O$. The other end of the secondary winding N2A is connected to the secondary-side earth (the negative terminal side of the smoothing capacitor $C_O$) through the drain→source of an N-channel MOS-FET Q3. Similarly, the other end of the secondary winding N2B is also connected to the secondary-side earth (the negative terminal side of the smoothing capacitor $C_O$) through the drain→source of an N-channel MOS-FET Q4. In this case, in each of the rectification current paths of the secondary windings N2A, N2B, the MOS-FET Q3, Q4 is inserted in series with the negative electrode side. Incidentally, body diodes DD3, DD4 are connected between the respective drain and source of the MOS-FETs Q3, Q4.

A drive circuit for driving the MOS-FET Q3 is formed by connecting a gate resistance Rg1 between the connection point between the secondary winding N2B and the drain of the MOS-FET Q4 and the gate of the MOS-FET Q3, and connecting a resistance R11 between the gate of the MOS-FET Q3 and the secondary-side earth.

Similarly, a drive circuit for driving the MOS-FET Q4 is formed by connecting a gate resistance Rg2 between the connection point between the secondary winding N2A and the drain of the MOS-FET Q3 and the gate of the MOS-FET Q4, and connecting a resistance R12 between the gate of the MOS-FET Q4 and the secondary-side earth.

When an ON voltage is impressed on the gate of a MOS-FET, the drain-source portion becomes equivalent to a mere resistor, so that currents can flow in both directions. In order to make this function as a rectifying device on the secondary side, a current must be made to flow only in the direction for charging the positive terminal of the smoothing capacitor $C_0$. If a current flows in the direction reverse to this, a discharge current flows from the smoothing capacitor $C_0$ to the side of the insulated converter transformer PIT, so that power cannot be effectively transferred to the load side. In addition, the reverse current causes heat generation in the MOS-FET, noises and the like, leading to a switching loss on the primary side.

The above-mentioned drive circuits are for driving the switching of the MOS-FET Q3, Q4 in such a manner that a current flows only in the direction for charging the positive terminal of the smoothing capacitor $C_0$, based on the detection of the voltages of the secondary windings.

The waveform diagrams in FIG. 30 correspond to the operation of a power circuit, adopting the secondary-side configuration shown in FIG. 29 (the primary side is the same as in FIG. 27), under the condition of a load power $P_0$=100 W. As has been mentioned above, the load power $P_0$=100 W in this case is a substantially maximum load condition.

In this figure, the end-to-end voltage V1 of the switching device Q2 and the secondary winding voltage V2 obtained between both ends of the secondary winding N2A-N2B corresponding thereto are at the same timings as in FIG. 28. Incidentally, the secondary winding voltage V2 sown in FIG. 30 is in the polarity as viewed from the side of the connection point between the secondary winding N2A and the gate resistor Rg2, and the polarity is inverted when viewed from the side of the connection point between the secondary winding N2B and the gate resistor Rg1.

When a period in which the secondary winding voltage V2 in the polarity shown in this figure is clamped at a predetermined level in negative polarity is reached, the drive circuit for the MOS-FET Q4 operates so as to impress on the gate of the MOS-FET Q4 an ON voltage at a level set by the gate resistor Rg2 and the resistor R12.

Similarly, when a period in which the secondary winding voltage (V2) in the inverted polarity relative to the polarity shown in the figure is clamped at a predetermined level in negative polarity is reached, the drive circuit (the gate resistor Rg1 and the resistor R11) for the MOS-FET Q3 operates so as to impress an ON voltage on the gate of the MOS-FET Q3.

As a result, rectified currents I1, I2 in positive polarity flow through the MOS-FETs Q3, Q4 in periods DON1, DON2, respectively as shown in the figure. The rectified currents I1, I2 flowing in the periods in which the secondary winding voltage V2 is clamped at a positive/negative level as shown are 35 Ap, in the same manner as in the case of the circuit in FIG. 27 (the rectified currents I1, I2 in the waveform diagrams in FIG. 28). However, the MOS-FETs Q3, Q4 are of low ON resistance, so that the conduction loss of the rectified currents can be made conspicuously lower, as compared with the rectifying diodes $D_01$, $D_02$ composed of Shottky diodes. In addition, as understood from the fact that the drive circuits are composed only of resistance devices, the winding voltage detection system has also the merit that the drive circuit system is simple in configuration.

However, under the condition of a heavy load (load power $P_0$=100 W) as in the case corresponding to FIG. 30, this power circuit also has the problem that the secondary-side rectified currents are in a discontinuous mode. This is shown by the fact that, in FIG. 30 also, the periods DON1, DON2 are discontinuous.

In this discontinuous mode, even when the rectified currents I1, I2 are such that the charging current for the smoothing capacitor $C_0$ is at zero level, a current is flowing in the same direction through the primary winding N1 of the insulated converter transformer PIT. This indicates that, in the waveform diagrams shown in FIG. 28 above, in the other periods than the periods DON1, DON2, the excitation inductance component in the primary winding N1 is flowing as the primary-side series resonance current $I_0$ in the same polarity as that at the immediately previous timing. Therefore, in practice, the polarities of the voltages induced in the secondary windings N2A, N2B are not inverted, so that during those periods, the MOS-FETs Q3, Q4 are not perfectly turned OFF but remain in the ON state. This results in that currents in the reverse direction would flow as the rectified currents I1, I2 in the other periods than the periods DON1, DON2, as shown in the figure. The rectified currents I1, I2 in the reverse direction in the other periods than the periods DON1, DON2 generate a reactive power, and, since the level of the rectified currents I1, I2 in this instance is as comparatively high as 8 Ap, the reactive power amount is fairly large.

Thus, in the case of adopting the winding voltage detection system for the synchronous rectification circuit, the conduction loss in the rectified current is reduced, but at present it is difficult to contrive an effective enhancement of the power conversion efficiency as a whole, since the reactive power is generated as described above.

The waveform diagrams shown in FIG. 31 show the operation of a power circuit, adopting the secondary-side configuration shown in FIG. 29, under a light load condition.

In practice of the power circuit shown in FIG. 29, also, a constant voltage control based on a switching frequency control is performed, as described above as the configuration of the power circuit shown in FIG. 27. In this case, when a light load condition is obtained and the secondary-side DC output voltage increases, the switching frequency is enhanced so as to lower the secondary-side DC output voltage, thereby contriving stabilization.

In such a light load condition, the secondary-side winding voltage V2 is inverted at substantially the same timing relative to the end-to-end voltage V1 of the switching device Q2 shown in FIG. 31, and, according to this, the rectified currents I1, I2 on the secondary side flow in such a manner as to continuously charge the smoothing capacitor $C_0$, without any rest period between the periods DON1, DON2. Namely, a continuous mode is attained. In this instance, there is no period in which the rectified currents I1, I2 in the reverse direction as shown referring to the operation under a heavy load in FIG. 30 above flow, and there is no reactive power generated according to such reverse-direction currents.

Thus, the power circuit configured by replacing the secondary-side rectification circuit system by the synchronous rectification circuit based on the winding voltage detection system also has the problem that the power conversion efficiency is lowered at the time of a heavy load.

In view of this, as a technology for solving the problem of the generation of reactive power due to the reverse-direction rectified currents, as shown in FIG. 30 above, a synchronous rectification circuit based on a rectified current detection system has been known. The rectified current detection system lies in the technology of turning OFF the MOS-FETs before the rectified currents for charging the smoothing capacitor $C_O$ are reduced to zero level. An example of the technology is disclosed in Japanese Patent Laid-open No. 2003-111401.

A configuration example of the synchronous rectification circuit based on the rectified current detection system is shown in FIG. 32. Incidentally, in this figure, a configuration based on half-wave rectification is shown, for simplification of description.

In the rectified current detection system, a current transformer TR is provided for detecting a current flowing through a secondary winding N2. The primary winding Na of the current transformer is connected to an end portion of the secondary winding N2 and to the drain of a MOS-FET Q4. The source of the MOS-FET Q4 is connected to the negative terminal of a smoothing capacitor $C_O$.

To a secondary winding Nb of the current transformer, a resistor Ra is connected in parallel, and diodes Da, Db are connected in parallel so that their forward voltage directions are alternately reversed, to thereby form a parallel connected circuit. In addition, a comparator 20 is connected to the parallel connected circuit. A reference voltage Vref is inputted to an inversion input terminal of the comparator 20. Incidentally, an end portion, on the side where the anode of the diode Da and the cathode of the diode Db are connected, of the parallel connected circuit is connected to the connection point between the reference voltage Vref and the inversion input terminal of the comparator 20. Besides, an end portion, on the side where the cathode of the diode Da and the anode of the diode Db are connected, of the parallel connected circuit is connected to the non-inversion input terminal of the comparator 20.

In this case, the output of the comparator 20 is impressed on the gate of the MOS-FET Q4 after being amplified by a buffer 21.

Operation waveforms of the circuit configured as shown in FIG. 32 are shown in FIG. 33.

When the voltage induced in the secondary winding N2 exceeds the end-to-end voltage ($E_O$) of the smoothing capacitor $C_O$, first, due to the anode→cathode direction of the body diode in the MOS-FET Q4, a rectified current Id starts to flow so as to charge the smoothing capacitor $C_O$. Since the rectified current Id flows through the primary winding Na of the current transformer, a voltage Vnb according to the rectified current Id flowing through the primary winding Na is inducted in the secondary winding Nb of the current transformer. In the comparator 20, the reference voltage Vref and the voltage Vnb are compared with each other, and an H level is outputted when the voltage Vnb exceeds the reference voltage Vref. The H level output is impressed through the buffer 21 onto the gate of the MOS-FET Q4 as an ON voltage, thereby turning ON the MOS-FET Q4. As a result, the rectified current Id flows in the direction of the drain→source of the MOS-FET Q4. In FIG. 33, the rectified current Id is shown as flowing in positive polarity.

Then, the level of the rectified current Id is lowered as time passes, and, when the voltage Vnb is accordingly lowered below the reference voltage Vref, the comparator 20 inverts its output. With the inverted output fed out through the buffer 21, the gate capacitance of the MOS-FET Q4 is discharged, whereby the MOS-FET Q4 is turned OFF. At this time point, the residual rectified current Id flows through the body diode DD4 in a short time.

With such operations, the MOS-FET Q4 is turned OFF at a timing before the rectified current Id is reduced to zero level. This ensures that the flow of the reverse-direction current through the MOS-FET, and the attendant reactive power, in the periods in which the rectified currents are discontinuous as shown in FIG. 30 can be obviated, and the power conversion efficiency is enhanced accordingly.

For example, in the case where the secondary-side configuration of the power circuit shown in FIG. 27 was replaced by the synchronous rectification circuit based on the full-wave rectification type rectified current detection system configured as in FIG. 32, the measurement of the DC→DC power conversion efficiency under the same conditions as in FIGS. 28 and 30 and the like gave an enhanced value of about 90%.

However, in the synchronous rectification circuit based on the rectified current detection system, at least one set of current transformer and a comparatively complicated drive circuit system for driving the MOS-FET according to the output of the current transformer are required, for one MOS-FET, as is seen from FIG. 32. This complicates the circuit configuration and leads to a lowering in production efficiency, a rise in cost, an enlargement of the circuit substrate size, and the like.

Particularly, in the case where the configuration of the primary-side switching converter shown in FIG. 32 is adopted as a basis and the synchronous rectification circuit based on the rectified current detection system is provided on the secondary side, it is necessary to provide a full-wave rectification circuit on the secondary side. Therefore, the above-mentioned current transformer and drive circuit system are required respectively for each of the MOS-FETs Q3, Q4, which renders the above-mentioned problem graver.

Thus, comparing the winding voltage detection system and the rectified current detection system, the winding voltage detection system is, on one hand, disadvantageous on the basis of power conversion efficiency, due to the reactive power, but is simpler in circuit configuration; on the other hand, the rectified current detection system is advantageous in view of power conversion efficiency, due to the absence of reactive power, but is more complicated in circuit configuration. Thus, there is a trade-off relationship between the two kinds of systems.

Accordingly, it is demanded that a power circuit including a synchronous rectification circuit should have a circuit configuration as simple as possible while being free of an increase in loss due to reactive power.

DISCLOSURE OF INVENTION

In consideration of the above-mentioned problems, according to the present invention, there is provided a switching power circuit which is configured as follows.

First, the switching power circuit includes: a switching unit provided with a plurality of switching devices and performing switching by turning ON and OFF a DC input voltage inputted; a primary-side drive unit for performing switching driving so that the plurality of switching devices are alternately turned ON and OFF; and an insulated converter transformer for transmitting a switching output fed from the switching unit from the primary side to the secondary side. The insulated converter transformer includes a primary winding, and a secondary winding having a center-tapped tap output, with a gap length set to be not less than a predetermined value to thereby set the coupling coefficient of the primary winding and the secondary winding to be not more than a predetermined value.

In addition, the switching power circuit includes: a primary-side resonance capacitor connected to a predetermined portion on the primary side so as to form a primary-side resonance circuit for causing the operation of the switching unit to be of a resonance type, at least by the leakage inductance component of the primary winding of the insulated converter transformer and its own capacitance; and a synchronous rectification circuit for obtaining a secondary-side DC output voltage as an end-to-end voltage of a secondary-side smoothing capacitor by performing full-wave rectification of an alternating voltage induced in the secondary winding of the insulated converter transformer and charging the secondary-side smoothing capacitor with the rectified current.

In the configuration as above, first, the numbers of turns of the primary winding and the secondary winding of the insulated converter transformer are so set that the secondary-side rectified current caused to flow through the synchronous rectification circuit by the full-wave rectification is in a continuous mode, irrespective of variations in the condition of a load connected to the secondary-side DC output voltage.

Further, the synchronous rectification circuit includes, in relation to center tapping of the secondary winding of the insulated converter transformer, a first field effect transistor connected in series to a point between one of end portions divided by the tap output of the secondary winding and a secondary-side reference potential, and a second field effect transistor connected in series to a point between the other of the end portions divided by the tap output of the secondary winding and the secondary-side reference potential.

In addition, the synchronous rectification circuit includes: a first drive circuit for outputting a gate voltage for turning ON the first field effect transistor by detecting, through a resistance device, a secondary winding voltage corresponding to the period of a half wave in which the first field effect transistor should flow a rectified current; and a second drive circuit for outputting a gate voltage for turning ON the second field effect transistor by detecting, through a resistance device, a secondary winding voltage corresponding to the period of a half wave in which the second field effect transistor should flow a rectified current.

Further, a choke coil which includes a flat plate-like ferrite core having a winding longitudinally wound into a hollow cylindrical form by use of a straight angle wire, and a pot-type metallic dust inserted in the hollow cylindrical winding, and which has a required saturation magnetic flux density and a required inductance, is connected in series between the tap output of the secondary winding and the smoothing capacitor.

Beside, in the present invention, the switching power circuit is configured as follows. First, the switching power circuit includes: a switching unit provided with a plurality of switching devices and performing switching by turning ON and OFF a DC input voltage inputted; a primary-side drive unit for performing switching driving so that the plurality of switching devices are alternately turned ON and OFF; and an insulated converter transformer for transmitting a switching output fed from the switching unit from the primary side to the secondary side, the insulated converter transformer including a primary winding, and a secondary winding having a center-tapped tap output, with a gap length set to be not less than a predetermined value to thereby set the coupling coefficient of the primary winding and the secondary winding to be not more than a predetermined value.

In addition, the switching power circuit includes: a primary-side resonance capacitor connected to a predetermined portion on the primary side so as to form a primary-side resonance circuit for causing the operation of the switching unit to be of a resonance type, at least by the leakage inductance component of the primary winding of the insulated converter transformer and its own capacitance; and a synchronous rectification circuit for obtaining a secondary-side DC output voltage as an end-to-end voltage of a secondary-side smoothing capacitor by performing full-wave rectification of an alternating voltage induced in the secondary winding of the insulated converter transformer and charging the secondary-side smoothing capacitor with the rectified current.

In the configuration as above, first, the numbers of turns of the primary winding and the secondary winding of the insulated converter transformer are so set that a secondary-side rectified current caused to flow in the synchronous rectification circuit by the full-wave rectification is in a continuous mode, irrespective of variations in the conditions of a load connected to the secondary-side DC output voltage.

Further, the synchronous rectification circuit includes, in relation to center tapping of the secondary winding of the insulated converter transformer, a first field effect transistor connected in series to a point between one of end portions divided by the tap output of the secondary winding and a secondary-side reference potential, and a second field effect transistor connected in series to a point between the other of the end portions divided by the tap output of the secondary winding and the secondary-side reference potential.

Besides, the synchronous rectification switching circuit includes: a first drive circuit for outputting a gate voltage for turning ON the first field effect transistor by detecting, through a resistance device, a secondary winding voltage corresponding to the period of a half wave in which the first field effect transistor should flow a rectified current; and a second drive circuit for outputting a gate voltage for turning ON the second field effect transistor by detecting, through a resistance device, a secondary winding voltage corresponding to the period of a half wave in which the second field effect transistor should flow a rectified current.

Moreover, an inductor device having a required inductance is inserted in series between the tap output of the secondary winding portion and the smoothing capacitor.

In the switching power circuit configured as above, a configuration of a resonance type converter is adopted as a primary-side switching converter, whereas a full-wave rectification type synchronous rectification circuit based on a winding voltage detection system is provided on the secondary side.

In addition, the gap length of the insulated converter transformer is set to be not less than a predetermined value, whereby the coupling coefficient between the primary winding and the secondary winding is made to be not more than a predetermined value, and the numbers of turns of the primary winding and the secondary winding are so set that a secondary-side rectified current caused to flow in the synchronous rectification circuit by the full-wave rectification is in a continuous mode, irrespective of variations in the conditions of a load connected to the secondary-side DC output voltage. Where the secondary-side rectified current is in the continuous mode, it is possible to reduce the reactive power due to the generation of a reverse-direction current in the secondary-side rectified current in the discontinuation periods of the rectified current, which is the problem occurring in a synchronous rectification circuit based on a winding voltage detection system.

Moreover, a choke coil having a required inductance is inserted in series between the center tap of the secondary winding and the secondary-side smoothing capacitor, in the above-mentioned manner. The choke coil suppresses the reverse-direction current generated in the rectified current by a back electromotive force when the rectified current flows there. In other words, this makes it possible to contrive a further reduction in the reactive power arising from the generation of the reverse-direction current in the rectified current.

In addition, since the choke coil includes a flat plate-like ferrite core having a winding longitudinally wound into a hollow cylindrical form by use of a rectangular wire, and a pot-type metallic dust inserted in the hollow cylindrical winding, the inductance value thereof is stable irrespectively of variations in the load current level.

BEST MODE FOR CARRYING OUT THE INVENTION

Figure 1:
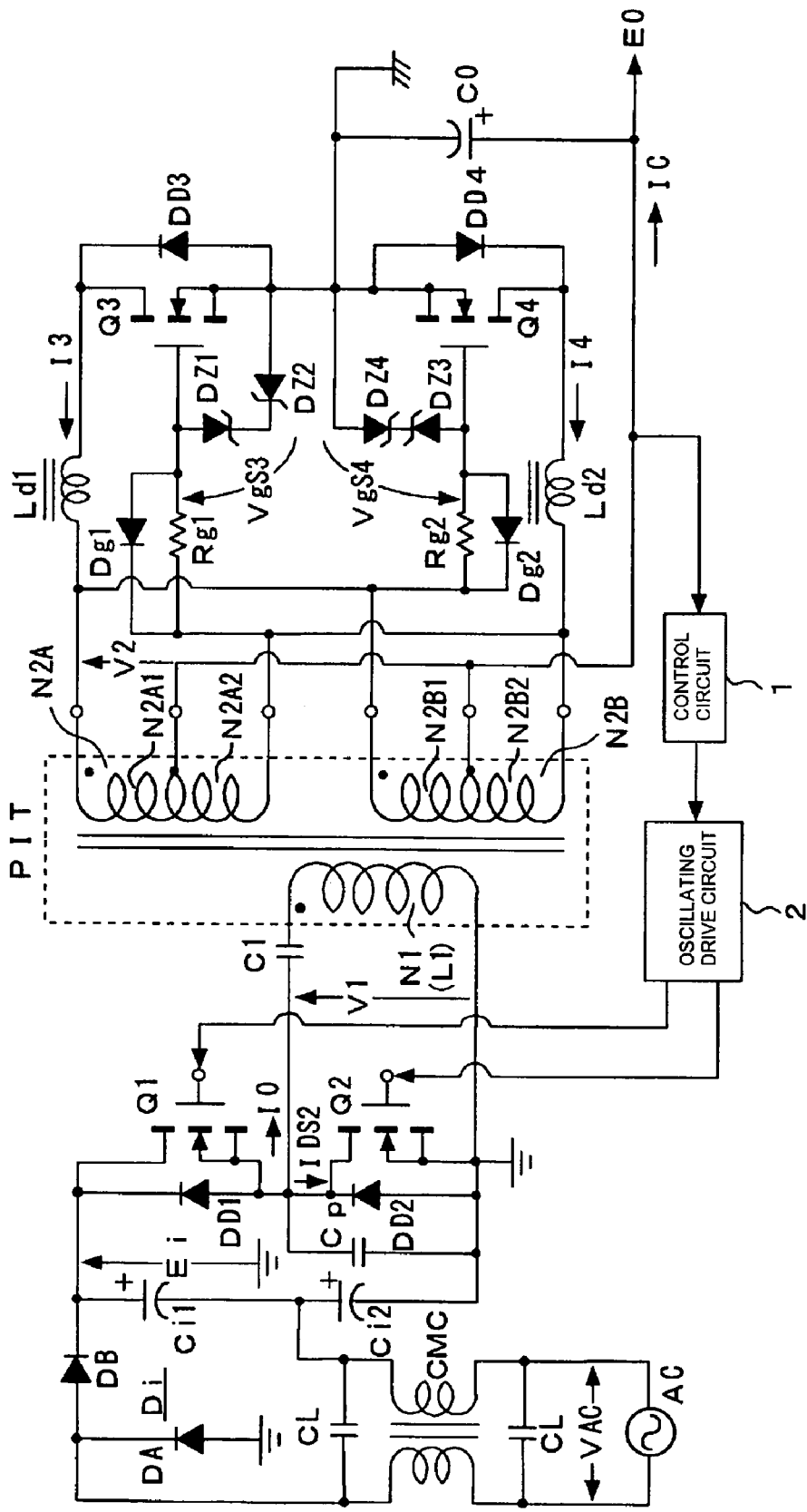
FIG. 1 is a circuit diagram showing a configuration example of a switching power circuit as a first embodiment of the present invention.

FIG. 1 shows a configuration example of a switching power circuit as a first embodiment of the present invention. The power circuit shown in this figure adopts, as a basic configuration on the primary side, a configuration in which a partial voltage resonance circuit is combined with a current resonance type converter based on a separately excited type half-bridge coupling system.

In the power circuit shown in the figure, first, a noise filter composed of filter capacitors CL, CL and a common mode choke coil CMC is formed for a commercial AC power source AC.

On the latter stage next to the noise filter, a double voltage rectification circuit composed of a rectification circuit unit Di, which consists of rectifying diodes DA, DB, and two smoothing capacitors Ci1, Ci2 is provided, as shown in the figure. The double voltage rectification circuit produces a rectified and smoothed voltage Ei (DC input voltage) at a level corresponding to two times the AC input voltage VAC, as an end-to-end voltage of the smoothing capacitor Ci1–Ci2.

Under the condition where a load needs a comparatively large current as in the power circuit shown in this figure, the level of the current flowing through the circuit on the side of the primary-side switching converter is also increased. This increases the switching loss and the like, leading to a lowering in power conversion efficiency. In view of this, the double voltage rectification circuit is thus provided as the rectification circuit system for producing the DC input voltage, whereby the level of the current flowing through the circuit of the primary-side switching converter is reduced to about one half (½), as compared, for example, with the case where a rectified and smoothed voltage Ei at a level corresponding to one time an AC input voltage VAC by the ordinary full-wave rectification is supplied. By this, the switching loss due to the primary-side switching converter is reduced.

As a current resonance type converter for performing switching (making and breaking) by being supplied with the DC input voltage, a switching circuit in which two switching devices Q1, Q2 composed of MOS-FETs are connected by half-bridge coupling is provided, as shown in the figure. Damper diodes DD1, DD2 are connected in parallel between the respective drain and source of the switching devices DD1, DD2. The anode and cathode of the damper diode DD1 are connected respectively to the source and drain of the switching device Q1. Similarly, the anode and cathode of the damper diode DD2 are connected respectively to the source and drain of the switching device Q2. The damper diodes DD1, DD2 are body diodes possessed by the switching devices Q1, Q2, respectively.

In addition, a partial resonance capacitor Cp is connected in parallel between the drain and source of the switching device Q2. The capacitance of the partial resonance capacitor Cp and the leakage inductance L1 of a primary winding N1 form a parallel resonance circuit (partial voltage resonance circuit). As a result, a partial voltage resonance operation in which voltage resonance is effected only when the switching devices Q1, Q2 are turned OFF is obtained.

In this power circuit, an oscillating drive circuit 2 is provided for driving the switching of the switching devices Q1, Q2. The oscillating drive circuit 2 has an oscillating circuit and a drive circuit, and general-purpose ICs, for example, can be used therefor. By the oscillating circuit and the drive circuit in the oscillating drive circuit 2, a drive signal (gate voltage) with a required frequency is impressed on each of the gates of the switching devices Q1, Q2. This causes the switching devices Q1, Q2 to perform switching operations in such a manner that they are alternately turned ON/OFF at a required switching frequency.

An insulated converter transformer PIT is provided for transmitting the switching outputs of the switching devices Q1, Q2 to the secondary side.

One end portion of the primary winding of the insulated transformer PIT is connected to the connection point (switching output point) between the source of the switching device Q1 and the drain of the switching device Q2, through series connection of a primary-side parallel resonance capacitor C1, whereby the switching outputs are transmitted.

Besides, the other end portion of the primary winding N1 is connected to the primary-side earth.

Here, the insulated converter transformer PIT has a structure which will be described later, to thereby produce a required leakage inductance L1 in the primary winding N1 of the insulated converter transformer PIT. In addition, the capacitance of the series resonance capacitor C1 and the leakage inductance L1 form a primary-side series resonance circuit for causing the operation of the primary-side switching converter to be of the current resonance type.

As a result of the foregoing, with the primary-side switching converter shown in this figure, there are obtained a current resonance type operation by the primary-side series resonance circuit (L1-C1) and a partial voltage resonance operation by the above-mentioned partial voltage resonance circuit (Cp//L1).

In other words, the power circuit shown in the figure adopts the configuration of a compound resonance type converter in which a resonance circuit for causing the primary-side switching converter to be of the resonance type is combined with another resonance circuit.

An alternating voltage according to the switching outputs transmitted to the primary winding N1 is induced in the secondary winding of the insulated converter transformer PIT.

In the case of this embodiment, as shown in the figure, a secondary winding N2A and a secondary winding N2B of which the winding directions are in the same polarity as that of the primary winding N1 are provided as the secondary winding of the insulated converter transformer PIT.

These secondary windings N2A, N2B are each provided with a center tap, and are each thereby divided into two winding portions, as shown in the figure. Here, the winding portion including the winding start end portion of the secondary winding N2A is referred to as a winding portion N2A1, and the winding portion including the winding finish end portion as a winding portion N2A2. Similarly, the winding portion including the winding start end portion of the secondary winding N2B is referred to as a winding portion N2B1, and the winding portion including the winding finish end portion as a winding portion N2B2.

In the secondary windings N2A and N2B in this case, the winding portions N2A1, N2A2, N2B1 and N2B2 have an equal predetermined number of turns.

A full-wave rectification type synchronous rectification circuit including N-channel MOS-FETs Q3, Q4 is provided as a rectifying device for the secondary windings N2A, N2B. The MOS-FETs Q3, Q4 are each configured to obtain a low ON resistance by, for example, selecting one with a low voltage resistance trench structure.

The center tap outputs of the secondary windings N2A, N2B are each connected to the positive terminal of a smoothing capacitor $C_O$.

The winding start end portions of the secondary windings N2A, N2B are each connected to the secondary-side earth (the side of the negative terminal of the smoothing capacitor $C_O$) through an inductance Ld1 and the drain→source of the MOS-FET Q3.

In addition, the winding finish end portions of the secondary windings N2A, N2B are each connected to the secondary-side earth (the side of the negative terminal of the smoothing capacitor $C_O$) through an inductance Ld2 and the drain→source of the MOS-FET Q4.

Incidentally, body diodes DD3, DD4 are connected between the respective drain and source of the MOS-FETs Q3, Q4.

With such a connection form as this, the MOS-FET Q3 is inserted in series into the rectified current path including the winding portion N2A1 and the winding portion N2B1 of the secondary windings N2A and N2B. Similarly, the MOS-FET Q4 is inserted in series into the rectified current path including the winding portion N2A2 and the winding portion N2B2 of the secondary windings N2A and N2B.

In this case, in the rectified current path including the winding portion N2A1 and the winding portion N2B1, the inductor Ld1 is inserted in series between the winding start end portions of the secondary windings N2A, N2B and the drain of the MOS-FET Q3. Similarly, in the rectified current path including the winding portion N2A2 and the winding portion N2B2, the inductor Ld2 is inserted in series between the winding finish end portions of the secondary windings N2A, N2B and the drain of the MOS-FET Q4.

A drive circuit for driving the MOS-FET Q3 is formed by connecting a gate resistor Rg1 between the winding finish end portion of the secondary winding N2A and the gate of the MOS-FET Q3.

Similarly, a drive circuit for driving the MOS-FET Q4 is formed by connecting a gate resistor Rg2 between the winding start end portion of the secondary winding N2B and the gate of the MOS-FET Q4.

In short, the MOS-FET Q3 is put into conduction through the detection, by the gate resistor Rg1, of alternating voltages induced in the winding portion N2A2 and the winding portion N2B2; similarly, the MOS-FET Q4 is put into conduction through the detection, by the gate resistor Rg2, of alternating voltages induced in the winding portion N2A1 and the winding portion N2B1.

A MOS-FET is so designed that, when an ON voltage is impressed on the gate, the portion between the drain and the source becomes equivalent to a mere resistor, so that currents can flow therethrough in both directions. When it is intended to cause such a MOS-FET to function as a rectifying device on the secondary side, currents must be permitted to flow only in the direction for charging the positive terminal of the smoothing capacitor $C_O$. If a current flows in the reverse direction, a discharge current flows from the smoothing capacitor $C_O$ to the side of the insulated converter transformer PIT, making it impossible to transfer power to the load side effectively. In addition, the reverse current causes heat generation in the MOS-FET, generation of noises, and the like, leading to a switching loss on the primary side.

The above-mentioned drive circuits are circuits for driving the switching of the MOS-FETs Q3, Q4 so that currents will flow only in the direction for charging the positive terminal of the smoothing capacitor $C_O$ (namely, in the source→drain direction in this case), based on the detection of the voltages in the secondary windings. In short, the synchronous rectification circuit is so configured as to drive ON/OFF the MOS-FETs Q3, Q4 synchronously with the rectified currents, by the winding voltage detection system.

Incidentally, in this case, a Shottky diode Dg1 and a Shottky diode Dg2 are connected, in the directions shown in the figure, in parallel respectively to the gate resistors Rg1 and Rg2 provided for forming the drive circuit systems for the MOS-FET Q3 and the MOS-FET Q4. The Shottky diodes Dg1, Dg2 form paths along which the charges accumulated in the gate input capacitances of the MOS-FETs Q3, Q4 are discharged when the MOS-FETs Q3, Q4 are turned OFF, as will be described later.

Besides, in this case, as shown in the figure, a Zener diode Dz1 and a Zener diode Dz2 are inserted between the gate and the source of the MOS-FET Q3, and, similarly, a Zener diode Dz3 and a Zener diode Dz4 are inserted between the gate and the source of the MOS-FET Q4. These Zener diodes form overvoltage protection circuits for the MOS-FETs Q3, Q4.

As such Zener diodes Dz, those having a Zener potential (breakdown potential) according to the voltage resistance levels of the MOS-FETs Q3, Q4 are selected. This ensures that, as the gate-source potentials of the MOS-FETs Q3, Q4 rise to or above the voltage resistance levels, the Zener diodes Dz come to be conductive, whereby the MOS-FETs Q3, Q4 can be protected.

As the Zener diodes Dz in this case, for example, those with a Zener potential of ±20 V are selected. In addition, for example, the Zener diodes Dz1, Dz2 and the Zener diodes Dz3, Dz4 are provided in the manner of being incorporated in the MOS-FET Q3 and the MOS-FET Q4, respectively.

Besides, as has been described above, in the power circuit shown in FIG. 1, the inductor Ld1 is inserted between the winding start end portion of the secondary winding N2A and the drain of the MOS-FET Q3. Similarly, the inductor Ld2 is inserted between the winding start end portion of the secondary winding N2B and the drain of the MOS-FET Q4.

In this embodiment, for example, a comparatively low inductance of about 0.6 µH is set for each of the inductors Ld1, Ld2.

Figure 3:
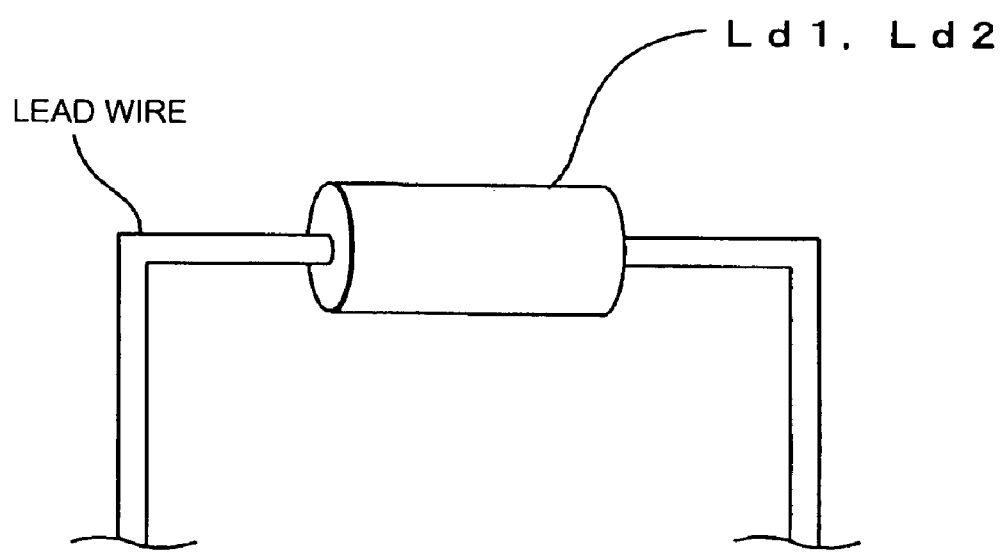
FIG. 3 is a figure exemplifying the structure of an inductor to be inserted in a secondary-side rectified current path, in the switching power circuit as the embodiment.

Here, in obtaining such a low inductance, it may be contemplated to use bead cores as shown in FIG. 3 as the inductors Ld1, Ld2.

Specifically, as shown in FIG. 3, a lead wire is passed through a bead core formed in a hollow cylindrical shape from a magnetic material, for example, an amorphous magnetic material, a ferrite material or the like. The bead core with the lead wire passed therethrough is mounted on a printed wiring board as a single inductor device.

Figure 4A:
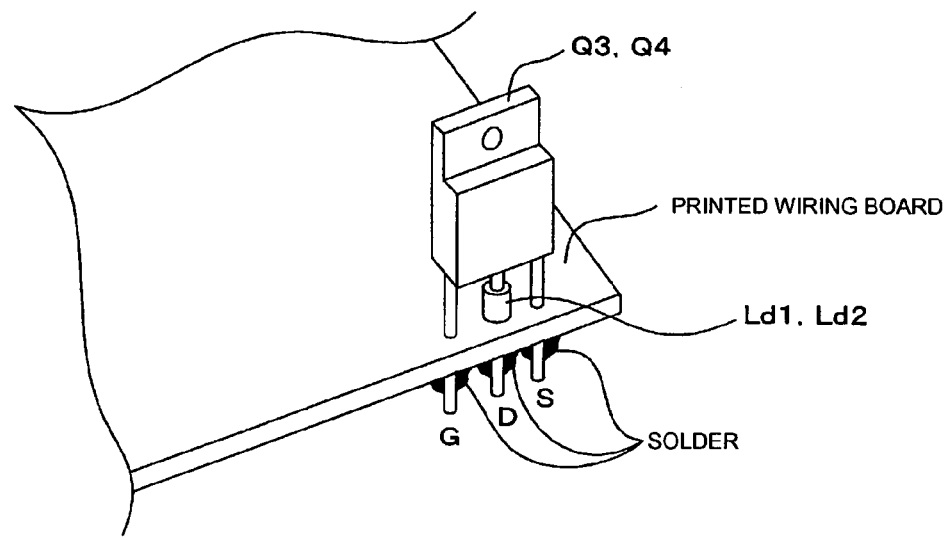
FIG. 4A is a figure showing another example of the structure of the inductor to be inserted in the secondary-side rectified current path, in the switching power circuit as the embodiment.
Figure 4B:
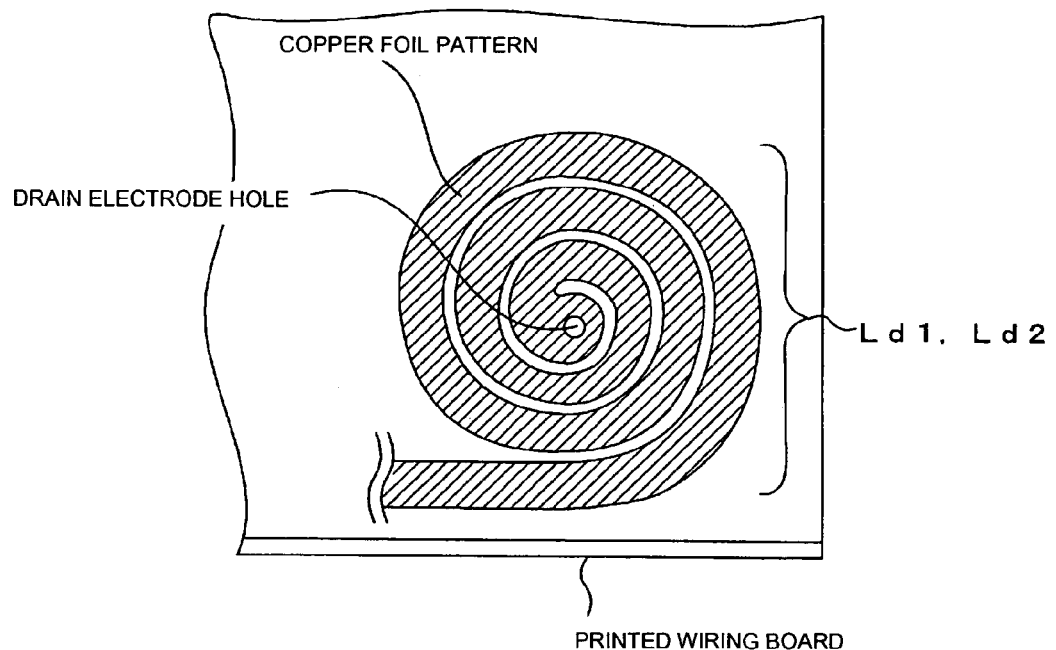
FIG. 4B is a figure showing a further example of the structure of the inductor to be inserted in the secondary-side rectified current path, in the switching power circuit as the embodiment.

Alternatively, in this embodiment, in providing the inductors Ld1, Ld2 with a low inductance, the inductors Ld1, Ld2 are formed, for example, in the manners shown in FIGS. 4A and 4B.

First, FIG. 4A illustrates another example of use of the above-mentioned bead cores as the inductors Ld1, Ld2.

In this case, the bead core formed of a magnetic material such as an amorphous magnetic material, a ferrite material, etc. as above-mentioned is provided so that the lead wire as the drain electrode terminal of the MOS-FET Q3, Q4 soldered to the printed wiring board is passed therethrough, as shown in the figure. Then, the inductors Ld1, Ld2 are each formed by utilizing the inductance of the bead core.

Where the bead core is thus provided directly on the lead wire for the drain electrode, it is unnecessary to mount on the printed wiring board a component part device as the bead core as shown in FIG. 3, and it is possible to contrive space saving as to the printed wiring board.

Besides, FIG. 4B shows an example in which a wiring pattern on the printed wiring board for mounting the MOS-FET Q3, Q4 is formed in a spiral shape.

In this case, a copper foil pattern to be wired to the drain electrode of the MOS-FET Q3, Q4 on the printed wiring board is formed in a spiral shape as shown in the figure so that the inductance required of the inductor Ld1, Ld2 is obtained by utilizing the spiral shape.

This method has the merit that the inductor Ld can be formed simultaneously with the manufacture of the printed wiring board.

Now, description will be made referring again to FIG. 1.

With the synchronous rectification circuit configured as above-described, an operation of charging the smoothing capacitor $C_0$ with the rectified currents obtained by the full-wave rectification can be obtained.

Specifically, during the half-cycle period on one side of the alternating voltage induced on the secondary side, the smoothing capacitor $C_0$ is charged respectively with the currents flowing through the winding portions N2A1, N2B1. On the other hand, during the half-cycle period on the other side of the alternating voltage, the smoothing capacitor $C_0$ is charged respectively with the currents flowing through the winding portions N2A2, N2B2. As a result, a full-wave rectification operation is obtained in which the smoothing capacitor $C_0$ is charged during the periods in which the alternating voltage is positive/negative.

Then, a secondary-side DC output voltage $E_0$ as shown in the figure is obtained as the end-to-end voltage of the smoothing capacitor $C_0$. The secondary-side DC output voltage $E_0$ is supplied to the side of a load (not shown), and is also inputted shuntedly as a detection voltage for a control circuit 1 which will be described below.

The control circuit 1 supplies the oscillating drive circuit 2 with a detection output according to variations in the level of the secondary-side DC output voltage $E_0$. The oscillating drive circuit 2 drives the switching devices Q1, Q2 in such a manner that the switching frequency is varied according to the detection output of the control circuit 1 which is inputted thereto. With the switching frequency of the switching devices Q1, Q2 thus varied, the power transmitted from the primary winding N1 of the insulated converter transformer PIT to the side of the secondary windings N2A, N2B is varied, whereby the level of the secondary-side DC output voltage $E_0$ is stabilized.

For example, as the secondary-side DC output voltage $E_0$ is lowered due to a tendency toward a heavier load, a control for raising the switching frequency is performed, to thereby raise the secondary-side DC output voltage $E_0$. On the other hand, as the secondary-side DC output voltage $E_0$ is raised due to a tendency toward a lighter load, a control for lowering the switching frequency is performed, to thereby lower the secondary-side DC output voltage $E_0$.

In this embodiment, the system is designed to cope with a low-voltage large-current condition, under the circuit configuration of the power circuit shown in the figure. The low-voltage large-current condition is assumed to be a condition where the secondary-side DC voltage is $E_0$=5 V and the primary-side series resonance current, which is the switching current of the primary-side switching converter, is $I_0$=20 A.

Presuming such a condition as this, for the power circuit shown in FIG. 1, the required component parts are configured and selected as follows.

Figure 2:
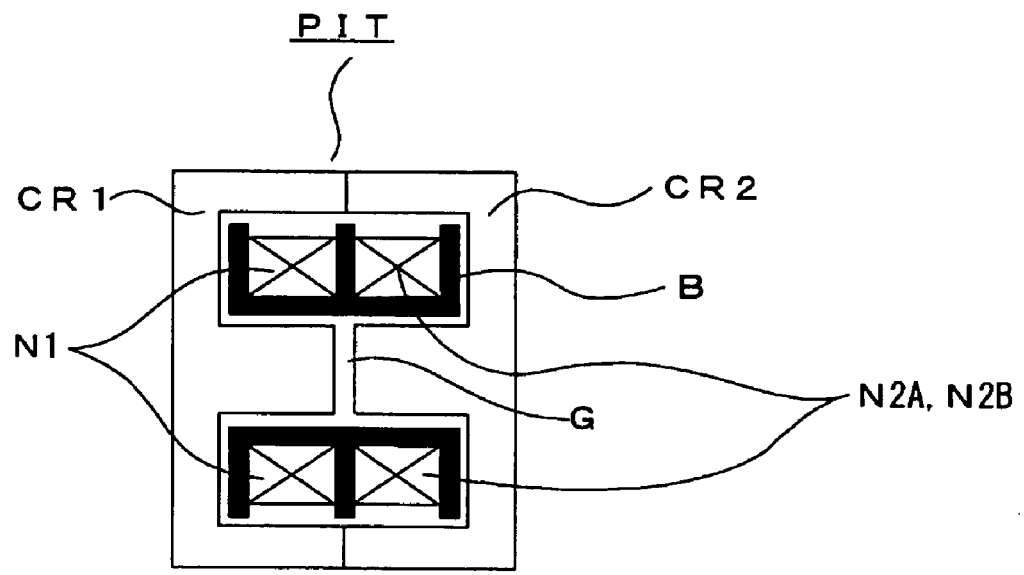
FIG. 2 is a figure showing a structure example of an insulated converter transformer as an embodiment.

First, the insulated converter transformer PIT adopts the structure shown in FIG. 2.

As shown in the figure, the insulated converter transformer PIT includes an EE type core formed by combining E type cores CR1, CR2 formed of a ferrite material so that their magnetic legs are opposed to each other.

A bobbin B formed of a resin, for example, is provided in such a shape that the winding areas on the primary side and the secondary side are independent from each other. The primary winding N1 is wound around the winding area on one side of the bobbin B, and the secondary winding (N2A, N2B) is wound around the winding area on the other side. The bobbin B with the primary-side winding and the secondary-side winding thus provided thereon is mounted to the EE type core (CR1, CR2), whereby the primary-side winding and the secondary-side winding are put into the state of being wound around the center magnetic legs of the EE type core via the different winding areas. In this manner, the structure of the insulated converter transformer PIT as a whole is obtained. The size of the EE type core in this case is, for example, EER-35.

At the center magnetic legs of the EE type core, a gap G with a gap length of about 1.5 mm, for example, is formed as shown in the figure. This configuration provides a loose coupling condition in which the coupling coefficient k between the primary-side winding and the secondary-side winding is not more than 0.8, for example. Namely, a more loose coupling condition is obtained, as compared with the insulated converter transformer PIT of the power circuit shown in FIG. 27 as an example of the related art. Incidentally, the gap G can be formed by setting the center magnetic legs of the E type cores CR1, CR2 to be shorter than the two outside magnetic legs.

Figure 27:
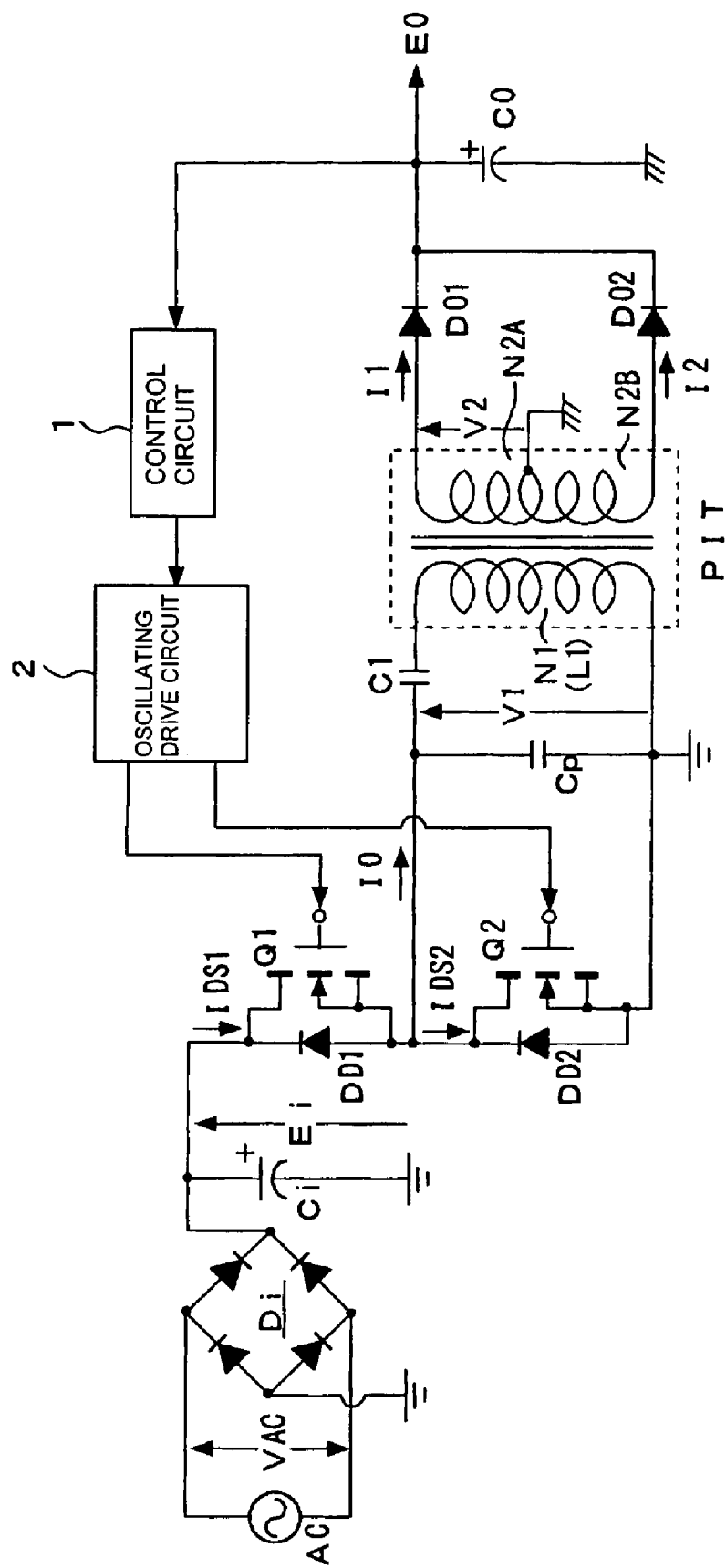
FIG. 27 is a circuit diagram showing the configuration of a power circuit as the related art.

In addition to the above, the numbers of turns of the primary winding N1 and the secondary windings N2A, N2B are so set that the level of the voltage induced per T (turn) of the secondary-side winding is lower than that in the power circuit shown in FIG. 27. For example, the conditions of the primary winding N1=80 T and the secondary windings N2A=N2B=6 T (the winding portions N2A1=N2A2=N2B1=N2B2=3 T) are adopted, whereby the level of the voltage induced per T (turn) of the secondary-side winding is made to be not more than 2 V/T.

Where the insulated converter transformer PIT and the numbers of turns of the primary winding N1 and the secondary winding (N2A, N2B) as above are set, the magnetic flux density in the core of the insulated converter transformer PIT is lowered, and the leakage inductance of the insulated converter transformer PIT is increased, as compared with that in the power circuit shown in FIG. 27.

In addition, as the primary-side series resonance capacitor C1, one having a capacitance of 0.015 μF was selected. Besides, as the MOS-FETs Q3 and Q4 for forming the synchronous rectification circuit on the secondary side, those having a characteristic of 30 A/20 V were selected, with their ON resistance being 2.5 mΩ.

Figure 5:
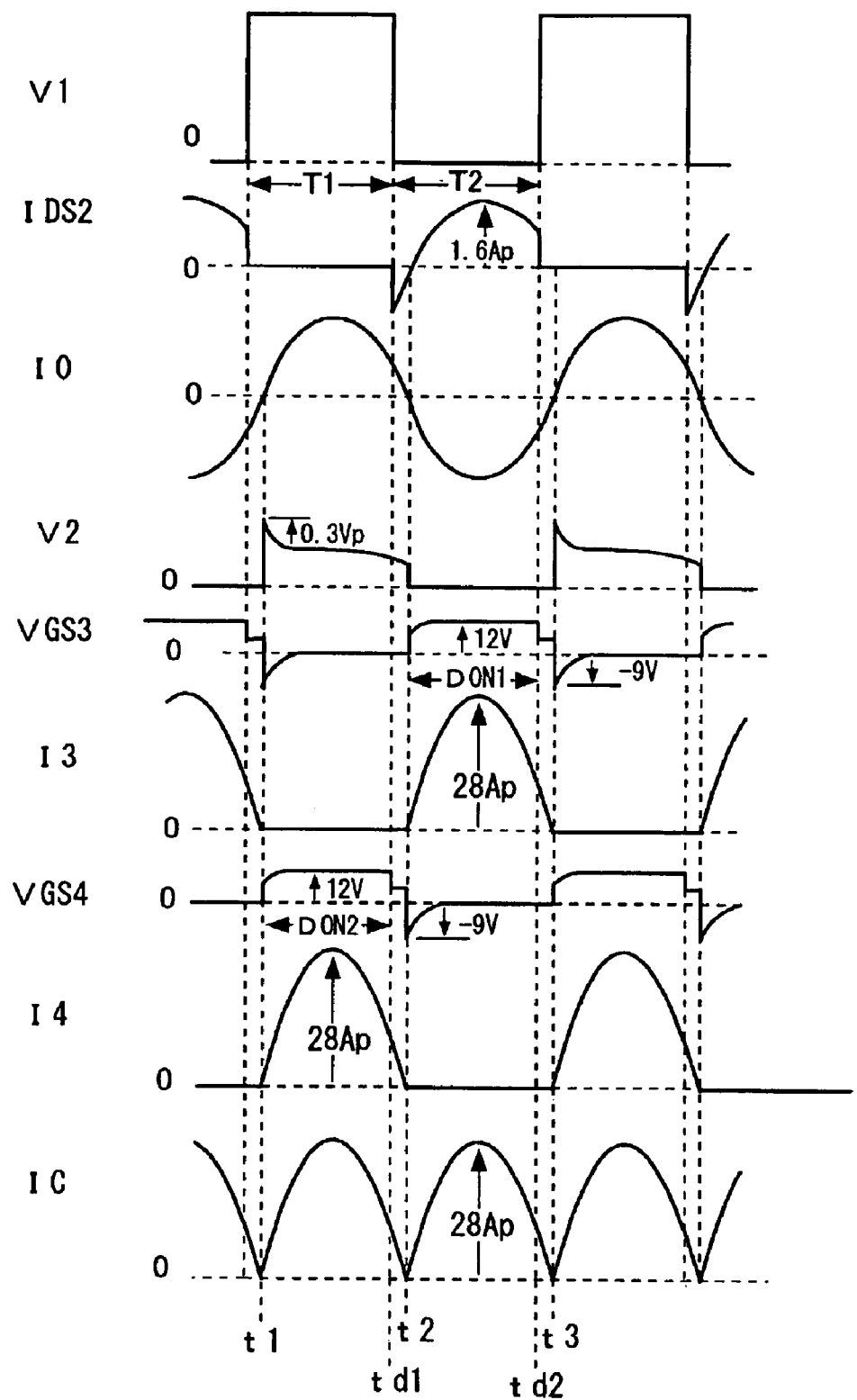
FIG. 5 shows waveform diagrams showing the operation of the power circuit shown in FIG. 1 at the time of a heavy load.
Figure 6:
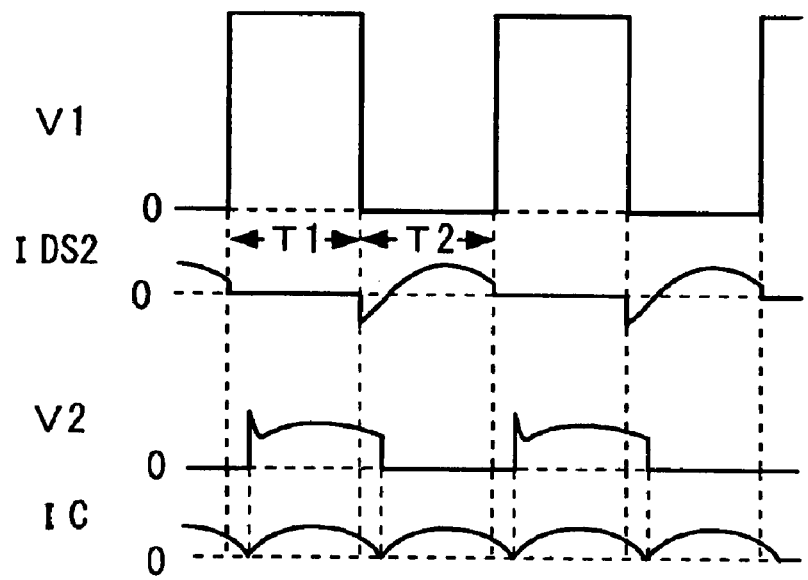
FIG. 6 shows waveform diagrams showing the operation of the power circuit shown in FIG. 1 at the time of a light load.

Operation waveforms of the power circuit shown in FIG. 1 configured as above are shown in FIGS. 5 and 6. FIG. 5 shows the operations under an AC input voltage VAC=100 V and a load power $P_0$=100 W, whereas FIG. 6 shows the operations under an AC input voltage AVC=100 V and a load power $P_0$=25 W. In the load power range with which the power circuit shown in FIG. 1 can cope, the load power $P_O=100$ W is a heavy load condition, and the load power $P_O=25$ W is a light load condition.

In the waveform diagrams shown in FIG. 5, the end-to-end voltage V1 of the switching device Q2 corresponds to the ON/OFF state of the switching device Q2. Specifically, the end-to-end voltage V1 is a rectangular wave, which is at zero level over the period T2 when the switching device Q2 is ON and which is clamped at a predetermined level over the period T1 when the switching device Q2 is OFF. As for a switching current IDS2 flowing through the switching device Q2//damper diode DD2, a waveform is obtained in which the current flows through the damper diode DD2 in negative polarity at the time of turning ON and is then inverted to positive polarity to flow through the drain→source of the switching device Q2, as shown in the period T2, and the current is at zero level due to the OFF condition during the period T1.

In addition, the switching device Q1 performs switching in such a manner as to turn ON/OFF alternately to the switching device Q2. Therefore, the switching current flowing through the switching device Q1//damper diode DD1 has a waveform (not shown) which is shifted in phase by 180° relative to the switching current IDS2. Besides, the end-to-end voltage of the switching device Q1 has a waveform which is shifted in phase by 180° relative to the end-to-end voltage V1 of the switching device Q2.

The primary-side series resonance current $I_O$ flowing through the primary-side series resonance circuit (C1-L1) connected between the switching output point of the switching devices Q1, Q2 and the primary-side earth is equal to a current obtained by composing the switching current IDS1 and the switching current IDS2. Therefore, the primary-side series resonance current $I_O$ has a sinusoidal waveform, as shown in the figure. When this waveform is compared with the waveform (see FIG. 28) of the primary-side series resonance current $I_O$ in the related-art power circuit shown in FIG. 27, it is seen that the primary-side series resonance current $I_O$ in this embodiment does not substantially contain the sawtooth wave component generated by the excitation inductance of the primary winding N1. This is because the excitation inductance of the primary winding N1 is relatively reduced, according to the increase in the leakage inductance L1 of the primary winding N1, since the coupling coefficient of the insulated converter transformer PIT is set into a more loose condition.

As such a waveform as this of the primary-side series resonance current $I_O$ is obtained, the voltage V2 obtained at the winding portion N2A1 of the secondary winding N2A has a waveform which accords to the period of the primary-side series resonance current $I_O$ and which is clamped at an absolute value level corresponding to the secondary-side DC output voltage $E_O$.

Incidentally, while this voltage V2 is shown as a potential obtained at the winding portion N2A1, a potential with an equivalent waveform is generated also at the winding portion N2B2 of the secondary winding N2B. Besides, in this case, a potential equivalent to the voltage V2 is generated also at each of the winding portion N2A2 and the winding portion N2B2.

Figure 28:
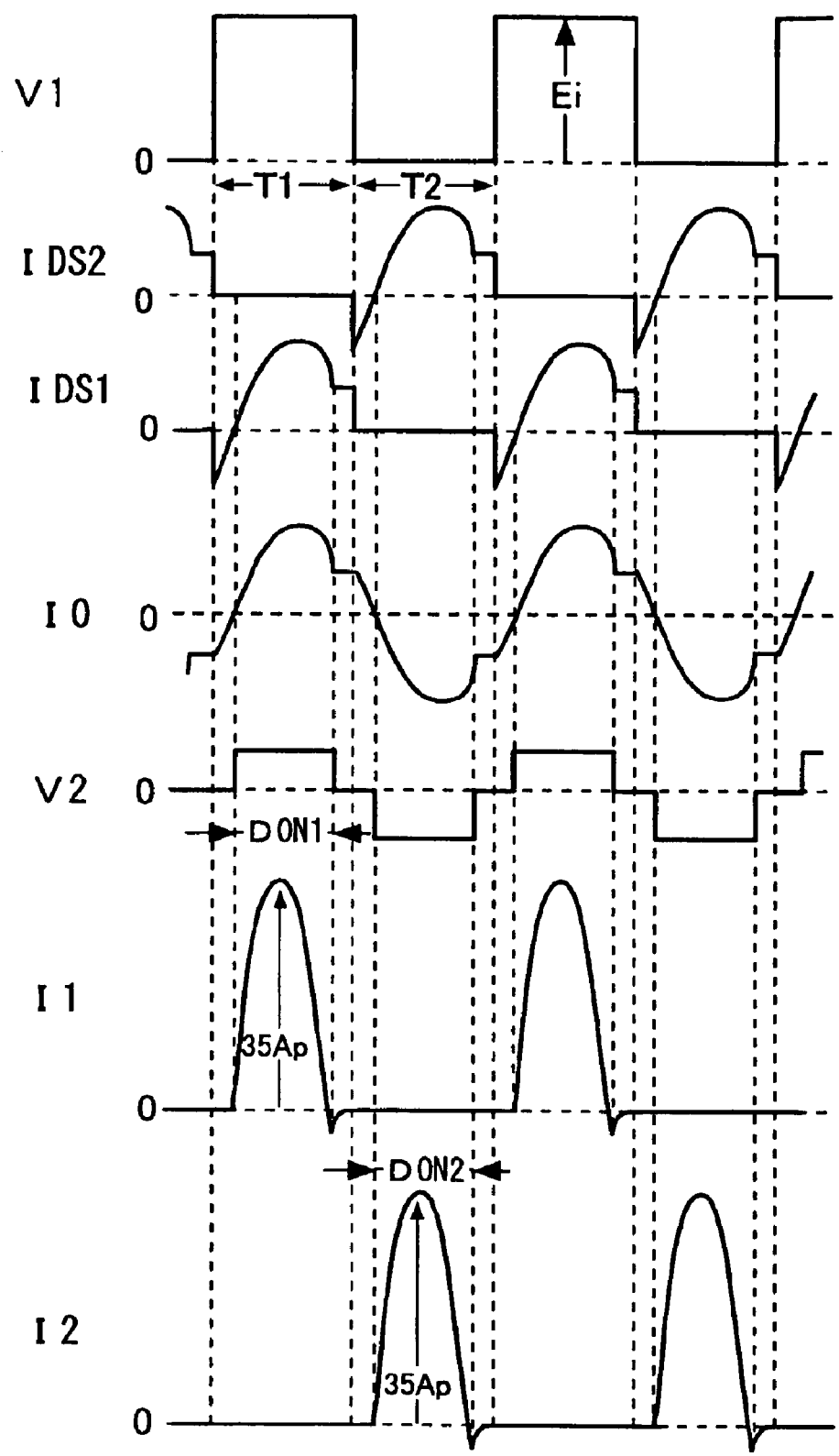
FIG. 28 shows waveform diagrams showing the operation of the related-art power circuit at the time of a heavy load.
Figure 29:
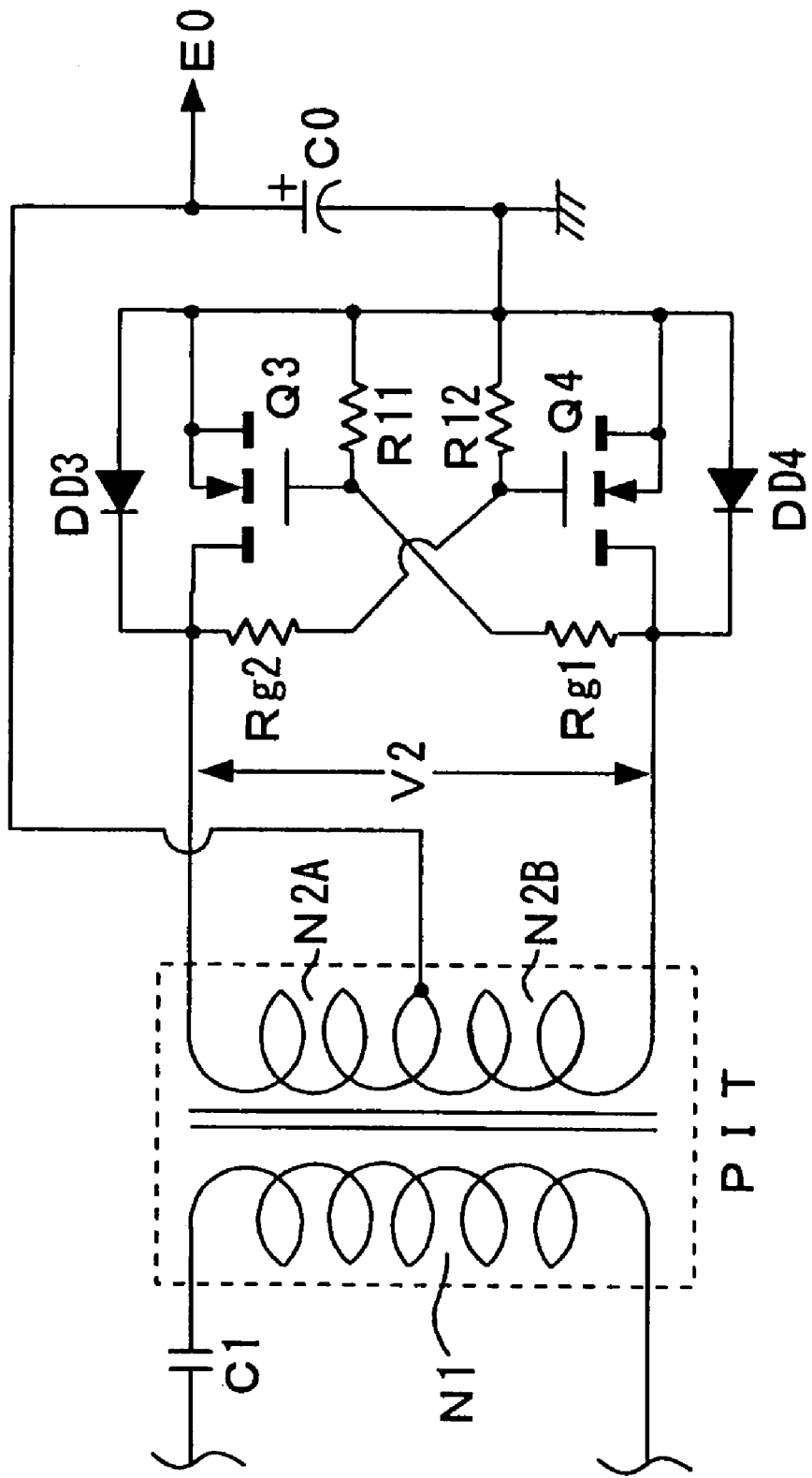
FIG. 29 is a circuit diagram showing the configuration on the secondary side in the case where a synchronous rectification circuit based on a winding voltage detection system is provided as the related-art power circuit.
Figure 30:
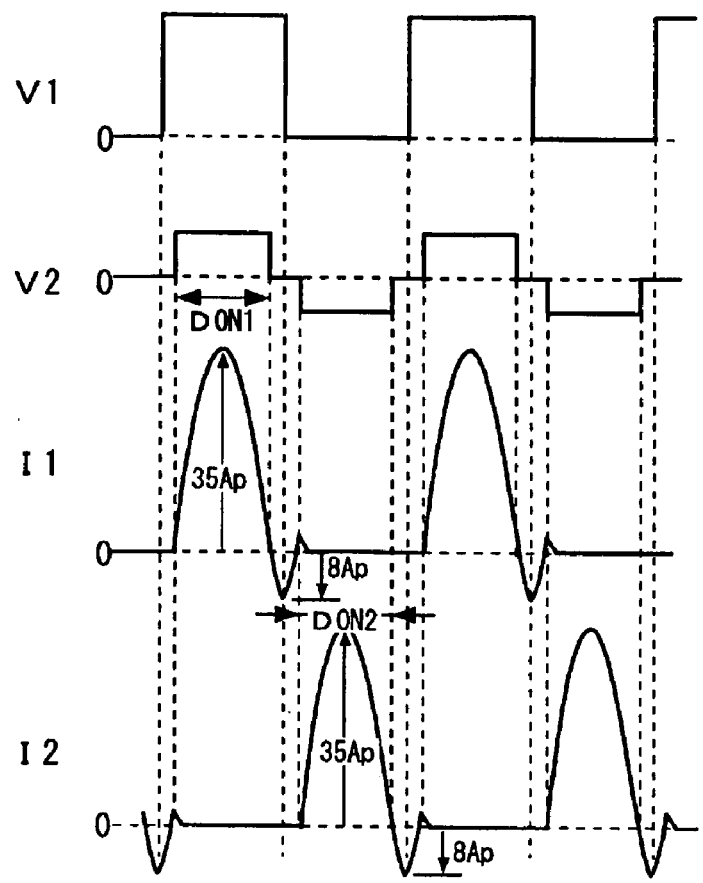
FIG. 30 shows waveform diagrams showing the operation at the time of a heavy load, in the case where the secondary-side configuration shown in FIG. 29 is adopted.
Figure 31:
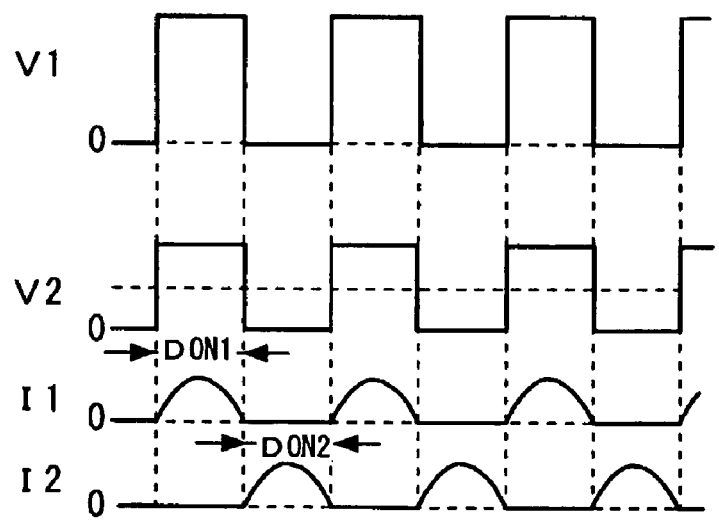
FIG. 31 shows waveform diagrams showing the operation at the time of a light load, in the case where the secondary-side configuration shown in FIG. 29 is adopted.

Here, as seen from comparison with the voltage V2 shown in FIG. 28, the voltage V2 shown in FIG. 5 has a waveform brought to zero level at the timing at which the primary-side series resonance current $I_O$ is brought to zero level. In short, the zero crossing timing of the voltage V2 in this case coincides with the zero crossing timing of the primary-side series resonance current $I_O$ (see the time points t1, t2, and t3 in the figure).

In the synchronous rectification circuit on the secondary side based on the voltage detection system, the voltage V2 (the winding portions N2A1, N2B1) is detected by the drive circuit composed of the resistor Rg2, and a gate voltage at an ON level is outputted to the MOS-FET Q4.

In this case, the voltage V2 has a waveform which reaches a peak level in positive polarity at the time point t1 and is thereafter lowered, to reach zero level at the time point t2, as shown in the figure. The gate-source voltage VGS4 generated between the gate and the source of the MOS-FET Q4 generates an ON voltage during the period (period t1-td1 in the figure) for which the voltage V2 is kept at or above a level corresponding to a predetermined level determined as the gate-source potential of Q4. In short, the period t1-td1 is the ON period DON2 of the MOS-FET Q4.

Then, the period of time from the time point td1 when the period DON2 ends to the time point t2 is the dead time of the MOS-FET Q4, and a rectified current flows via the body diode DD4 of Q4 over the period td1-t2 which is the dead time. This is indicated also by the potential, during the period td1-t2, of the gate-source voltage VGS4 shown in the figure.

This ensures that the rectified current I4 flowing via the MOS-FET Q4 flows over the period from time point t1 to time point t2, as shown in the figure. In short, at the time points t1 and t2, the zero crossing timing of the rectified current I4 coincides with the zero crossing timing of the primary-side series resonance current $I_O$, whereby the rectified current I4 is made continuous with the primary-side series resonance current.

Similarly, in the drive circuit composed of the resistor Rg1, the voltage generated at the winding portions N2A2, N2B2 which is equivalent to the voltage V2 is detected, and a gate voltage at an ON level is outputted to the MOS-FET Q3.

In this case, the gate-source voltage VGS3 generated between the gate and the source of the MOS-FET Q3 generates an ON voltage during the period (period t2-td2 in the figure) for which the voltage V2 generated on the side of the winding portions N2A2, N2B2 is kept at or above a level corresponding to a predetermined level as the gate-source potential, whereby the period t2-td2 is made to be the ON period DON1 of the MOS-FET Q3.

Similarly, the period of time from the time point td2 at which the period DON1 ends to a time point t3 is the dead time of the MOS-FET Q3, and a rectified current flows via the body diode DD3 of Q3 over the period td2-t3.

This ensures that the rectified current I3 flowing via the MOS-FET Q3 flows over the period between the time point t2 and the time point t3 which are the zero crossing timings of the primary-side series resonance current $I_O$, as shown in the figure, so that the rectified current I3 flows in continuity with the primary-side series resonance current $I_O$.

A charging current Ic for the smoothing capacitor has a waveform, as shown in the figure, which is obtained by composing the rectified currents I3 and I4. In short, it is seen that, as a rectifying operation, a full-wave rectification operation is obtained in which the smoothing capacitor $C_O$ is charged during each of the periods when the voltages generated at the secondary windings N2A, N2B are positive/negative.

As has been described above, the voltage V2 generated in the secondary winding in this case is brought to zero level as the primary-side series resonance current $I_O$ is brought to zero level, so that the voltage V2 is continuous with the primary-side series resonance current. With the voltage V2 being thus continuous, the rectified current I3 and the rectified current I4 are also continuous as above-described, so that the charging current Ic for the smoothing capacitor $C_0$ also flows continuously.

In short, in this embodiment, the secondary-side rectified current is obtained in a continuous mode, even when a heavy load is present and the switching frequency is lowered under control. Incidentally, in this case, the rectified currents I3, I4 are 28 Ap, and are reduced below the rectified currents I1, I2 according to the related art shown in FIG. 28, for example. This is because the conduction period of the rectified currents is enlarged in the period corresponding to the equal switching frequency, for example.

As understood from the above description, the continuous mode is obtained even under a heavy load condition, by the system in which the coupling coefficient of the insulated converter transformer PIT is lowered to about 0.8 by the setting of the gap length, thereby obtaining a loose coupling condition, and, for example, the numbers of turns of the primary winding N1, the secondary winding N2A (the winding portions N2A1, N2A2) and the secondary winding N2B (the winding portions N2B1, N2B2) are so set as to lower the level of the voltage induced per T (turn) of the secondary winding, whereby the magnetic flux density generated in the core of the insulated converter transformer PIT is lowered to or below a required value.

Besides, in FIG. 5, it is seen that the rectified currents I3, I4 are not attended by any reverse-direction current, as seen through comparison with the related-art rectified currents I1, I2 shown in FIG. 28.

Namely, in the related art, the rectified currents I1, I2 are attended by a reverse-direction current of 8 Ap, whereby a power loss is generated; on the other hand, in this embodiment, the reverse-direction current conventionally generated in the rectified currents is not generated.

The reason why such a reverse-direction current is not generated in the rectified currents I3, I4 lies in that the inductors Ld1, Ld2 are inserted in each rectified current path, as shown in FIG. 1 above.

Specifically, the insertion of the inductor in the rectified current path ensures that a back electromotive force is generated in the inductor when the rectified current flows. Attendant on the generation of the back electromotive force, the reverse-direction current which has been generated when the MOS-FET Q3, Q4 is turned OFF is suppressed.

As has been above-mentioned, in this embodiment, the inductors Ld1, Ld2 have an inductance set at 0.6 µH, whereby the generation of reverse-direction currents in the rectified currents I3, I4 can be prevented.

Here, as has been described referring to the related art example, the low-ON-resistance low-voltage-resistance MOS-FETs are used as rectifying devices in the synchronous rectification circuit, whereby the conduction loss can be reduced, as compared with the case where diode devices are used as rectifying devices.

However, in the case where the secondary-side rectified currents flow in a discontinuous mode and where the winding voltage detection system is adopted for the synchronous rectification circuit, the MOS-FET is kept ON and a reverse-direction current flows even after the charging current for the smoothing capacitor $C_0$ is brought to zero level, whereby reactive power is generated, as experienced conventionally.

In order to eliminate the reactive power, a synchronous rectification circuit based on the rectified current detection system should be adopted. However, in the rectified current detection system, a drive circuit system including a current transformer and a comparator and the like are needed, and the circuit configuration would be complicated and enlarged in scale.

On the other hand, in this embodiment, the secondary-side rectified currents are in the continuous mode even at the time of a heavy load, whereby the reactive power in the current discontinuity periods as above-mentioned can be reduced, even in the case of the synchronous rectification circuit based on the voltage detection system. In this case, further, the insertion of the inductors Ld1, Ld2 in each rectified current path on the secondary side as above-mentioned ensures that the rectified currents are not attended by any reverse-direction current, so that the reactive power can be further reduced.

From the foregoing, it is seen that, in this embodiment, the synchronous rectification circuit based on the voltage detection system is adopted, whereby a simple circuit configuration can be used, an enlargement of the circuit scale can be restrained, a rise in cost can be obviated, and, simultaneously, the problem of a lowering in power conversion efficiency due to the reactive power during the current discontinuity periods can be solved.

Incidentally, in FIG. 5, the gate-source voltages VGS3, VGS4 have a negative potential of −9 V (in this case) generated at the timings when the MOS-FETs Q3, Q4 are respectively turned OFF. This arises from the insertion of the Shottky diodes Dg1, Dg2 in parallel to the resistors Rg1, Rg2 between the gates of the MOS-FETs Q3, Q4 and the secondary winding, as described above.

The insertion of the Shottky diodes Dg1, Dg2 ensures that the charges accumulated in the gate input capacitances (Ciss) of the MOS-FETs Q3, Q4 can be drawn off via the Shottky diodes Dg1, Dg2 at the times when the MOS-FETs Q3, Q4 are turned OFF.

Namely, in this case, the charges in the gate input capacitances are discharged respectively the path of the Shottky diode Dg (Dg1, Dg2)→the secondary winding N2→the smoothing capacitor $C_0$. With the charges in the input capacitances thus discharged, the voltage fall time at the time of turning OFF of the MOS-FETs Q3, Q4 can be reduced.

When the voltage fall time at the time of the turning OFF of the MOS-FETs can be reduced in this manner, the MOS-FETs Q3, Q4 can be turned OFF assuredly, and good switching characteristics can be obtained.

In addition, FIG. 6 shows the operation, at the time of a light load ($P_0$=25 W), of the circuit shown in FIG. 1.

In the power circuit shown in FIG. 1, as understood from the above description, a constant voltage control based on switching frequency control is performed for the purpose of stabilizing the secondary-side DC output voltage $E_0$. The constant voltage control resides in such an operation that, when a light load condition exists and the secondary-side DC output voltage is raised, the switching frequency is enhanced so as to lower the secondary-side DC output voltage, thereby contriving stabilization.

Under such a light load condition, the secondary-side winding voltage V2 is obtained at substantially the same timing as the end-to-end voltage V1 of the switching device Q2 shown in the figure; accordingly, the charging current Ic (the rectified currents I3, I4) on the secondary side flows so as to charge the smoothing capacitance $C_0$ continuously, without any rest period, as shown in the figure.

From this it is understood that, in the power circuit shown in FIG. 1, the continuous mode is obtained also at the time of a light load.

Figure 7:
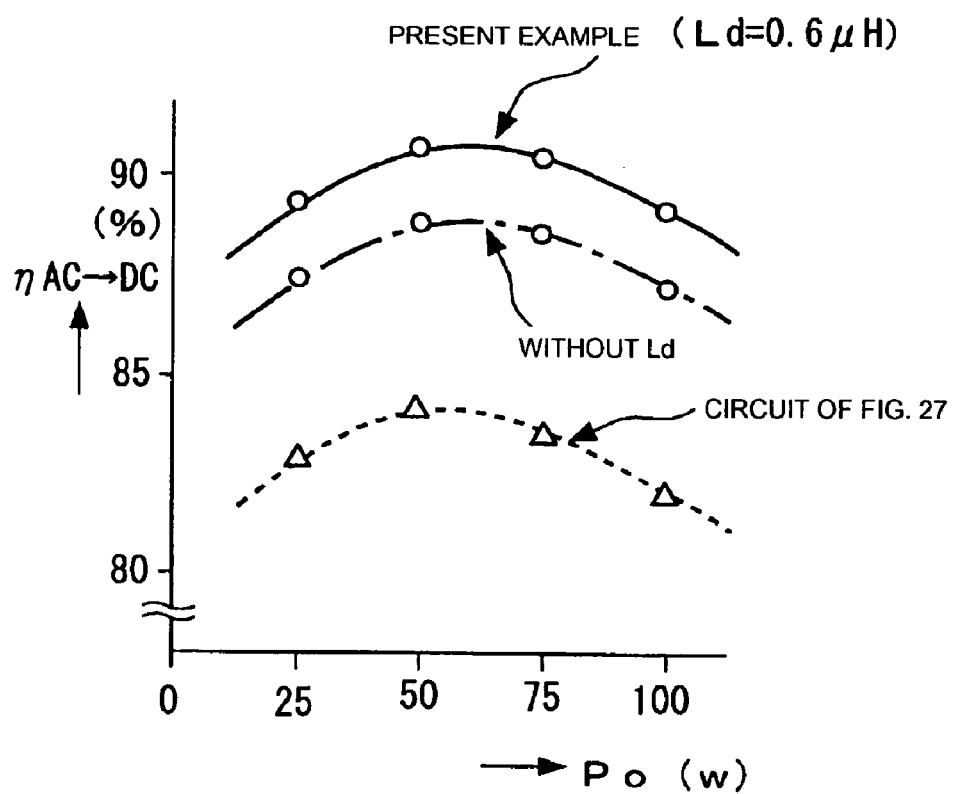
FIG. 7 is a diagram showing the characteristics of switching frequency, primary-side series resonance current level, and AC→DC power conversion efficiency, in relation to variations in the load on the power circuit shown in FIG. 1.

In the next place, FIG. 7 shows the characteristics of AC→DC power conversion efficiency (ηAC→DC) against variations in load power, as a comparison between the power circuit shown in FIG. 1 configured as above-described and the power circuit of FIG. 27 which is an example of the related art. Here, the characteristic of the power circuit of FIG. 1 is indicated by solid line, while the characteristic of the power circuit of FIG. 27 is indicated by broken line.

From FIG. 7 it is seen that the AC→DC power conversion efficiency (ηAC→DC) of the circuit shown in FIG. 1 is higher than that of the power circuit shown in FIG. 27, over a load power range of $P_O=0$ to 100 W. In the circuit shown in FIG. 27, ηAC→DC is about 82% at the time of the load power $P_O=100$ W; on the other hand, in the power circuit shown in FIG. 1, ηAC→DC is 88%, which indicates a 6% improvement. As for the AC input power according to this, a reduction by 8.4 W was obtained when the load power $P_O=100$ W.

In addition, when the load power $P_O=25$ W, ηAC→DC was enhanced by 8% and, in this instance, the AC input power was reduced by 2 W.

Besides, in FIG. 7, the AC→DC power conversion efficiency in the case where the inductor Ld (Ld1=Ld2=0.6 μH) was not inserted in each rectified current path is indicated by dot-dash line. A comparison between the characteristic indicated by the dot-dash line and the characteristic of the circuit of FIG. 1 indicated by the solid line shows that, in the case of the circuit of FIG. 1 with the inductor Ld inserted therein, ηAC→DC is higher, over the load power range of $P_O=0$ to 100 W.

From the foregoing, it is seen that this embodiment with the inductor Ld inserted therein promises a further reduction in reactive power, as compared with a configuration in which the leakage inductance of the insulated converter transformer PIT is increased and only the discontinuous mode at the time of a heavy load is eliminated.

Figure 32:
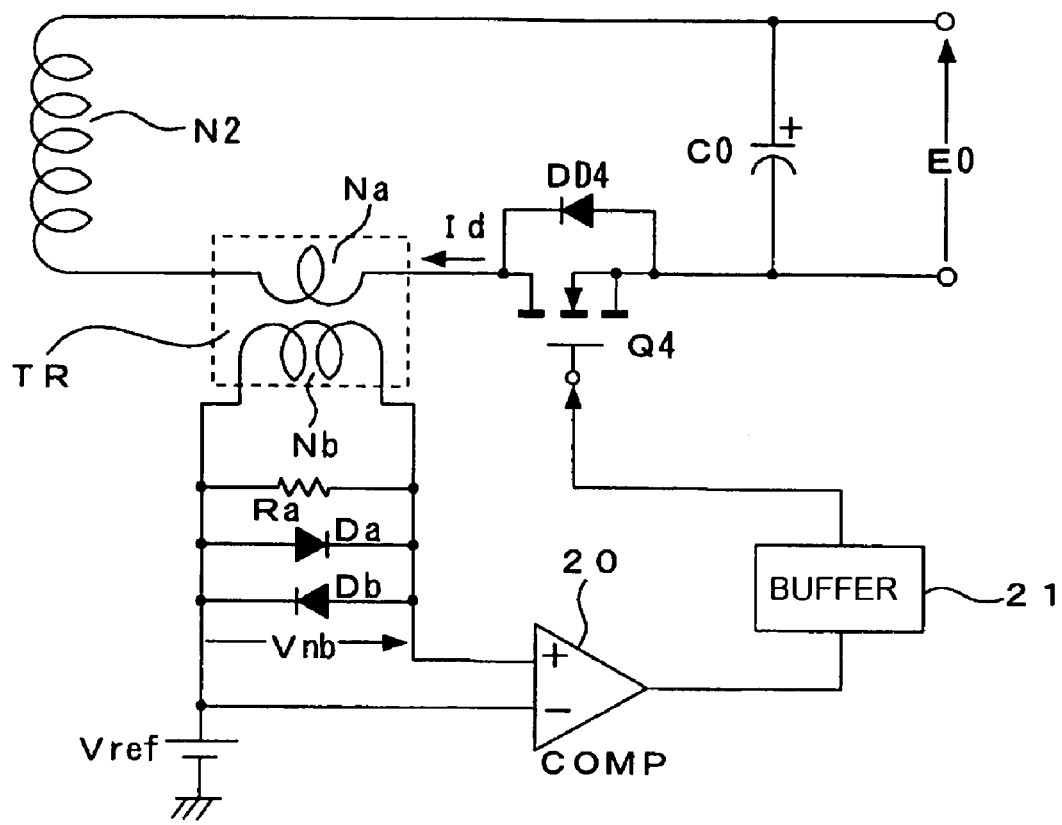
FIG. 32 is a circuit diagram showing a basic configuration example of a synchronous rectification circuit based on a rectified current detection system.
Figure 33:
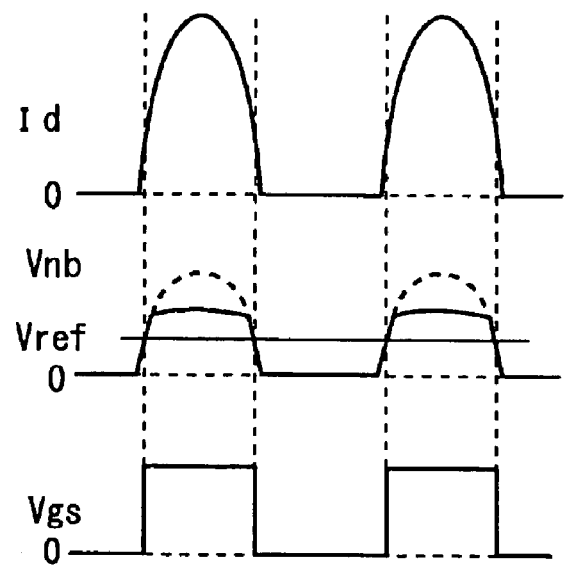
FIG. 33 shows waveform diagrams showing the operation of the synchronous rectification circuit shown in FIG. 32.

The characteristic of power conversion efficiency shown in FIG. 7 is equivalent to that in the case (see FIG. 32) where the configuration on the primary side shown in FIG. 27 is adopted in combination with the synchronous rectification circuit based on the rectified current detection system on the secondary side. In other words, as has been above-described, while the AC→DC power conversion efficiency ηAC→DC in the case of adopting the rectified current detection system of FIG. 32 is about 90%, this example gives a nearly equal AC→DC power conversion efficiency of ηAC→DC=90.8%.

As has been above-described, however, in the power circuit shown in FIG. 1, the synchronous rectification circuit is configured based on the winding voltage detection system, whereby the circuit configuration is further simplified.

Figure 8:
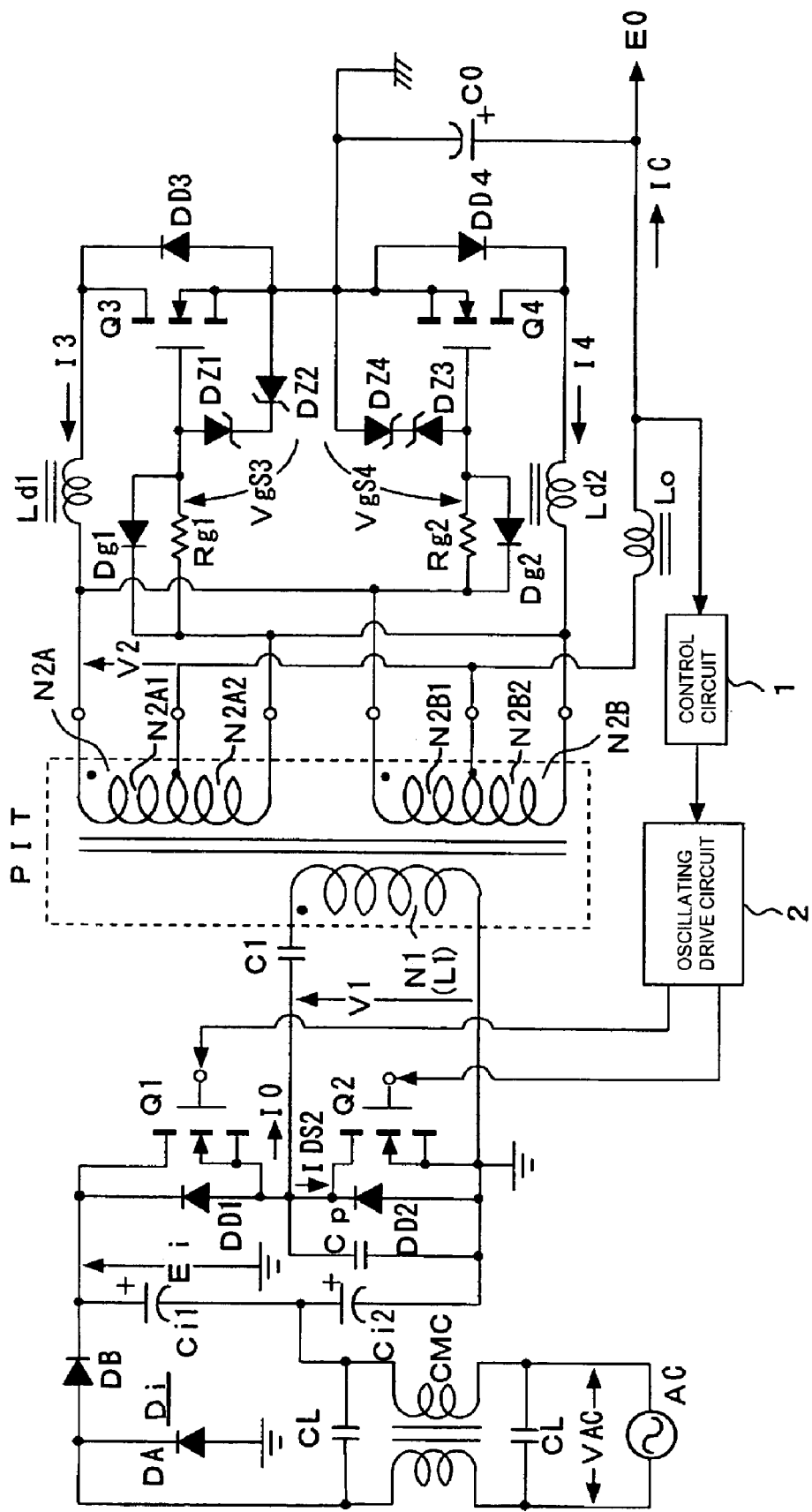
FIG. 8 is a circuit diagram showing a configuration example of a switching power circuit as a second embodiment of the present invention.

FIG. 8 shows a configuration example of a switching power circuit as a second embodiment of the present invention. Incidentally, in FIG. 8, the portions which have been described above referring to FIG. 1 are denoted by the same symbols used above, and description thereof will be omitted.

The power circuit shown in this figure is characterized in that, in the power circuit in the first embodiment shown in FIG. 1 above, the center tap outputs of the secondary windings N2A, N2B are connected to the positive terminal of the smoothing capacitor $C_O$ through an inductor $L_0$, as shown in the figure.

Besides, in the circuit of FIG. 8, the inductor $L_0$ is inserted in common for the rectified current paths as above-mentioned; in this case, the inductor $L_0$ is similarly set to have a low inductance of about 0.3 μH.

Therefore, the inductor $L_0$ may also be configured as shown in FIGS. 4A and 4B above, to thereby obtain such a low inductance.

Figure 9:
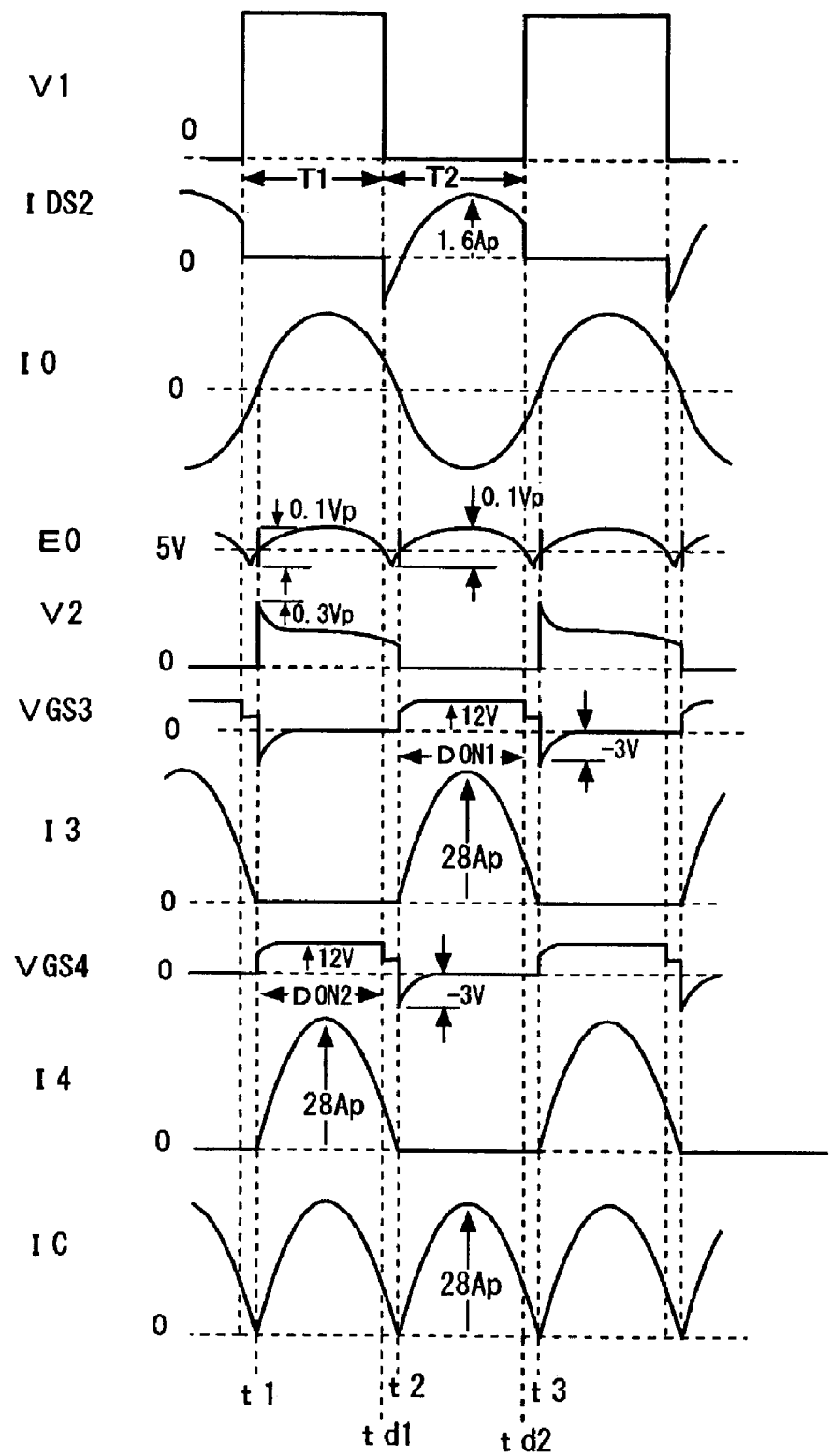
FIG. 9 shows waveform diagrams showing the operation of the power circuit shown in FIG. 8 at the time of a heavy load.

Operation waveforms of the power circuit shown in FIG. 8 configured in this manner are shown in FIG. 9. FIG. 9 shows operation waveforms under the conditions of an AC input voltage VAC=100 V and a load power $P_O=100$ W. In the load power range with which the power circuit shown in FIG. 8 can cope, the load power $P_O=100$ W is a heavy load condition.

In the waveform diagrams shown in FIG. 9, the end-to-end voltage V1 of the switching device Q2 corresponds to the ON/OFF states of the switching device Q2. Specifically, the voltage is in the shape of a rectangular wave being at zero level over the period T2 for which the switching device Q2 is ON and being clamped at a predetermined level over the period for which the switching device Q2 is OFF. As for the switching current IDS2 flowing through the switching device Q2//damper diode DD2, it is in negative polarity by flowing through the damper diode DD2 at the time of turning ON, is then inverted to positive polarity and flows along the drain→source of the switching device Q2, as shown in the period T2; in the period T1, it is at zero level due to turning-OFF.

In addition, the switching device Q1 performs switching so as to be turned ON/OFF alternately relative to the switching device Q2. Therefore, though not shown, the switching current flowing through the switching device Q1//damper diode DD1 assumes a waveform with a phase shift of 180° relative to the switching current IDS2. Also, the end-to-end voltage of the switching device Q1 assumes a waveform with a phase shift of 180° relative to the end-to-end voltage V1 of the switching device Q2.

Then, a primary-side series resonance current $I_0$ flowing through a primary-side series resonance circuit (C1-L1) connected between the switching output point of the switching devices Q1, Q2 and the primary-side earth is obtained by composing the switching current IDS1 and the switching current IDS2. As a result, the primary-side series resonance current $I_0$ assumes a sinusoidal waveform. A comparison of this waveform with the waveform (see FIG. 28) of the primary-side series resonance current $I_0$ in the related-art power circuit shown in FIG. 27 shows that the primary-side series resonance current $I_0$ in this embodiment does not substantially contain the sawtooth wave component generated by the excitation inductance of the primary winding N1. This is because the coupling coefficient of the insulated converter transformer PIT is set into a more loose coupling condition, whereby the leakage inductance L1 of the primary winding N1 is increased and, accordingly, the excitation inductance of the primary winding N1 is relatively reduced.

As such a waveform of the primary-side series resonance current $I_0$ is obtained, the voltage V2 obtained at the winding portion N2A1 of the secondary winding N2A assumes a wave form which accords to the period of the primary-side series resonance current $I_0$ and which is clamped at an absolute value level corresponding to the secondary-side DC output voltage $E_0$.

Incidentally, while the voltage V2 is indicated as the potential obtained at the winding portion N2A1, a potential with an equivalent waveform is generated also at the winding portion N2B1 of the secondary winding N2B. Besides, in this case, potentials with equivalent waveforms are generated also at the winding portion N2A2 and the winding portion N2B2.

Here, as seen through comparison with the voltage V2 shown in FIG. 28, the voltage V2 shown in FIG. 9 can have a waveform which is similarly brought to zero level at the timing when the primary-side series resonance current $I_0$ is brought to zero level. Namely, the zero crossing timing of the voltage V2 in this case coincides with the zero crossing timing of the primary-side series resonance circuit $I_0$ (see time points t1, t2, and t3 in the figure).

In the synchronous rectification circuit on the secondary side based on the voltage detection system, the voltage V2 (the winding portions N2A1, N2B1) is detected by the drive circuit composed of the resistor Rg2, and a gate voltage at an ON level is outputted to the MOS-FET Q4.

In this case, the voltage V2 assumes a waveform which reaches a peak level in positive polarity at the time point t1, is then gradually lowered in level and is brought to zero level at the time point t2, as shown in the figure. The gate-source voltage VGS4 generated between the gate and the source of the MOS-FET Q4 generates an ON voltage in the period (the period t1-td1 in the figure) over which the voltage V2 is kept at or above a level corresponding to a predetermined level determined as the gate-source potential of Q4. In short, this period t1-td1 is the ON period DON2 of the MOS-FET Q4.

Then, the period from the time point td1 when the period DON2 ends to the time point t2 is a dead time of the MOS-FET Q4, and a rectified current flows via the body diode DD4 of Q4 during the dead time period td1-t2. This is indicated also by the potential in the period td1-t2 of the gate-source voltage VGS4 shown in the figure.

As a result of this, the rectified current I4 flowing via the MOS-FET Q4 flows over the period of from time point t1 to time point t2, as shown in the figure. In short, the zero crossing timings of the rectified current I4 coincide with the zero crossing timings of the primary-side series resonance current $I_0$ at the time points t1 and t2, whereby the rectified current I4 is made to be continuous with the primary-side series resonance current.

In addition, similarly in the drive circuit composed of the resistor Rg1, the voltage generated at the winding portions N2A2, N2B2 which is equivalent to the voltage V2 is detected, and a gate voltage at an ON level is outputted to the MOS-FET Q3.

Namely, in this case, the gate-source voltage VGS3 generated between the gate and the source of the MOS-FET Q3 generates an ON voltage during the period (the period t2-td2) over which the voltage V2 generated on the side of the winding portions N2A2, N2B2 is kept at or above a level corresponding to a predetermined level as the gate-source potential, with the result that this period t2-td2 is the ON period DON1 of the MOS-FET Q3.

Besides, similarly, the period from the time point td2 at which the period DON1 ends to the time point t3 is a dead time of the MOS-FET Q3, and, during this period td2-t3, a rectified current flows via the body diode DD3 of Q3.

As a result of this, a rectified current I3 flowing through the MOS-FET Q3 flows over the period from the time point t2 to the time point t3, which are the zero crossing timings of the primary-side series resonance current $I_0$, as shown in the figure; thus, the rectified current I3 flows continuously with the primary-side series resonance current $I_0$.

A charging current Ic for the smoothing capacitor flows in a waveform as shown in the figure, which is obtained by composition of these rectified currents I3 and I4. In short, it is seen that, as the rectifying operation, a full-wave rectification operation is obtained in which the smoothing capacitor $C_O$ is charged over the periods for which the voltage generated at the secondary windings N2A, N2B is positive/negative.

As has been described above, the voltage V2 generated at the secondary winding is brought to zero level as the primary-side series resonance current $I_0$ is brought to zero level, so that the voltage V2 is continuous with the primary-side series resonance current. Further, due to the continuity of the voltage V2, the rectified current I3 and the rectified current I4 are also made to be continuous in the above-mentioned manner, and, therefore, the charging current Ic for the smoothing capacitor $C_O$ also flows continuously.

In short, in this embodiment, a continuous mode of the secondary-side rectified circuit can be obtained even when a heavy load exists and such a control as to lower the switching frequency is being performed. Incidentally, in this case, the rectified currents I3, I4 are 28 Ap, the value being lower than the value of the related-art rectified currents I1, I2 shown in FIG. 28, for example. This is because the conduction period of the rectified current is enlarged, as compared with the related art, during the cycle period corresponding to the equivalent switching frequency, for example.

As understood from the above description, the reason why the continuous mode can thus be obtained even under a heavy load condition lies in that the gap length is so set as to lower the coupling coefficient of the insulated converter transformer PIT to about 0.8, thereby providing a more loose coupling condition, and, for example, the numbers of turns of the primary winding N1 and the secondary winding N2A (the winding portions N2A1, N2A2) and the secondary winding N2B (the winding portions N2B1, N2B2) are so set as to lower the level of the voltage induced per T (turn) of the secondary winding to about 2 V/T, thereby lowering the magnetic flux density generated in the core of the insulated converter transformer PIT to or below a required value.

Besides, in FIG. 9, it is seen that the rectified currents I3, I4 do not contain any reverse-direction current, as seen from comparison with the related-art rectified currents I1, I2 shown in FIG. 28.

Specifically, in the related art, a reverse-direction current of 8 Ap flows in the rectified currents I1, I2, leading to generation of a power loss; in this embodiment, on the other hand, such a reverse-direction current is not generated in the rectified currents.

The reason why such a reverse-direction current is not generated in the rectified currents I3, I4 according to this embodiment lies in that the inductors Ld1, Ld2 are inserted in the rectified current paths and the inductor $L_O$ is inserted in the path which functions in common for the rectified current paths, as shown in FIG. 1 above.

The insertion of the inductors in the rectified current paths results in that back electromotive forces are generated in the inductors when the rectified currents flow. Attendant on the generation of the back electromotive forces, the reverse-currents which might be generated at the times of turning-OFF of the MOS-FETs Q3, Q4 are suppressed.

As has been above-mentioned, in this embodiment, the inductors Ld1, Ld2 and the inductor $L_O$ are set to have an inductance of 0.3 μH, whereby the generation of reverse-direction currents in the rectified currents I3, I4 can be prevented.

Here, as has also been described referring to the related-art example, the synchronous rectification circuit is configured by using low-ON-resistance low-voltage-resistance MOS-FETs as rectifying devices, so that conduction loss can be reduced as compared with the case where diode devices are used as the rectifying devices.

However, in the case where the secondary-side rectified current flows in a discontinuous mode and where the winding voltage detection system is adopted for the synchronous rectification circuit, the reverse-direction current would flow even after the charging current for the smoothing capacitor $C_0$ is brought to zero level, with the result of generation of a reactive power.

In order to dissolve the reactive power, a synchronous rectification circuit based on the rectified current detection system is possibly adopted. In the rectified current detection system, however, a drive circuit system including a comparator and a current transformer and the like are needed, leading to a circuit configuration which is complicated and larger in scale.

On the other hand, according to this embodiment, the continuous mode of the secondary-side rectified current is maintained even at the time of a heavy load, whereby the reactive power in the current discontinuity periods as above can be reduced, notwithstanding the use of the synchronous rectification circuit based on the voltage detection system. Furthermore, in this case, the inductors Ld1, Ld2, $L_0$ are respectively inserted in the rectified current paths on the secondary side as above-described, so as to prevent reverse-direction currents from flowing in the rectified currents and thereby to contrive a further reduction in the reactive power.

This means that, in this embodiment, the synchronous rectification circuit is configured based on the voltage detection system, whereby the circuit configuration is simplified, an enlargement of circuit scale is restrained, a rise in cost is obviated, and, simultaneously, the problem of the lowering in power conversion efficiency due to the reactive power in the current discontinuity periods is solved.

Besides, in FIG. 9, a ripple component $\Delta E_0$ generated in the secondary-side DC output voltage $E_0$ is shown.

Experimental results show that the ripple component $\Delta E_0$ is generated in the range of $\Delta E_0 = 0.1 Vp$, wherein the center is 5 V, which is the output level of the secondary-side DC output voltage $E_0$ in this case, as shown in the figure.

Here, according to the experimental results shown in FIG. 9, high-frequency wave components are superposed on the secondary-side DC output voltage $E_0$ in this case, according to the timings of turning-OFF of the MOS-FETs Q3, Q4. This is considered to arise from switching noises attendant on the switching driving of the MOS-FETs Q3, Q4 by the synchronous rectification circuit.

In the power circuit in this example, such high-frequency wave components generated in the secondary-side DC output voltage $E_0$ are suppressed by the inductor $L_0$ provided in the path for charging the smoothing capacitor $C_0$ with the rectified currents.

For example, in the case of a configuration obtained by removing the inductor $L_0$ from the circuit configuration of FIG. 8, the above-mentioned high-frequency wave components generated at the times of turning-OFF of the MOS-FETs Q3, Q4 have been 0.3 Vp, with the center thereof being at the level of $E_0 = 5$ V.

On the other hand, according to this example in which the inductor $L_0$ is provided in the rectified current path as shown in FIG. 8, the level of the high-frequency wave components can be lowered to 0.1 Vp, as shown in the figure. In short, the impedance component (AC resistance component) possessed by the inductor $L_0$ makes it possible to suppress the high-frequency wave components which are superposed on the secondary-side DC output voltage $E_0$ as above-mentioned.

Incidentally, in FIG. 8, the gate-source voltages VGS3, VGS4 are generated at the timings of turning-OFF of the MOS-FETs Q3, Q4, as a negative potential of −3 V in this case. This is because the Shottky diodes Dg1, Dg2 are inserted in parallel to the resistors Rg1, Rg2, respectively, between the gates of the MOS-FETs Q3, Q4 and the secondary winding, as has been described above.

The insertion of the Shottky diodes Dg1, Dg2 ensures that the charges accumulated in the gate input capacitances (Ciss) of the MOS-FETs Q3, Q4 can be drawn out via the Shottky diodes Dg1, Dg2 when the MOS-FETs Q3, Q4 are turned OFF.

Specifically, in this case, the charges in the gate input capacitances are discharged respectively through the path of the Shottky diode Dg (Dg1, Dg2)→secondary winding N2→smoothing capacitor $C_0$. The discharge of the charges accumulated in the input capacitances ensures that the voltage fall time at the times of turning-OFF of the MOS-FETs Q3, Q4 can be reduced.

When the voltage fall time at the times of turning-OFF of the MOS-FETs can be reduced in this manner, the MOS-FETs Q3, Q4 can be turned OFF assuredly and good switching characteristics can be obtained.

Incidentally, the operations under a light load ($P_0 = 25$ W) of the circuit shown in FIG. 8 are the same as in the case of FIG. 6, and, therefore, an illustration thereof is omitted.

Besides, as a comparison of the power circuit of FIG. 8 configured as above-described with the related-art example, the characteristic of AC→DC power conversion efficiency ($\eta$AC→DC) against variations in load power is substantially the same as in FIG. 7, and, therefore, an illustration thereof is omitted.

Figure 10:
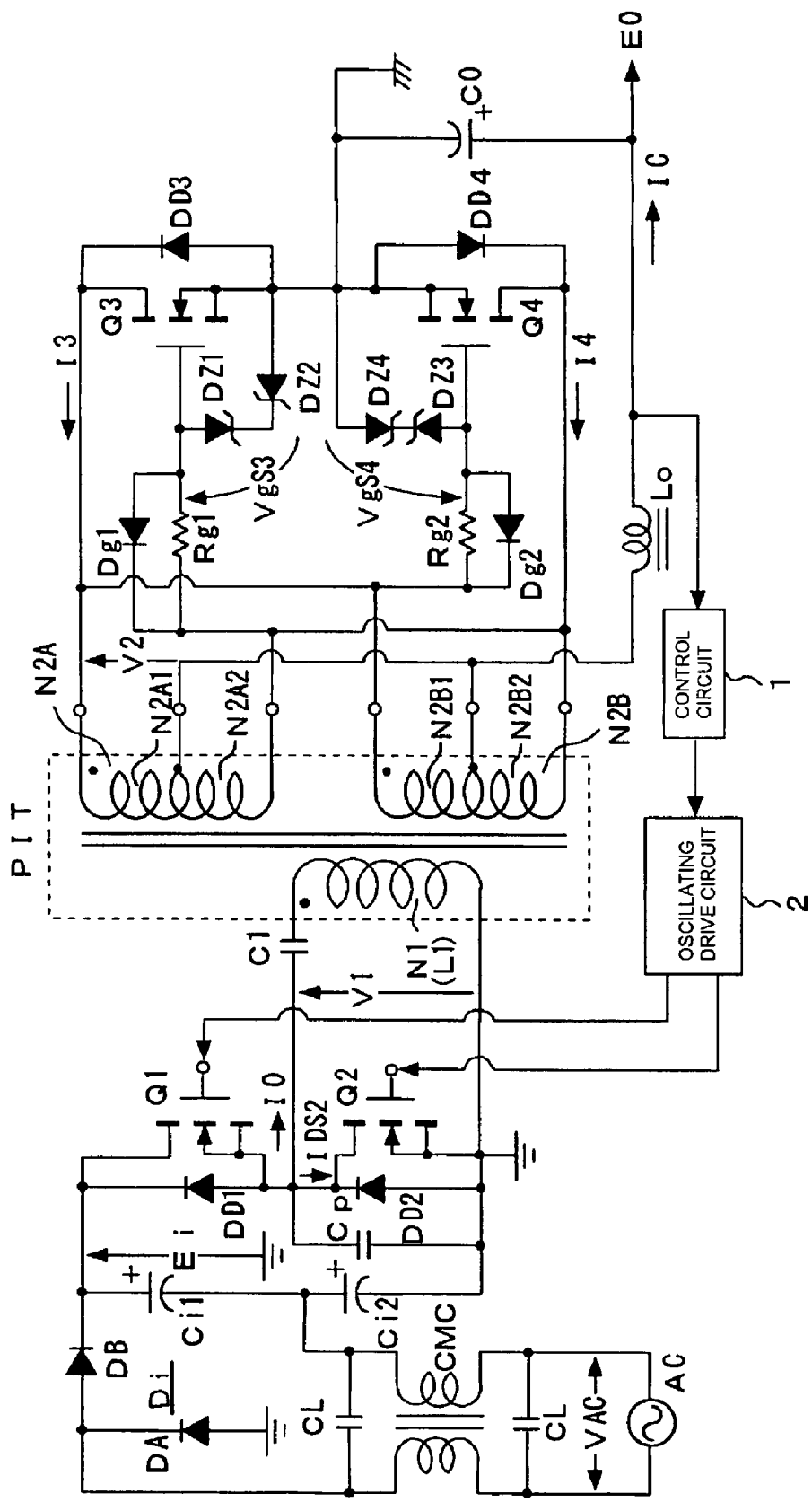
FIG. 10 is a circuit diagram showing a configuration example of a switching power circuit as a third embodiment of the present invention.

In the next place, the configuration of a switching power circuit as a third embodiment of the present invention is shown in FIG. 10.

Incidentally, in FIG. 10, the portions which have been described referring to FIG. 1 above are denoted by the same symbols as used above, and description thereof will be omitted.

The switching power circuit according to the third embodiment is obtained by removing the inductors Ld1, Ld2 from the configuration of the power circuit according to the second embodiment shown in FIG. 8.

Only the inductor $L_0$ is provided as the inductor inserted in the secondary-side rectified current path and, in addition, the inductance of the inductor $L_0$ is set at 0.6 μH, which is higher than that in the case of FIG. 8.

Figure 11:
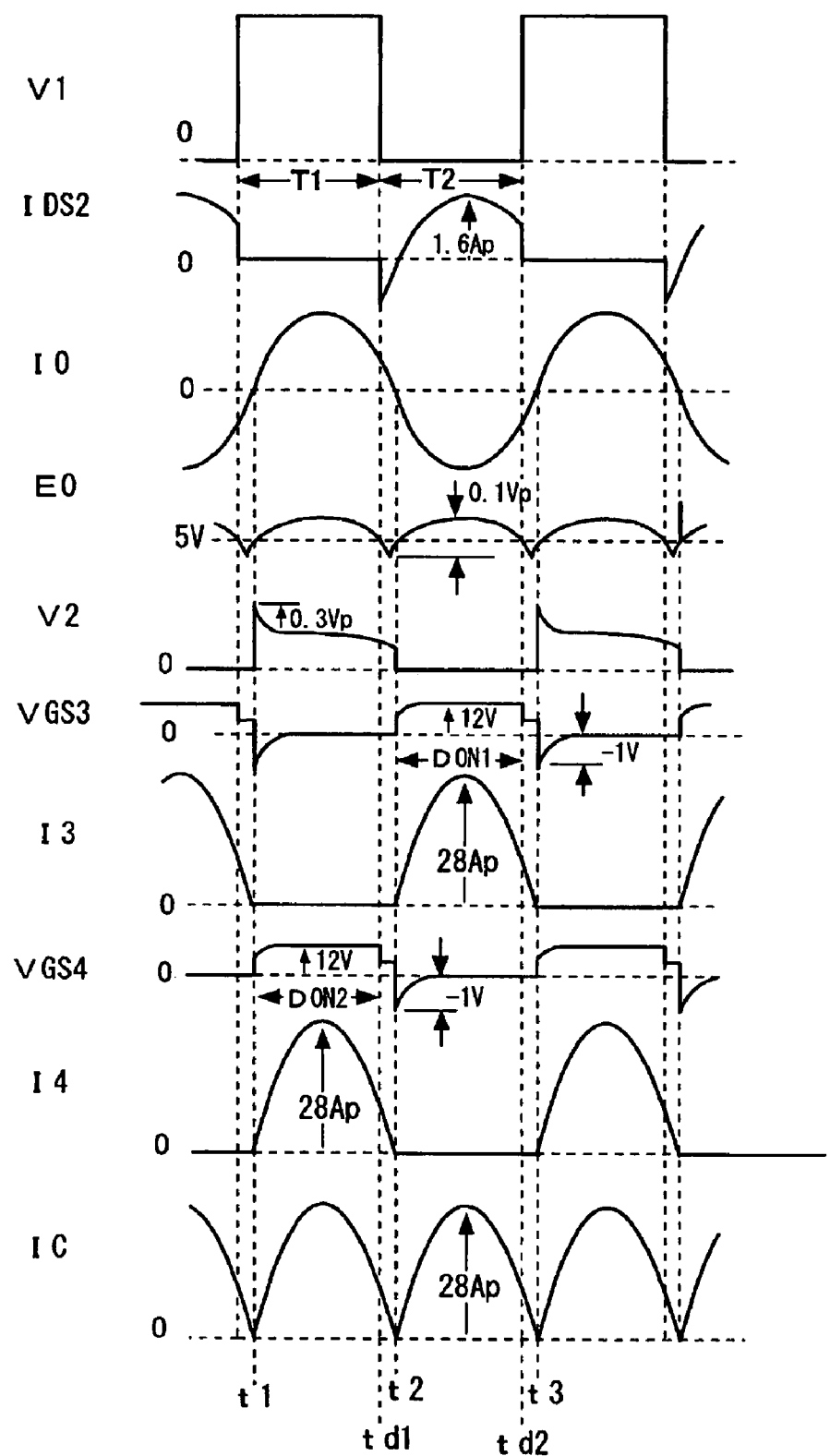
FIG. 11 shows waveform diagrams showing the operation of the power circuit shown in FIG. 10 at the time of a heavy load.

FIG. 11 shows operation waveforms of individual components in the power circuit of the third embodiment.

With the inductor $L_0$ having an inductance set to be higher than that in the case of FIG. 8, the secondary-side DC output voltage $E_0$ in this case is deprived of the high-frequency wave components which would be generated at the times of turning-OFF of the MOS-FETs Q3, Q4.

In other words, in this case, the inductance of the inductor $L_0$ is set at a higher level so that the high-frequency wave suppressing effect offered by the inductor $L_0$ will be higher, as compared with the case of FIG. 8.

Incidentally, experimental results show that, in this case, the negative voltages generated respectively in the gate-source voltages VGS3, VGS4 at the times of turning-OFF of the MOS-FETs Q3, Q4 are lowered to −1 V, as shown in the figure.

This is considered to be due to the fact that, since the inductance of the inductor $L_0$ is set at a higher level, the back electromotive force generated in the inductor $L_0$ is raised, as compared with the case of FIG. 8, and, attendant on this, the level of the rectified currents corresponding to the above-mentioned negative voltages and flowing through the rectified current paths is suppressed.

Thus, according to the third embodiment, the inductance of the inductor $L_0$ is set to be higher than that in the case of FIG. 8, whereby the high-frequency wave components which would otherwise be generated in the secondary-side DC output voltage $E_0$ can be removed.

Besides, in this case also, the reverse-direction currents which would be generated in the rectified currents I3, I4 are suppressed by the back electromotive force generated in the inductor $L_0$. In this case, as above-mentioned, by setting the inductance of the inductor $L_0$ at 0.6 µH, it is possible to prevent the reverse-direction currents from being generated in the rectified currents I3, I4.

In short, according to the third embodiment as above, it is possible to contrive a reduction in the reactive power in the synchronous rectification circuit in the same manner as in the case of the circuit of FIG. 8, and, simultaneously, it is possible to remove the high-frequency wave component which would otherwise be generated in the secondary-side DC output voltage $E_0$.

Furthermore, in this case, the need for the inductors Ld1, Ld2 can be eliminated; therefore, it is possible to contrive a reduction in the number of component parts and a reduction in the mounting areas of the component parts on the printed wiring board, as compared with the configuration of FIG. 8.

Figure 12:
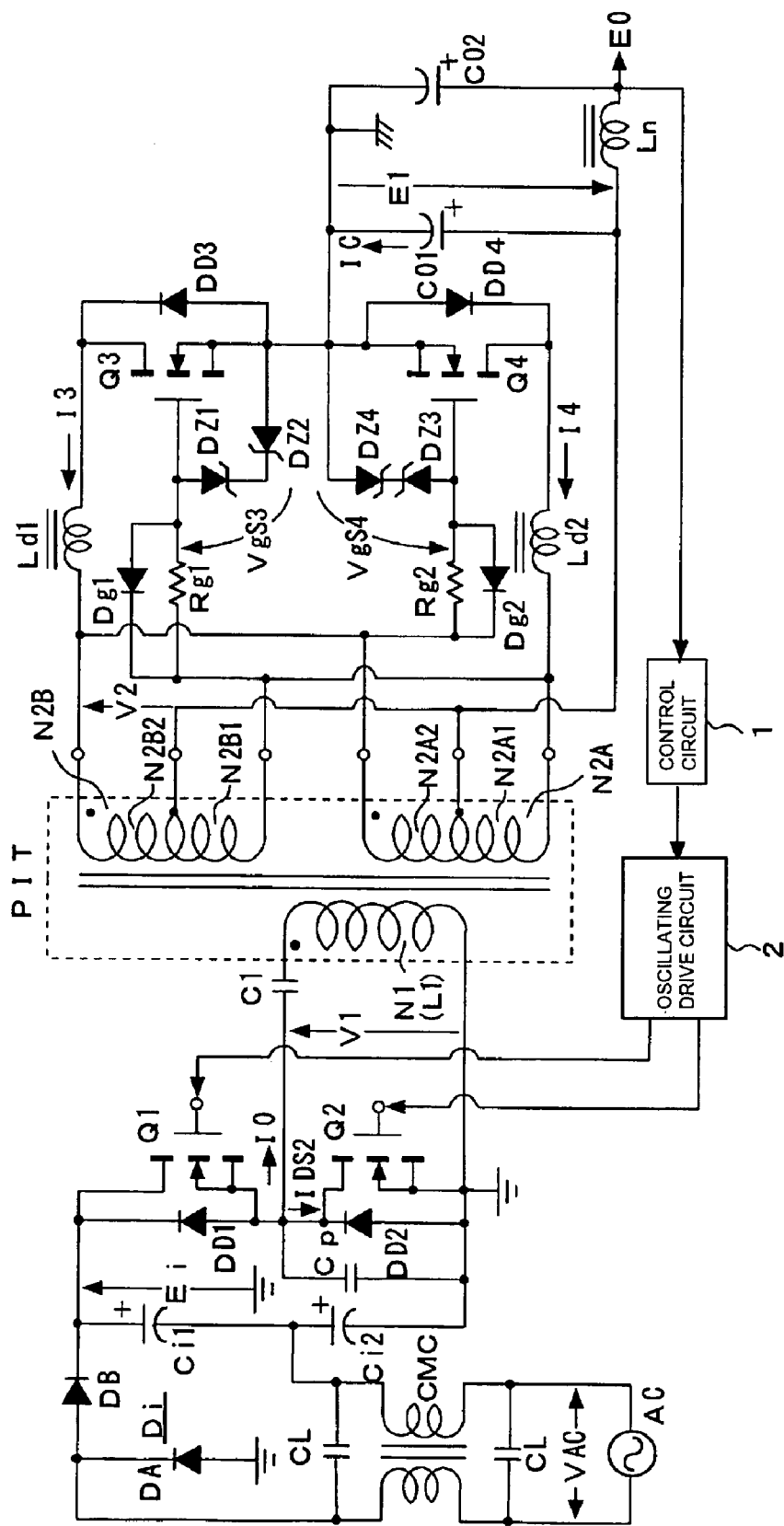
FIG. 12 is a circuit diagram showing a configuration example of a switching power circuit as a fourth embodiment of the present invention.

FIG. 12 shows a configuration example of a switching power circuit as a fourth embodiment of the present invention. Incidentally, in FIG. 12, the portions which have been described referring to FIG. 1 above are denoted by the same symbols as used above, and description thereof will be omitted.

In the switching power circuit in this case, the above-described smoothing capacitor $C_0 1$ as well as a filter circuit composed of a smoothing capacitor $C_0 2$ and a choke coil Ln is formed, for the line of the above-mentioned secondary DC output voltage $E_0$.

The filter circuit is formed by connecting one end of the choke coil Ln to the positive terminal of the smoothing capacitor $C_0 1$, connecting the positive terminal of the smoothing capacitor $C_0 2$ to the other end of the choke coil Ln, and connecting the negative terminal of the smoothing capacitor $C_0 2$ to the secondary-side earth, as shown in the figure.

According to this form of connection, a parallel connection circuit of the smoothing capacitor $C_0 1$ and the smoothing capacitor $C_0 2$ is formed, and the choke coil Ln is inserted between the respective positive terminals of these smoothing capacitors $C_0 1$, $C_0 2$.

In short, in the circuit shown in FIG. 12, a so-called π type filter composed of C, L, C is provided, for the line of the secondary-side DC output voltage $E_0$.

Here, the filter circuit is thus provided for the line of the secondary-side DC output voltage $E_0$, on the following ground.

As has been described above, in the fundamental configuration of FIG. 12, the Shottky diode Dg has been connected to each of the gates of the MOS-FETs Q3, Q4. This makes it possible to obtain good turning-OFF characteristics of each MOS-FET by forcibly drawing off the charges accumulated in the gate input capacitance at the time of turning-OFF of the MOS-FET.

However, where the Shottky diode Dg is provided, good turning-OFF characteristics of the MOS-FET can be obtained, but, on the other hand, switching noises are liable to be generated in the secondary-side rectified current path. Under the effect of the switching noises, high-frequency noises are liable to be superposed on the secondary-side DC output voltage $E_0$.

In view of this, in the circuit of FIG. 12, the above-mentioned π type filter is provided, to thereby contrive suppression of the noises which would be generated in the secondary-side DC output voltage $E_0$.

Incidentally, in the filter circuit in this case, the smoothing capacitor $C_0 1$ and the smoothing capacitor $C_0 2$ are each composed, for example, of an amidine-based aluminum electrolytic capacitor selected to have, for example, a capacitance of C=6800 µF, a voltage resistance of 6.3 V, and an ESR (equivalent series resistance) of not more than 15 mΩ.

Furthermore, the choke coil Ln is set to have, for example, a DCR (DC resistance) of about 1 mΩ and an inductance L of about 0.7 µH.

By this configuration, the peak level of the high-frequency noises generated in the secondary-side DC output voltage $E_0$ is suppressed to 100 mV or below.

Figure 13:
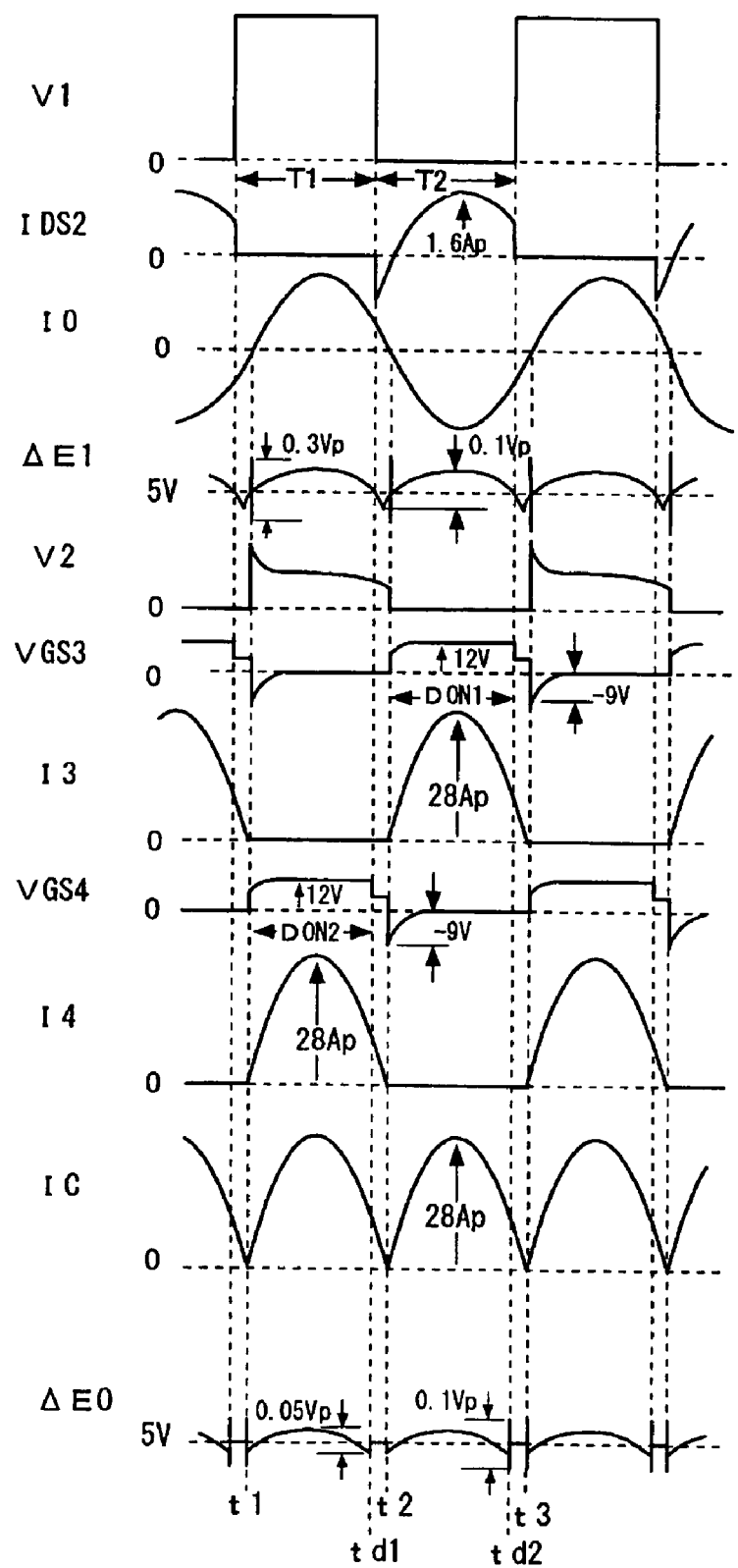
FIG. 13 shows waveform diagrams showing the operation of the power circuit shown in FIG. 12 at the time of a heavy load.
Figure 14:
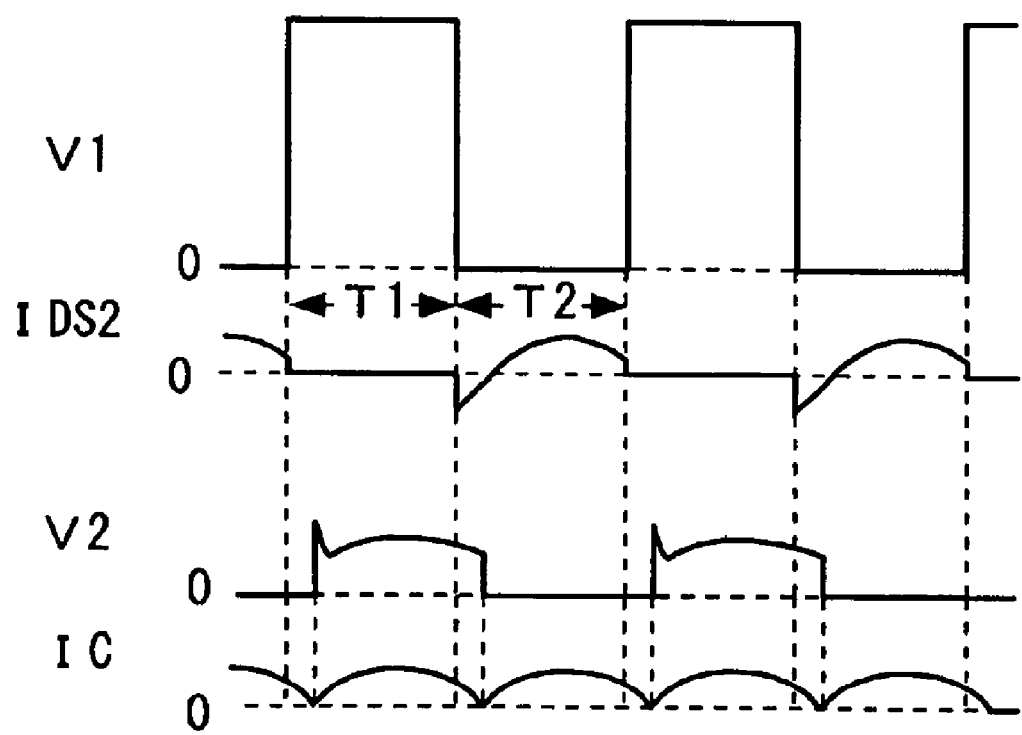
FIG. 14 shows waveform diagrams showing the operation of the power circuit shown in FIG. 12 at the time of a light load.

Operation waveforms of the power circuit shown in FIG. 12 configured as above are shown in FIGS. 13 and 14. FIG. 13 shows the operations under an AC input voltage VAC=100 V and a load power $P_0$=100 W, whereas FIG. 14 shows the operations under an AC input voltage VAC=100 V and a load power $P_0$=25 W. In the load power range with which the power circuit shown in FIG. 12 can cope, the load power $P_0$=100 W is a heavy load condition, while the load power $P_0$=25 W is a light load condition.

In the waveform diagrams shown in FIG. 13, the end-to-end voltage V1 of the switching device Q2 corresponds to the ON/OFF states of the switching device Q2. Specifically, the end-to-end voltage V1 assumes a rectangular wave being at zero level over the period T2 for which the switching device Q2 is ON and being clamped at a predetermined level over the period T1 for which the switching device Q2 is OFF. As for a switching current IDS2 flowing through the switching device Q2//damper diode DD2, a waveform is obtained in which the current flows through the damper diode DD2 in negative polarity at the time of turning ON and is then inverted to positive polarity to flow through the drain→source of the switching device Q2, as shown in the period T2, and the current is at zero level due to the OFF condition during the period T1.

In addition, the switching device Q1 performs switching so as to be turned ON/OFF alternately relative to the switching device Q2. Therefore, though not shown, a switching current flowing through the switching device Q1//damper diode DD1 assumes a waveform with a phase shift of 180° relative to the switching current IDS2. Besides, the end-to-end voltage of the switching device Q1 assumes a waveform with a phase shift of 180° relative to the end-to-end voltage V1 of the switching device Q2.

Then, a primary-side series resonance current $I_0$ flowing through a primary-side series resonance circuit (C1-L1) connected between the switching output point of the switching devices Q1, Q2 and the primary-side earth is obtained by composition of the switching current IDS1 and the switching current IDS2. As a result, the primary-side series resonance current $I_0$ takes the form of a sinusoidal waveform, as shown in the figure. A comparison of this waveform with the waveform (see FIG. 28) of the primary-side series resonance current $I_0$ in the related-art power circuit shown in FIG. 27 shows that the primary-side series resonance current $I_0$ in the case of the circuit of FIG. 12 does not substantially contain a sawtooth wave component which might be generated due to the excitation inductance of the primary winding N1. This is because the coupling coefficient of the insulated converter transformer PIT is set into a more loose coupling condition, whereby the leakage inductance L1 of the primary winding N1 is increased and, accordingly, the excitation inductance of the primary winding N1 is reduced relatively.

As the waveform of the primary-side series resonance current $I_O$ is obtained, the voltage V2 obtained at the winding portion N2B2 of the secondary winding N2B assumes a waveform which accords to the cycle period of the primary-side series resonance current $I_O$ and which is clamped at an absolute value level corresponding to the secondary-side DC output voltage $E_O$.

Incidentally, while the voltage V2 is shown as the potential obtained at the winding portion N2B2, a potential with an equivalent waveform is generated also at the winding portion N2A2 of the secondary winding N2A. Besides, in this case, a potential equivalent to the voltage V2 is generated also at each of the winding portion N2A1 and the winding portion N2B1.

Here, as understood from comparison with the voltage V2 shown in FIG. 28, the voltage V2 shown in FIG. 13 assumes a waveform which is similarly brought to zero level at the timings when the primary-side series resonance current $I_O$ is brought to zero level. Namely, the zero crossing timings of the voltage V2 in this case coincide with the zero crossing timings of the primary-side series resonance current $I_O$ (see time points t1, t2, and t3 in the figure).

Then, in a synchronous rectification circuit on the secondary side based on the voltage detection system, the above-mentioned voltage V2 (the winding portions N2A2, N2B2) is detected by a drive circuit composed of a resistor Rg2, and a gate voltage on an ON level is outputted to a MOS-FET Q4.

In this case, the voltage V2 takes a waveform which reaches a peak level in positive polarity at the time point t1, is then gradually lowered in level and comes to zero level at the time point t2, as shown in the figure. The gate-source voltage VGS4 generated between the gate and the source of the MOS-FET Q4 generates an ON voltage during the period (the period t1-td1) for which the voltage V2 is kept at or above a level corresponding to a predetermined level determined as the gate-source potential of Q4. Namely, this period t1-td1 is the ON period DON2 of the MOS-FET Q4.

Then, the period from the time point td1 when the period DON2 ends to the time point t2 is a dead time of the MOS-FET Q4, and a rectified current flows via the body diode DD4 of Q4 during this dead time period td1-t2. This is indicated also by the potential during the period td1-t2 of the gate-source voltage VGS4 shown in the figure.

This ensures that the rectified current I4 flowing through the MOS-FET Q4 flows over the period from time point t1 to time point t2, as shown in the figure. In short, the zero crossing timings of the rectified current I4 coincide with the zero crossing timings of the primary-side series resonance current $I_O$ at these time points t1 and t2, so that the rectified current I4 is continuous with the primary-side series resonance current.

Besides, in a drive circuit composed of a resistance Rg1, similarly, a voltage generated at the winding portions N2A1, N2B1 which is equivalent to the above-mentioned voltage V2 is detected, and a gate voltage at an ON level is outputted to a MOS-FET Q3.

Specifically, in this case, the gate-source voltage VGS3 generated between the gate and the source of the MOS-FET Q3 generates an ON voltage during the period (the period t2-td2 in the figure) for which the voltage V2 generated on the side of the winding portions N2A1, N2B1 is kept at or above a level corresponding to a predetermined level as the gate-source potential, and, accordingly, this period t2-td2 is the ON period DON1 of the MOS-FET Q3.

Besides, the period from the time point td2 when the period DON1 ends to a time point t3 is a dead time of the MOS-FET Q3, and a rectified current flows via the body diode DD3 of Q3 during the period td2-t3.

This ensures that a rectified current I3 flowing via the MOS-FET Q3 flows over the period from the time point t2 to the time point t3, which are the zero crossing timings of the primary-side series resonance current $I_O$, as shown in the figure; thus, the rectified current I3 is continuous with the primary-side series resonance current $I_O$.

A charging current Ic for each smoothing capacitor (the smoothing capacitors $C_O1$, $C_O2$) assumes a waveform obtained by composition of the rectified currents I3 and I4, as shown in the figure. In short, it is seen that, as a rectifying operation, a full-wave rectification operation is obtained in which the smoothing capacitor $C_O$ is charged during each of the periods when the voltages generated at the secondary windings N2A, N2B are positive/negative.

Besides, as has been described above, the voltage V2 generated at the secondary winding in this case is brought to zero level as the primary-side series resonance current $I_O$ is brought to zero level, and, therefore, the voltage V2 is continuous with the primary-side series resonance current. Furthermore, the continuity of the voltage V2 ensures that the rectified current I3 and the rectified current I4 are also continuous in the manner mentioned above, and, accordingly, the charging current Ic for the smoothing capacitor $C_O$ also flows continuously.

In short, in the circuit of FIG. 12, the continuous mode of the secondary-side rectified current is obtained even when a heavy load exists and such a control as to lower the switching frequency is being performed. Incidentally, in this case, the rectified currents I3 and I4 are 28 Ap, which is lower than the value of the related-art rectified currents I1, I2 shown in FIG. 28, for example. This is because the conduction period of the rectified current during the cycle period corresponding to the equivalent switching frequency is enlarged as compared with the related art, for example.

The reason why the continuous mode is obtained even under the heavy load condition lies in that, as understood from the above description, the gap length is so set as to lower the coupling coefficient of the insulated converter transformer PIT to about 0.8, thereby obtaining a more loose coupling condition, and, for example, the numbers of turns of the primary winding N1 an the secondary winding N2A (the winding portions N2A1, N2A2) and the primary winding N2B (the winding portions N2B1, N2B2) are so set as to lower the level of the voltage induced per T (turn) of the secondary winding to about 2 V/T, thereby lowering the magnetic flux density generated in the core of the insulated converter transformer PIT to or below a required level.

Besides, in FIG. 13, it is seen that no reverse-direction current is generated in the rectified currents I3, I4 in this case, as seen from comparison with the related-art rectified currents I1, I2 shown in FIG. 28.

In short, in the related art, reverse-direction currents of 8 Ap would flow in the rectified currents I1, I2 with the result of a power loss, whereas in the circuit of FIG. 12, such reverse-direction currents would not be generated in the rectified currents.

In this case, generation of reverse-direction currents in the rectified currents I3, I4 is prevented by the insertion of the inductors Ld1, Ld2 in the rectified current paths as shown in FIG. 12.

Where the inductor is inserted in each rectified current path, a back electromotive force is generated in the inductor when a rectified current flows. Then, attendant on the generation of the back electromotive force, the reverse-direction currents which would be generated at the times of turning-OFF of the MOS-FETs Q3, Q4 are suppressed.

As has been mentioned above, in the case of the circuit shown in FIG. 12, the inductors Ld1, Ld2 are made to have an inductance of about 0.6 µH, whereby it is possible to prevent reverse-direction currents from being generated in the rectified currents I3, I4.

Here, as has also been described referring to the related art, the synchronous rectification circuit uses the low-ON-resistance low-voltage-resistance MOS-FETs as rectifying devices, so that conduction loss can be reduced, as compared with the case where diode devices are used as rectifying devices.

However, in the case where the secondary-side rectified current flows in a discontinuous mode and where a winding voltage detection system is adopted for the synchronous rectification circuit, a reverse-direction current flows even after the charging current for the smoothing capacitor $C_0$ is brought to zero level, leading to the generation of reactive power.

In order to dissolve the reactive power, a synchronous rectification circuit based on the rectified current detection system is possibly adopted. However, in the rectified current detection system, a drive circuit system including a comparator and a current transformer and the like are needed, rendering the circuit configuration complicated and larger in scale.

On the other hand, in the circuit of FIG. 12, the secondary-side rectified current is kept in the continuous mode even under a heavy load, whereby the reactive power during the current discontinuity period as above-mentioned can be reduced, notwithstanding the synchronous rectification circuit based on the voltage detection system. Furthermore, in this case, the inductors Ld1, Ld2 are inserted respectively in the rectified current paths on the secondary side as above-described, whereby the generation of reverse-direction currents in the rectified currents is obviated, thereby contriving a further reduction of the reactive power.

This means that, in the basic configuration of FIG. 12, a configuration based on the voltage detection system is adopted as the synchronous rectification circuit, whereby the circuit configuration is simplified, an enlargement of the circuit scale is restrained, a rise in cost is obviated, and, similarly, the problem of the lowering in power conversion efficiency due to the reactive power during the current discontinuity period is solved.

Besides, in FIG. 13, a ripple component $\Delta E_0$ generated in the secondary-side DC output voltage $E_0$ is shown.

The ripple component $\Delta E_0$ in this case is generated in the range of 0.05V, with the center thereof being at 5 V, which is the output level of the secondary-side DC output voltage $E_0$, as shown in the figure. Besides, in the secondary-side DC output voltage $E_0$, noise components generated during the periods corresponding to the times of turning-OFF of the MOS-FET Q3, Q4 are generated at a level of 0.1 Vp, as seen from this figure.

Here, in FIG. 13, the waveform of a ripple component $\Delta E1$ in the end-to-end voltage E1 of the smoothing capacitor $C_01$ is also shown. As seen from the waveform of $\Delta E1$, noise components are generated, at a level of 0.3 Vp, in the end-to-end voltage E1 of the smoothing capacitor $C_01$ during the periods corresponding to the times of turning-OFF of the MOS-FETs Q3, Q4. This shows that noises at a level of 0.3 Vp are generated in the line of the secondary-side DC output voltage $E_0$ at the stage precedent to a π type filter (in the case where the π type filter is not provided).

From this point of view, it is understood that, in the circuit of FIG. 12 in which the π type filter is provided for the line of the secondary-side DC output voltage $E_0$, the noise component at a level of 0.3 Vp which would be generated in the secondary-side DC output voltage $E_0$ can be reduced to 0.1 Vp (100 mVp).

Incidentally, in FIG. 13, a negative potential of –9 V in this case is generated in the gate-source voltages VGS3, VGS4 at the timings of the turning-OFF of the MOS-FETs Q3, Q4; as has been described above, this is due to the insertion of the Shottky diodes Dg1, Dg2 respectively in parallel to the resistors Rg1, Rg2, between the gates of the MOS-FETs Q3, Q4 and the secondary winding.

The insertion of the Shottky diodes Dg1, Dg2 ensures that, at the times of turning-OFF of the MOS-FETs Q3, Q4, the charges accumulated in the gate input capacitances (Ciss) of the MOS-FETs Q3, Q4 can be drawn off via the Shottky diodes Dg1, Dg2.

Specifically, the charges in the gate input capacitances are discharged respectively through the path of the Shottky diode Dg (Dg1, Dg2)→secondary winding N2→smoothing capacitor $C_0$. The discharge of the charges accumulated in the input capacitances makes it possible to reduce the voltage fall time at the times of turning-OFF of the MOS-FETs Q3, Q4.

Where the voltage fall time at the times of turning-OFF of the MOS-FETs can be reduced in this manner, the MOS-FETs Q3, Q4 can be turned OFF assuredly and good switching characteristics can be obtained.

FIG. 14 shows operations under a light load ($P_0$=25 W) of the circuit shown in FIG. 12.

In the power circuit shown in FIG. 12, a constant voltage control based on a switching frequency control is performed for stabilization of the secondary-side DC output voltage $E_0$, as understood from the above description. The constant voltage control resides in an operation in which, when a light load condition comes to exist and the secondary-side DC output voltage is raised, the switching frequency is enhanced so as to lower the secondary-side DC output voltage, thereby contriving stabilization.

Under such a light load condition, the secondary-side winding voltage V2 is obtained at substantially the same timing as the end-to-end voltage V1 of the switching device Q2 shown in the figure, and, accordingly, the charging current Ic (the rectified currents I3, I4) on the secondary side charges the smoothing capacitor $C_0$ continuously, without any rest period, as shown in the figure.

From this it can be understood that, in the power circuit shown in FIG. 12, the continuous mode is obtained even under a light load.

Figure 15:
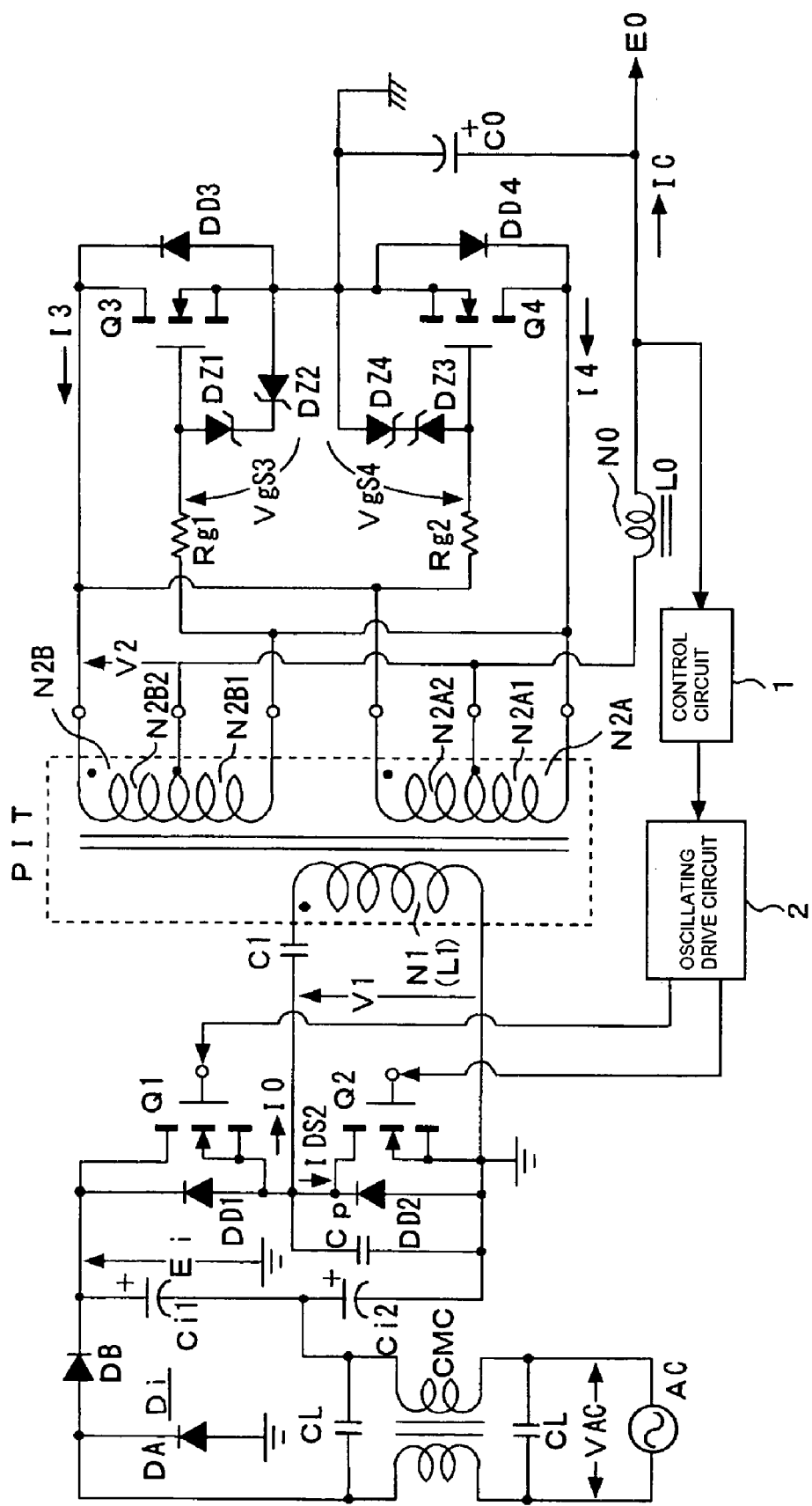
FIG. 15 is a circuit diagram showing a configuration example of a switching power circuit as a fifth embodiment of the present invention.

In consideration of the above points, according to a fifth embodiment of the present invention, a switching power circuit is configured as shown in FIG. 15.

Incidentally, in this figure, the portions which have been described above referring to FIG. 12 are denoted by the same symbols as used above, and description thereof will be omitted.

As shown in FIG. 15, in the fifth embodiment, the inductors Ld1, Ld2 composed of bead cores which have been inserted in the rectified current paths in the circuit of FIG. 12 are removed.

Besides, the Shottky diode Dg1 and the Shottky diode Dg2, which constitute the reason why the π type filter is provided as has been described above, are also removed.

In addition, the π type filter is removed.

In this case, as a substitute for the inductors Ld1, Ld2, a choke coil $L_0$ is inserted in series between the center taps of the secondary windings N2A, N2B and the positive terminal of the smoothing capacitor $C_0$, as shown in the figure.

Namely, in the switching power circuit according to the fifth embodiment, the generation of reverse-direction currents in the rectified currents is prevented by a back electromotive force generated in the choke coil $L_0$.

It should be noted here, however, if the choke coil $L_0$ is selected without consideration about the variations in the inductance value with variations in the load current level, the inductance value may be abruptly raised at the time of a light load, with the result of an abnormal oscillating operation, in the same manner as in the case of the inductance Ld in the circuit shown in FIG. 12 above.

Figure 16:
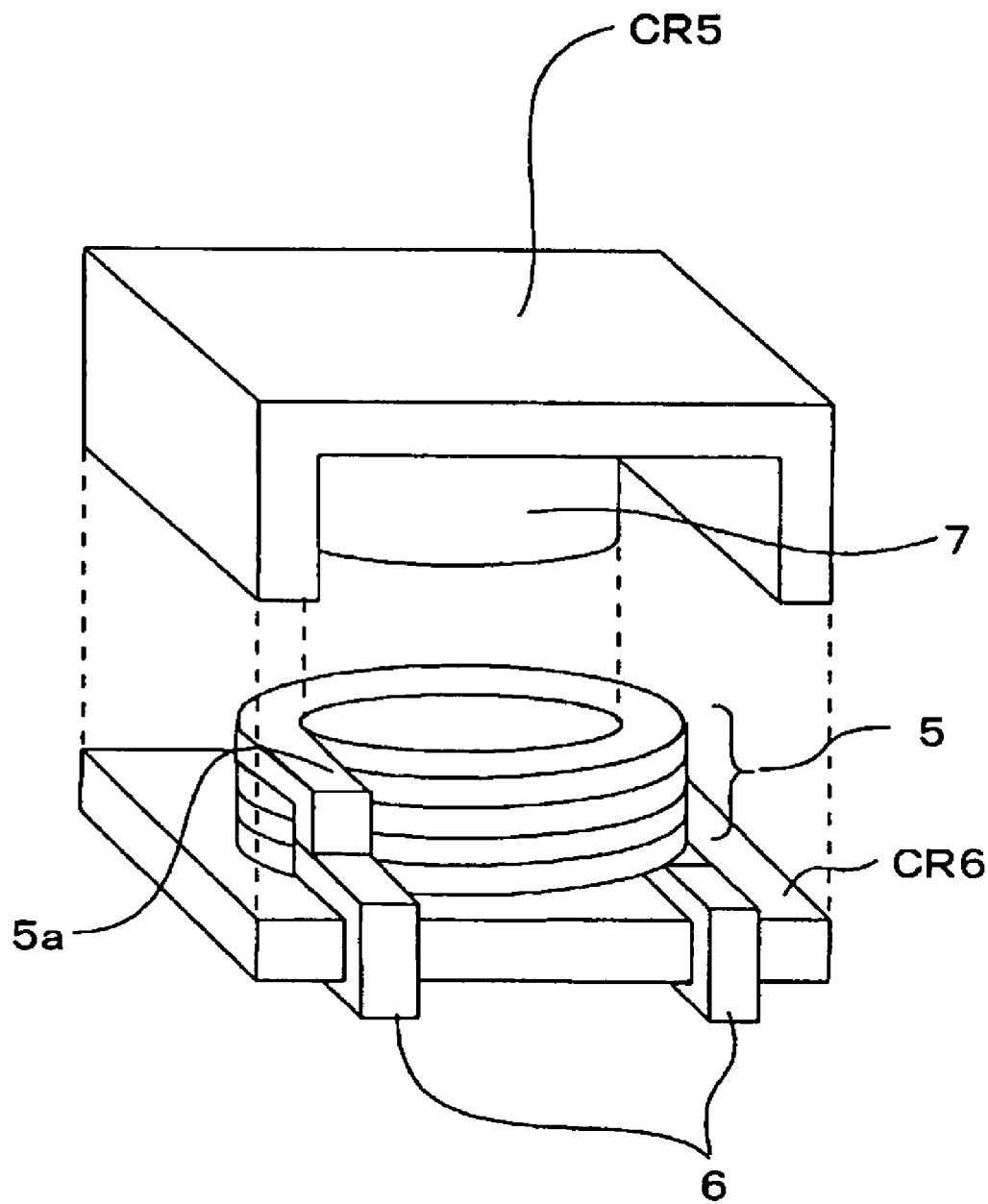
FIG. 16 is an exploded perspective view showing the structure of a choke coil which is provided on the secondary side of the switching power circuit according to the fifth embodiment.

In order to prevent this trouble, in the fifth embodiment, the choke coil $L_0$ is configured as shown in FIG. 16.

FIG. 16 is an exploded perspective view showing the structure of a choke coil $L_0$ to be used in the power circuit according to the fifth embodiment.

First, as the choke coil $L_0$ in this embodiment, a rectangular wire coil 5 formed by winding a rectangular wire 5a a predetermined number of turns as shown in the figure is used. As the rectangular wire coil 5, there is adopted a coil of the so-called edgewise winding (longitudinal winding) in which the rectangular wire 5a square in sectional shape is wound in the width direction thereof.

Both ends of the rectangular wire coil 5 are connected, by soldering or the like, to external terminals 6 provided on a plate-type core CR6 on which to mount the rectangular wire 5, as shown in the figure.

Furthermore, a pot-type core CR5 shaped as shown in the figure is fitted into the plate-type core CR6 on which the rectangular wire coil 5 is mounted, whereby the choke coil $L_0$ is formed. Specifically, the pot-type core CR5 is fitted into the plate-type core CR6 in such a manner that a circular magnetic leg 7 formed on the side of the pot-type core CR5 as shown is passed through a circular void region formed on the inside of the rectangular wire coil 5.

In the choke coil $L_0$ shown in FIG. 16, the pot-type core CR5 is formed from a metal-based dust. On the other hand, the plate-type core CR6 is formed from a Ni—Zn based ferrite material.

In this embodiment, the metal-based dust and/or the Ni—Zn based ferrite is selected as the core material(s) for the choke coil $L_0$, whereby saturation magnetic flux density is enhanced, as compared with the case of using an ordinary manganese-based ferrite, for example; accordingly, the choke coil $L_0$ can be enhanced in the characteristic of variation in inductance against variation in current level.

Experiments have shown that in the choke coil $L_0$ in this example configured as above, the inductance value can be substantially constant at 0.7 μH against variations in the load current (current Ic) in the circuit of FIG. 15 in the range of 20 to 0 A.

Furthermore, in the choke coil $L_0$ of FIG. 16, by the use of the rectangular wire 5a as a winding as above-mentioned, the sectional area of the winding is increased and DCR (DC resistance) can be reduced, as compared with an ordinary copper wire with a circular sectional shape, for example. In addition, by the use of the Ni—Zn based ferrite as above-mentioned, a reduction in the iron loss of the core is contrived.

As a result of these, the choke coil $L_0$ in this case has a DC resistance of about 1.1 mΩ.

Meanwhile, where the thus configured choke coil $L_0$ is inserted to be connected to the center taps of the secondary windings in the insulated converter transformer PIT as shown in FIG. 15, the leakage inductance due to the choke coil $L_0$ leads to an increase in the leakage inductance in the insulated converter transformer PIT. In other words, the insertion of the choke coil $L_0$ leads to a variation in the magnetic flux density in the insulated converter transformer PIT.

Here, as has been described above, in the circuit of FIG. 12, the gap length (leakage inductance) in the insulated converter transformer PIT and the settings of the numbers of turns of the secondary windings (the setting of the voltage induced per turn (T)) have been so selected that the magnetic flux density is not more than a predetermined value and the continuous mode is achieved irrespectively of variations in the load.

Taking this into account, in the insulated converter transformer PIT in the circuit of FIG. 15, by reducing the gap length or reducing the numbers of turns of the secondary windings in accordance with the increase in the leakage inductance due to the insertion of the choke coil $L_0$, also, it is possible to obtain a magnetic flux density of not more than a predetermined value for the purpose of keeping the continuous mode.

In view of this, in the power circuit according to the fifth embodiment, the numbers of turns of the secondary windings N2A, N2B in the insulated converter transformer PIT are selected to be smaller than those in the case of the circuit of FIG. 12. In this case, for example, the inductance value of the choke coil $L_0$ is set at about 0.7 μH in the above-mentioned manner, to thereby obtain the settings of the secondary winding N2A=secondary winding N2B=4 T (N2A1=N2A2=N2B1=N2B2=2 T).

Since the numbers of turns of the secondary windings can be reduced in this manner, the DC resistance components of the secondary windings can be lowered.

Figure 17:
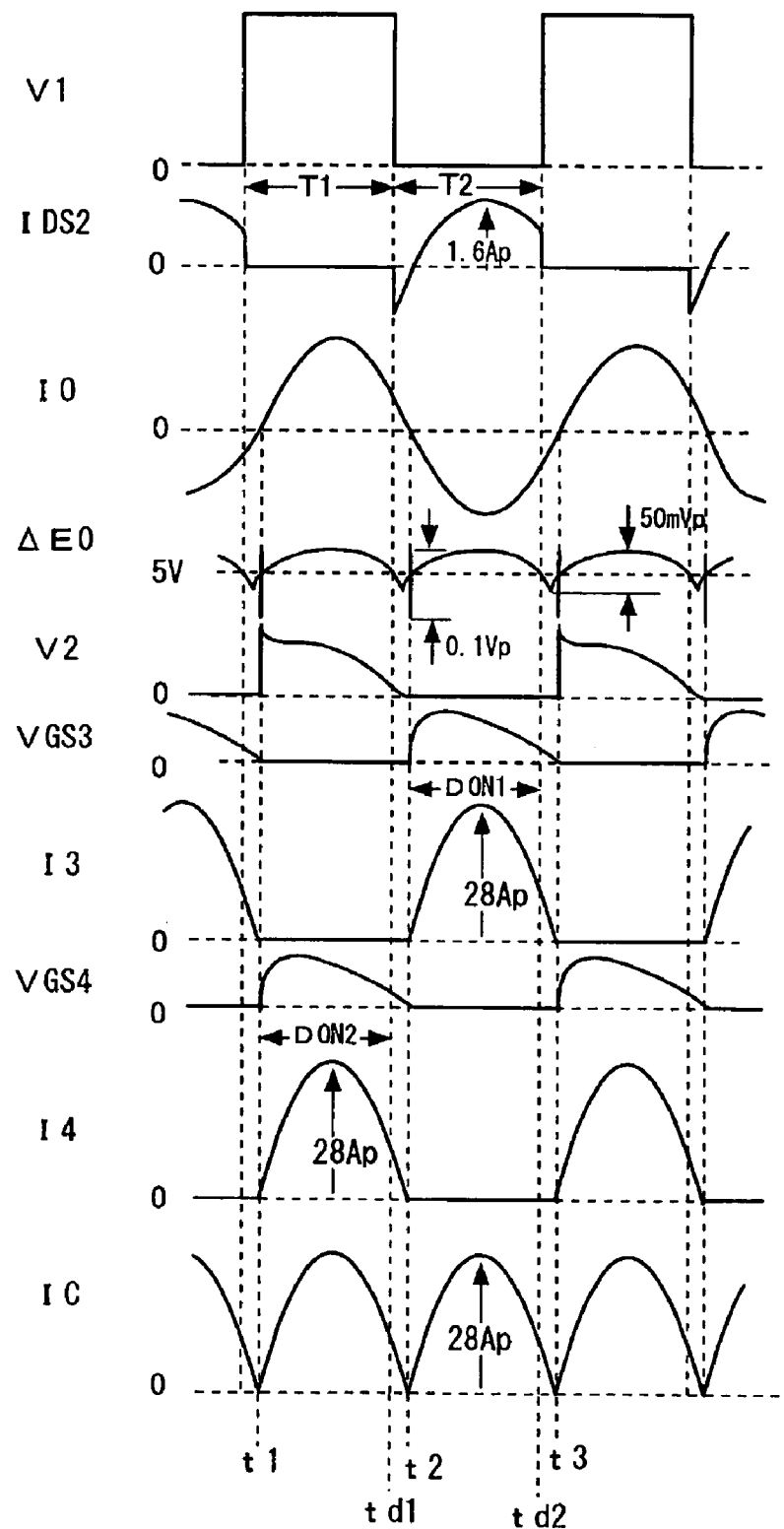
FIG. 17 shows waveform diagrams showing the operation of the switching power circuit in the fifth embodiment at the time of a heavy load.

FIG. 17 shows waveform diagrams showing the operations of the individual portions in the circuit of FIG. 15 as the fifth embodiment.

Incidentally, FIG. 17 shows the results of measurement under the conditions of an AC input voltage VAC=100 V and a load power $P_0$=100 W.

Besides, in obtaining the experimental results shown in the figure, the individual portions were selected as follows.

Insulated converter transformer PIT
Primary winding N1=80 T; Secondary windings N2A=N2B=4 T (N2A1=N2A2=N2B1=N2B2=2 T)
Choke coil $L_0$=0.7 μH
Smoothing capacitor $C_0$
Capacitance C=6800 μF; Voltage resistance 6.3 V; ESR=16 mΩ
MOS-FETs Q3, Q4
Voltage resistance 30 A/20 V; ON resistance RON=2.5 mΩ

First, in FIG. 17 also, there are shown the end-to-end voltage V1 of the switching device Q2, and the switching current IDS2 flowing through the switching device Q2// damper diode DD2.

Concerning the voltage V1 and the switching current IDS2, waveforms equivalent to those in the case of the circuit of FIG. 12 are obtained, as seen from comparison with the case of FIG. 13.

Besides, in FIG. 17, the waveform of the primary-side series resonance current $I_0$ is also shown. The primary-side series resonance current $I_0$ in this case is also obtained with a waveform which is nearly sinusoidal in shape and which crosses the zero level at time points t1, t2, and t3, as shown in the figure. In short, the primary-side series resonance current $I_0$ is also obtained with a waveform equivalent to that in the case of FIG. 13.

From these points it is seen that the same operations as in the case of the circuit of FIG. 12 are obtained on the primary side in the circuit of FIG. 15.

Besides, in this case, the gate-source voltages VGS3, VGS4 generated between the respective gate and source of the MOS-FETs Q3, Q4 are obtained with roughly sinusoidal waveforms, as contrasted to the case of FIG. 13. In addition, the waveforms in this case are free of the negative potentials which have been generated at the timings of turning-OFF of the MOS-FETs Q3, Q4 in the case of FIG. 13.

This is because the Shottky diodes Dg1, Dg2 are omitted in this example as has been described referring to FIG. 15 so that the path for discharging the charges accumulated in the gate input capacitance of each MOS-FET is not formed.

Besides, in this case, the voltage V2 generated at the winding portion N2B2 of the secondary winding N2B is obtained with a waveform different from that in the case of FIG. 13, which is understood also from the fact that the gate-source voltages VGS3, VGS4 are obtained with the different waveforms as above-mentioned.

Specifically, in the case of FIG. 13, the voltage V2 has had a waveform which abruptly drops to zero level at the time point (time point t2) when the dead time of the MOS-FET ends, due to the generation of the negative potential in the gate-source voltages VGS3, VGS4. On the other hand, in this case, a waveform which is gradually lowered to zero level as the levels of the gate-source voltages VGS3, VGS4 are lowered is obtained, as shown in the figure.

In this case also, the zero crossing timings of the voltage V2 coincide with the zero crossing timings of the primary-side series resonance current $I_0$ (see the time points t1, t2, and t3).

Besides, the rectified currents I3, I4 in this case are also obtained with waveforms of which the zero crossing timings coincide with the zero crossing timings of the primary-side series resonance current $I_0$, since the voltage V2 is continuous with the primary-side series resonance current $I_0$ as above-mentioned. Then, since the rectified currents I3, I4 flow continuously with the primary-side series resonance current $I_0$ in this manner, the charging current Ic for the smoothing capacitor $C_0$ also flows continuously with the primary-side series resonance current $I_0$.

From the foregoing it is seen that, also in the circuit of this example shown in FIG. 15, the continuous mode is obtained as to the secondary-side rectified current when a heavy load exists and such a control as to lower the switching frequency is being performed.

Incidentally, in this case also, the experimental results have been obtained in which the rectified currents I3, I4 have a peak level of 28 Ap as shown in the figure, and, like in the case of FIG. 12, the peak level is lower than that of the related-art rectified currents I1, I2 shown in FIG. 28.

Besides, it is seen from FIG. 17 that, in this case also, no reverse-direction current is generated in the rectified currents I3, I4. The reason why no reverse-direction current is generated in the rectified currents I3, I4 in this case lies in that the choke coil $L_0$ is inserted between the center taps of the secondary windings N2A, N2B and the positive terminal of the smoothing capacitor $C_0$, as has been described above.

Incidentally, in this case, the inductance of the choke coil $L_0$ is set at about 0.7 μH as above-mentioned, whereby the generation of reverse-direction currents in the rectified currents I3, I4 can be prevented.

In addition, in FIG. 17, a ripple component $\Delta E_0$ generated in the secondary-side DC output voltage $E_0$ is shown.

As is understood from comparison of the ripple component $\Delta E_0$ shown in FIG. 17 with the ripple component $\Delta E_0$ shown in FIG. 13, the ripple component $\Delta E_0$ in the circuit of FIG. 15 is suppressed to $\Delta E_0$=0.05 Vp (50 mVp), which is the same level as in the case of the circuit of FIG. 12 including the π type filter in the line of the secondary-side DC output voltage $E_0$. This is because the choke capacitor $L_0$ in this example is inserted so as to be connected to the positive terminal of the smoothing capacitor $C_0$, as shown in FIG. 15.

In short, by the insertion of the choke coil $L_0$ so that the choke coil $L_0$ is connected to the positive terminal of the smoothing capacitor $C_0$, a filter circuit is formed by the inductance of the choke coil $L_0$ and the capacitance of the smoothing capacitor $C_0$, whereby the ripple component generated in the secondary-side DC output voltage $E_0$ is suppressed.

In addition, as indicated by the waveform of the ripple component $\Delta E_0$, the level of the noise component generated in the secondary-side DC output voltage $E_0$ in this case during the periods corresponding to the times of turning-OFF of the MOS-FETs Q3, Q4 is also suppressed to about 0.1 Vp, in the same manner as in the case of the circuit of FIG. 12.

The reason why the noise components generated in the secondary-side DC output voltage $E_0$ are thus reduced lies in that the Shottky diodes Dg1, Dg2 are omitted, as has been described above.

In addition, the noise components generated in the secondary-side DC output voltage $E_0$ are considered to be suppressed also by the impedance component of the choke coil $L_0$.

Incidentally, it should be noted here for confirmation that, in this case also, the secondary-side winding voltage V2 in the operation under a light load ($P_0$=25 W) is obtained at substantially the same timing as the end-to-end voltage V1 of the switching device Q2, with the result of a continuous mode, in the same manner as in the case of FIG. 13.

Figure 18:
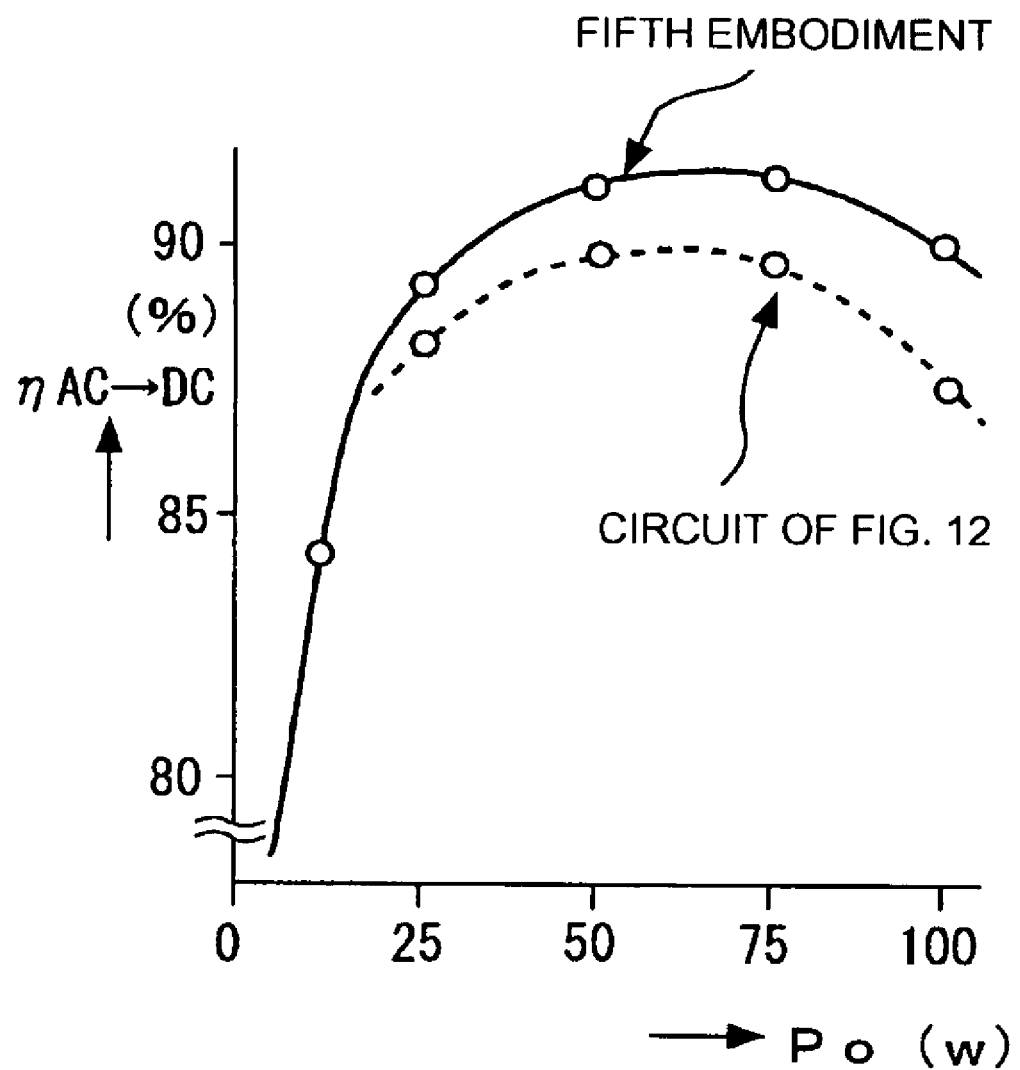
FIG. 18 is a diagram for illustrating the power conversion characteristic, against variations in load, of the switching power circuit as the fifth embodiment.

FIG. 18 shows the characteristic of AC→DC power conversion efficiency (ηAC→DC) against variation in load power, as a comparison of the power circuit in this example shown in FIG. 15 with the basic configuration shown in FIG. 12. Here, the characteristic of the power circuit in this example is indicated by solid line, while the characteristic of the circuit of FIG. 12 is indicated by broken line.

It is seen from FIG. 18 that the AC→DC power conversion efficiency (ηAC→DC) is higher in the circuit of this example than in the circuit of FIG. 12, over the load power range of $P_0$=25 to 100 W.

As has been described above, experimental results have been obtained in which the basic configuration shown in FIG. 12 gives an ηAC→DC of about 86.5% under a load power $P_0$=100 W, and, on the other hand, the power circuit of this example shown in FIG. 15 gives an ηAC→DC of about 88.5% under a load power $P_0$=100 W; thus, an improvement by about 2.0% is obtained according to this example.

Also, experimental results have been obtained in which, under a load power $P_0$=25 W, the circuit of FIG. 12 gives an ηAC→DC of about 87%, and, on the other hand, the circuit of this example gives an ηAC→DC of about 88%, indicating an improvement by about 1.0%.

As is understood from the above description, the improvement in power conversion efficiency arises from the removal of the π type filter which has been provided on the secondary side in the circuit of FIG. 12. Specifically, in this case, at least the smoothing capacitor $C_O2$ is eliminated from the configuration of FIG. 12, and, therefore, the loss can be reduced by an amount corresponding to the ESR of the smoothing capacitor $C_O2$ (for example, 15 mΩ in the case of FIG. 12).

Furthermore, the improvement in power conversion efficiency arises also from the fact that, due to the provision of the choke coil $L_O$, the number of turns of the secondary winding (N2A, N2B) in the insulated converter transformer PIT can be reduced, as compared with the case of FIG. 12.

Specifically, since the number of turns of the secondary winding in this case can be reduced from 6 T, the value in the case of FIG. 12, to 4 T as has been described above, and, accordingly, the length of wire required for the secondary winding can be reduced and the DCR can be lowered. This makes it possible to reduce the power loss generated in the secondary winding, with the result that an enhancement of power conversion efficiency can be contrived.

Thus, in the switching power circuit according to the fifth embodiment, the inductors Ld1, Ld2 composed of the bead cores which have been inserted in the rectified current paths in the circuit of FIG. 12 are eliminated, and, as a substitute for the inductors, the choke coil $L_O$ is inserted between the center taps of the secondary windings N2A, N2B and the smoothing capacitor $C_O$.

In addition, the Shottky diodes Dg1, Dg2 which have been connected respectively in parallel to the gate resistors Rg1, Rg2 are eliminated, and, further, the π type filter which has been provided in the line of the secondary-side DC output voltage $E_O$ is eliminated.

According to the switching power circuit in the fifth embodiment configured in this manner, the choke coil $L_O$ inserted between the center taps of the secondary windings and the smoothing capacitor $C_O$ as above-mentioned makes it possible to prevent the generation of reverse-direction currents in the rectified currents.

In addition, the elimination of the Shottky diodes Dg1, Dg2 as above-mentioned makes it possible to suppress the high-frequency switching noises which would be superposed on the secondary-side DC output voltage $E_O$.

Besides, in the fifth embodiment, the π type filter (the smoothing capacitor $C_O2$) on the secondary side is eliminated as above-mentioned, whereby the power loss which would be generated due to the presence of the π type filter (the loss due to the ESR of the smoothing capacitor $C_O2$) can be precluded.

Furthermore, in the fifth embodiment, the choke coil $L_O$ is inserted so as to be connected to the center taps of the secondary windings as above-mentioned, so that it is possible to reduce the number of turns of the secondary winding in the insulated converter transformer PIT, in setting the magnetic flux density of not more than a predetermined value for the purpose of achieving the continuous mode even under a heavy load. This makes it possible to reduce the DCR of the secondary winding as above-mentioned, and, accordingly, the reactive power in the secondary winding can also be reduced.

By the reduction of the reactive power in this manner, an enhanced power conversion efficiency can be contrived.

In addition, in this case, by the reduction in the DCR of the secondary winding as above-mentioned, heat generation in the secondary winding can also be suppressed.

Besides, in the fifth embodiment, the metal-based dust and/or the Ni—Zn based ferrite which is comparatively high in magnetic flux density is selected as the material of the core in the choke coil $L_O$, whereby the inductance value of the choke coil $L_O$ can be stabilized against variations in current level.

This makes it possible to obviate the situation in which an abnormal oscillating operation might arise from an abrupt variation in the inductance value due to the occurrence of a light load condition, for example. Thus, it is possible to obviate the problem that ripple components would be generated in the secondary-side DC output voltage $E_O$ at the times of a light load as has been experienced in the case of the circuit of FIG. 12.

Further, in this case, the inductors Ld1, Ld2 composed of bead cores, the Shottky diodes Dg1, Dg2 and the π type filter can be omitted as above-mentioned, and, accordingly, the circuit configuration can be simplified as compared with the case of the circuit of FIG. 12.

Now, a configuration example of a switching power circuit as a sixth embodiment of the present invention will be described below, referring to FIGS. 19 to 22.

The switching power circuit according to the sixth embodiment is characterized in that only the configuration of the choke coil $L_O$ has been changed, in the connection form of the circuit of FIG. 15 described above.

Therefore, only the configuration of the choke coil $L_O$ to be used in the switching power circuit of the sixth embodiment will be principally described hereinafter; the overall configuration of the switching power circuit is equivalent to that in FIG. 15, so that description thereof is omitted here.

Figure 19:
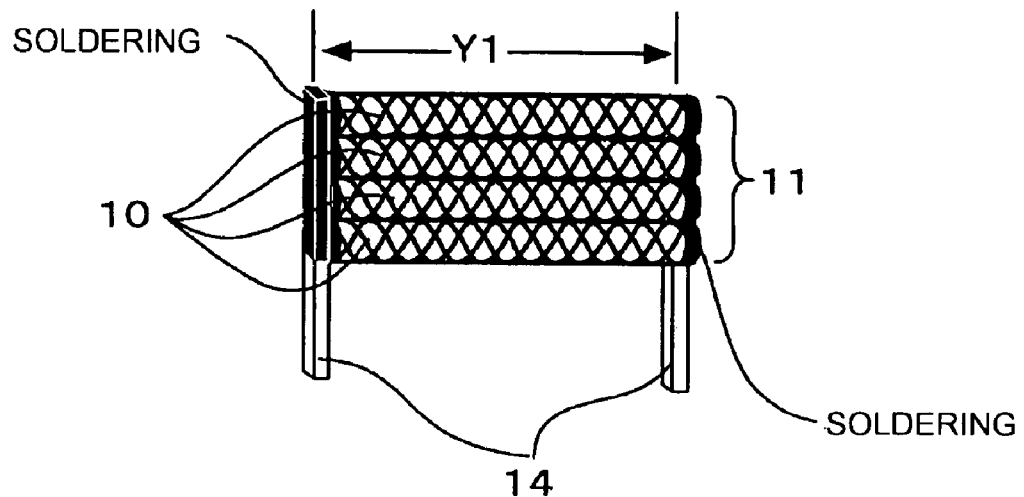
FIG. 19 is an illustration of the configuration of a choke coil which is provided on the secondary side of a switching power circuit according to a sixth embodiment of the present invention.
Figure 20:
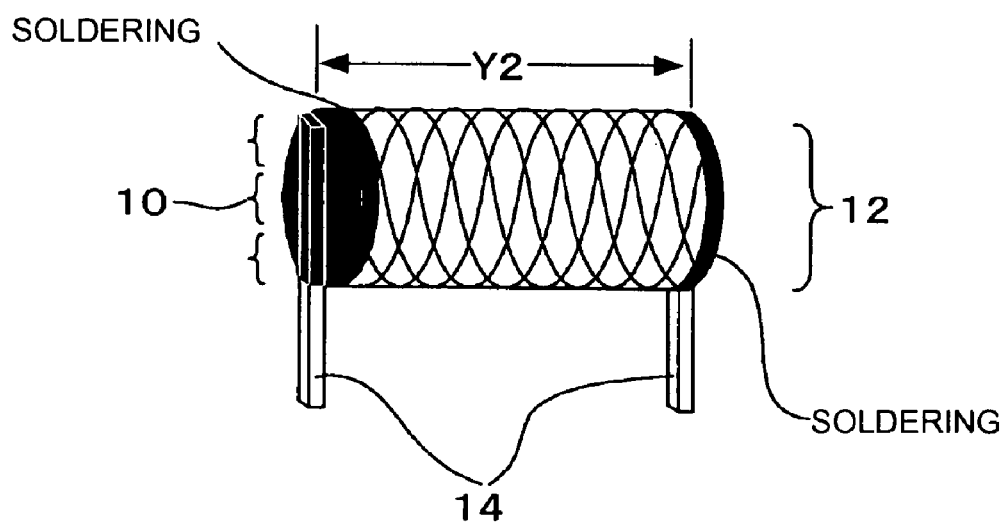
FIG. 20 is also an illustration of the configuration of a choke coil which is provided on the secondary side of the switching power circuit according to the sixth embodiment.

First, the choke coil $L_O$ in this case has a winding $N_O$ configured, for example, as shown in FIG. 19 or 20.

In the sixth embodiment, as a wire material for the winding $N_O$ of the choke coil $L_O$, there is used a litz wire 10 obtained by stranding a plurality of copper strands or the like having been subjected to an insulation coating treatment, for example, polyurethane coating.

First, in the case of FIG. 19, a plurality of the litz wires 10 are aligned in parallel to form a litz wire band 11, as shown in the figure. Then, lead wires 14, 14 are soldered respectively to both end portions of the litz wire band 11, as shown in the figure, to form the winding $N_O$.

Incidentally, the litz wire band 11 in this case is obtained by aligning four litz wires 10, as shown in the figure. In this case, the litz wire 10 is obtained by stranding 200 strands with a strand diameter of 0.1 mϕ, and the length Y1 thereof is set at, for example, 12 mm in accordance with the bobbin size in this case.

In addition, as the lead wire 14 in this case, a rectangular wire is used, as is shown in the figure. The soldering of the lead wire 14 composed of the rectangular wire to the litz wire band 11 may be conducted, for example, by a method in which the copper wire portions of the strands in the litz wire 10 are exposed, and then the copper wire portions are wound around the lead wire 14, followed by soldering. Alternatively, pretinning may be applied to both end portions of the litz wire band 11, whereby the labor for exposing the copper wire portions from the strands can be omitted, and the labor for winding the copper wire portions around the lead wire 14 can also be omitted.

On the other hand, in the example shown in FIG. 20, a plain weave wire 12 including a plurality of litz wires 10 woven alternately is formed. In this case also, the lead wires 14, 14 are soldered respectively to both end portions of the plain weave wire 12, as shown in the figure.

Here, the plain weave wire 12 is obtained by plain weaving of three litz wires 10, and the length Y2 of the plain weave wire 12 shown in the figure is set at 14 mm.

Incidentally, as the litz wire 10 in this case, a litz wire with a specification of 200 strands with a strand diameter of 0.1φ is used. Besides, in this case also, a rectangular wire is used as the lead wire 14.

Figure 21:
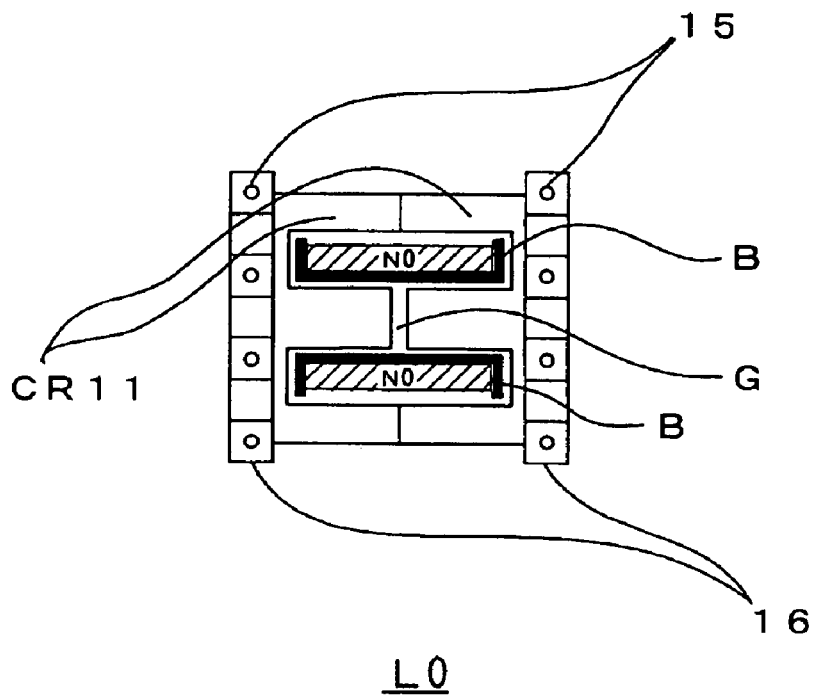
FIG. 21 is a sectional view of the choke coil provided on the secondary side of the switching power circuit according to the sixth embodiment.

In the sixth embodiment, as the core in the choke coil $L_O$, an EE type core as shown in FIG. 21 is used.

As indicated in the sectional view in FIG. 21, as the core of the choke coil $L_O$ in this case, there is used an EE type core CR11 as shown, in which the respective magnetic legs of ferrite materials having an E sectional shape are opposed to each other.

Besides, a gap G as shown in the figure is formed at the center magnetic legs of the EE type core CR11.

As the material of the EE type core CR11 in this case, a Mn—Zn based ferrite material is selected.

As for the size of the EE type core CR11 in this case, for example, EE-25 is selected.

For the EE type core CR11, a bobbin B formed of a resin or the like is provided in such a manner as to cover the center magnetic legs. In addition, pin terminal support portions 16, 16 for supporting a plurality of pin terminals 15 projecting in the direction of the wiring board mounting surface are provided at both ends of the outside surface of the EE type core CR11.

Then, the winding $N_O$ composed of the litz wire band 11 shown in FIG. 19 or the winding $N_O$ composed of the plain weave wire 12 shown in FIG. 20 is wound, in a predetermined number of turns, around the bobbin B which is covering the center magnetic legs of the EE type core CR11 as above-mentioned.

Though not shown, the lead wires 14, 14 soldered to both ends of the litz wire band 11 or plain wave wire 12 thus wound around the bobbin B are soldered respectively to the corresponding pin terminals 15.

In this manner, the choke coil $L_O$ as the sixth embodiment is formed.

Incidentally, the number of turns of the winding $N_O$ in this case is 2 T, both in the case of the litz wire band 11 and in the case of the plain weave wire 12. Besides, the above-mentioned gap G is formed to be G=1.4 mm. This results in that, in the case of the sixth embodiment also, the inductance of the choke coil $L_O$ is set at about 0.7 μH.

According to the choke coil $L_O$ as the sixth embodiment configured as above, the plurality of the litz wires 10 are wound in an aligned or plain-woven state to form the winding $N_O$ as above-mentioned, whereby the reactive power in the choke coil $L_O$ can be reduced.

Specifically, in the case of the litz wire band 11 formed by aligning the plurality of litz wires 10 as shown in FIG. 19, the number of turns required is smaller, as compared with the case of forming the winding by winding a single rectangular wire 5a as, for example, in the case of the choke coil $L_O$ (see FIG. 16) in the fifth embodiment. In practice, as contrasted to the number of turns of 4 T in the choke coil $L_O$ in the case of FIG. 16, the required number of turns in this case is 2 T, and, accordingly, the length of wire material (litz wire 10) required for forming the winding $N_O$ can be reduced. The reduction in the length of each litz wire 10 makes it possible to reduce the DCR of the winding $N_O$, and to reduce the reactive power generated in the choke coil $L_O$.

In the case of using the plain weave wire 12 for forming the winding $N_O$, also, the length thereof can be reduced as compared with the case of winding a single wire material, whereby the reactive power in the choke coil $L_O$ can be reduced. Besides, in this case, the alternate weaving of the litz wires 10 reduces the eddy current loss which would be generated in the winding $N_O$ due to the flow of a high-frequency rectified current. This also promises a reduction in the reactive power generated in the choke coil $L_O$.

Further, in this case, the Mn—Zn based ferrite material with a comparatively low loss is used as the core of the choke coil $L_O$, whereby the iron loss of the core in the choke coil $L_O$ is reduced; this also promises a reduction in the reactive power.

In addition, as has been described above, the lead wires 14 composed of the rectangular wires are used for attaching the end portions of the litz wire band 11 or plain weave wire 12 to the pin terminals 15, whereby the sectional area of wire material is increased, and, accordingly, the loss can be reduced as compared with the case of using, for example, the ordinary lead wires having a circular sectional shape.

Figure 22:
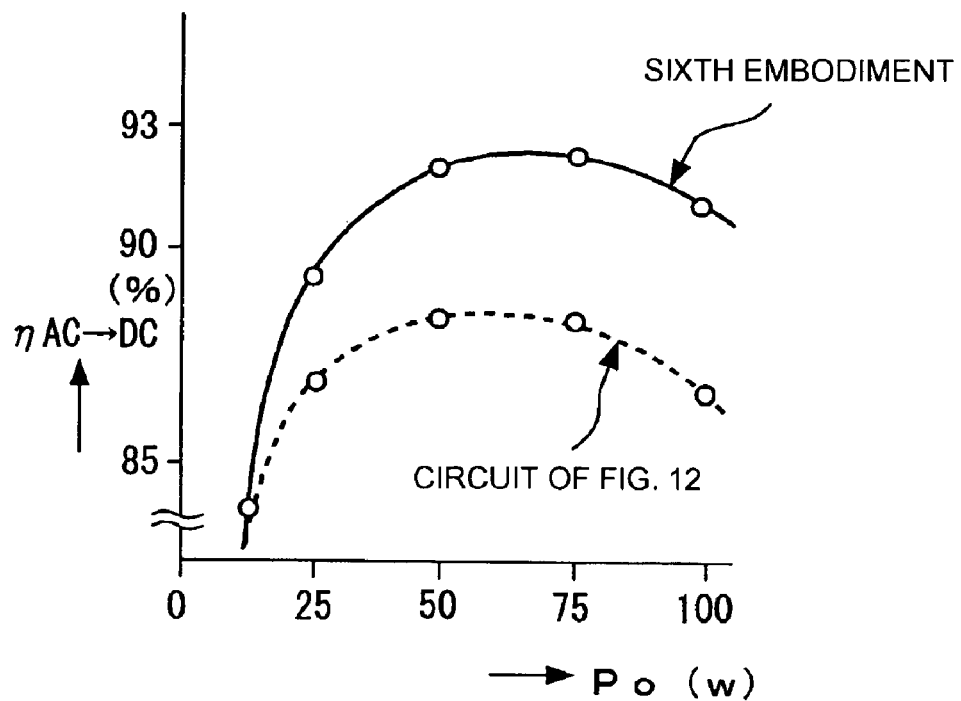
FIG. 22 is a diagram for illustrating the power conversion characteristic, against variations in load, of the switching power circuit as the sixth embodiment.

FIG. 22 shows the characteristics of AC→DC power conversion efficiency (ηAC→DC) against variation in load power, in the switching power circuit according to the sixth embodiment. In this figure, also, the characteristic of the power circuit as the sixth embodiment is indicated by solid line, while the characteristic of the circuit of FIG. 12 is indicated by broken line.

It is seen from the figure that, with the switching power circuit of the sixth embodiment, a higher power conversion efficiency is obtained, as compared with the circuit with the basic configuration of the embodiment shown in FIG. 12, over the load power range of $P_O$=25 to 100 W.

Experiments have shown that a power conversion efficiency of ηAC→DC=91.5% is obtained under the conditions of an AC input voltage VAC=100 V and a load power $P_O$=100 W. This means an improvement by 5.0%, relative to the circuit with the basic configuration of the embodiment shown in FIG. 12.

Also, the experimental result means an improvement by 3.0%, as compared with the power conversion efficiency (ηAC→DC=88.5%) of the circuit according to the fifth embodiment shown in FIG. 15.

The reason why the circuit of the sixth embodiment thus shows an improvement in power conversion efficiency as compared with the circuit of the fifth embodiment lies in that the litz wire band 11 or plain weave wire 12 composed of the plurality of litz wires 10 is used for the winding $N_O$ of the choke coil $L_O$ as above-mentioned, whereby the DCR of the choke coil $L_O$ is reduced as compared with the case of the circuit of FIG. 15.

Experimental results have shown that the DCR of the choke coil $L_O$ according to the sixth embodiment is not more than 0.5 mΩ, indicating a considerable lowering as compared with the DCR=1.1 mΩ of the choke coil $L_O$ according to the fifth embodiment.

Incidentally, it should be noted for confirmation that the power circuit in the sixth embodiment has a circuit configuration equivalent to that of the circuit of FIG. 15 and, therefore, the same effects as in the case of the fifth embodiment can be obtained in this case.

For example, in this case also, the reverse-direction currents in the rectified currents can be suppressed by the back electromotive force of the choke coil $L_O$. Besides, in this case also, the Shottky diodes Dg1, Dg2 which have been connected to the MOS-FETs Q3, Q4 are eliminated and, therefore, it is possible to suppress the high-frequency switching noises which would be superposed on the secondary-side DC output voltage $E_O$.

Further, in this case also, the choke coil $L_O$ is inserted so as to be connected to the center taps of the secondary windings and, therefore, the number of turns of the secondary winding required for achieving the continuous mode can be reduced, thereby promising a reduction in reactive power.

Besides, in the sixth embodiment, the EE type core CR11 formed from the Mn—Zn based ferrite material is selected as the core member in the choke coil $L_O$, and, with the Mn—Zn ferrite material, it is possible to obtain a comparatively high saturated magnetic flux density. This results in that, in the sixth embodiment also, the inductance value of the choke coil $L_O$ can be stabilized against variations in current level.

In short, this makes it possible to prevent the generation of the ripple components which would otherwise be generated in the secondary-side DC output voltage $E_O$ upon the occurrence of a light load condition at or below a predetermined level (for example, at or below a load power $P_O=12.5$ W).

Furthermore, in the sixth embodiment, the core obtained by combining two EE type cores CR11 as E type cores is used as the core of the choke coil $L_O$, so that the inductance of the choke coil $L_O$ can be set by regulating the gap length formed at the center magnetic legs of the EE type cores CR11.

Namely, in this case, dispersion of the inductance value of the choke coil $L_O$ can be suppressed by a comparatively easy adjustment work of controlling the gap length.

Incidentally, the dispersion of the inductance value at the time of mass production of the choke coil $L_O$ in this example using the EE type cores CR11 can be suppressed, for example, to within ±5%, by controlling the above-exemplified gap G=1.4 mm.

In the next place, FIGS. 23 to 26 show modified examples of the choke coil $L_O$ according to the sixth embodiment.

In the modified examples of the sixth embodiment, also, the litz wire band 11 shown in FIG. 19 or the plain weave wire 12 shown in FIG. 20 is used for forming the winding $N_O$ of the choke coil $L_O$.

Figure 23:
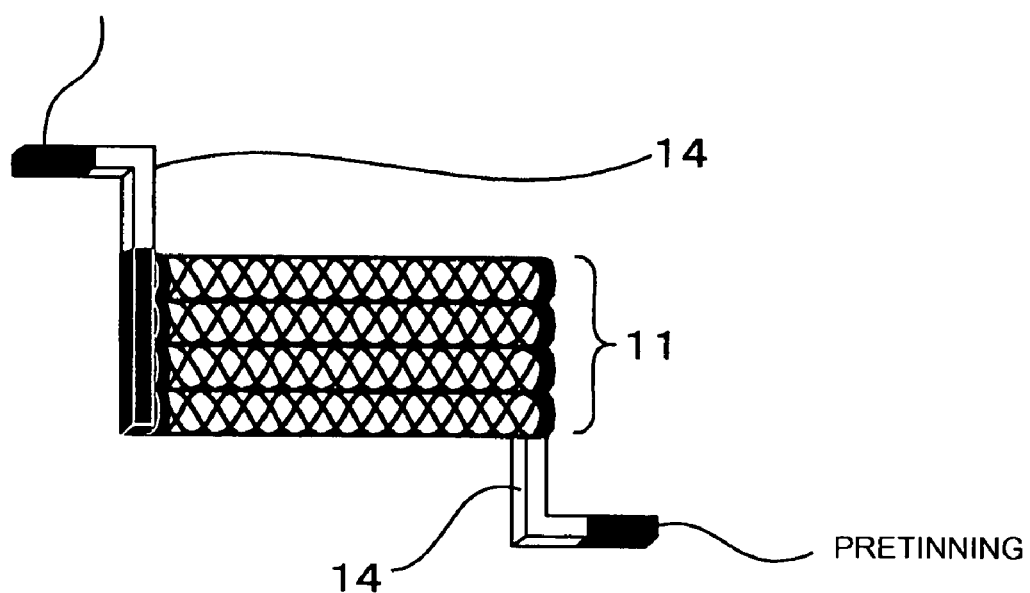
FIG. 23 is an illustration of a modified example of the configuration of the choke coil provided on the secondary side of the switching power circuit according to the sixth embodiment.

Besides, in this case, lead wires 14 (rectangular wires) each bent into an L shape are soldered respectively to both ends of the litz wire band 11, as shown in FIG. 23.

Figure 24:
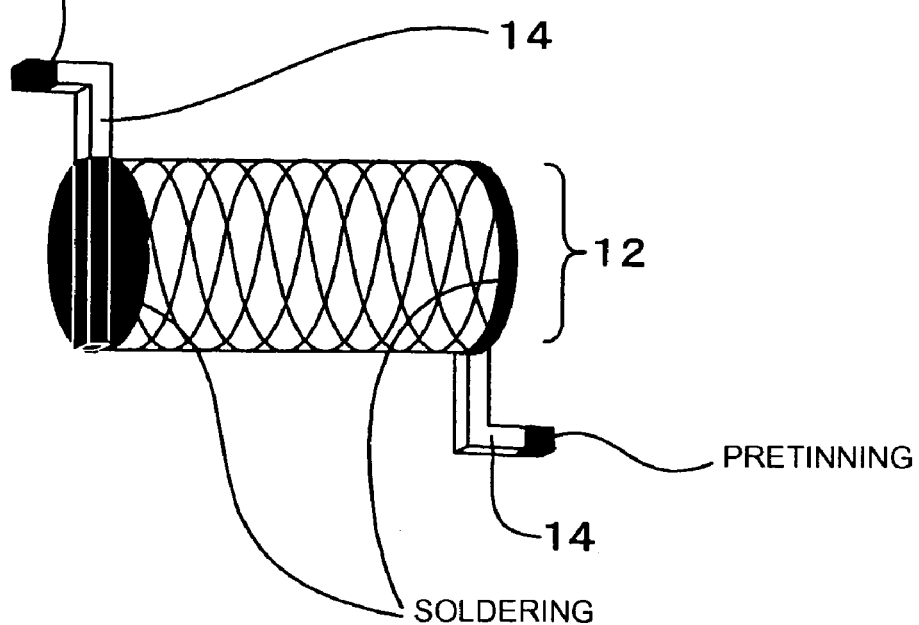
FIG. 24 is also an illustration of a modified example of the configuration of the choke coil provided on the secondary side of the switching power circuit according to the sixth embodiment.

Similarly, in the case of using the plain weave wire 12 also, the lead wires 14 each composed of the rectangular wire bent into an L shape are soldered respectively to both ends of the plain weave wire 12, as shown in FIG. 24.

In addition, pretinning is applied to the tip ends of the lead wires 14, as shown in the figures.

Incidentally, the (wire diameter)/(number of strands), the number, and the length of the litz wires 10 in this case may be equivalent to those in the cases of FIGS. 19 and 20.

Figure 25:
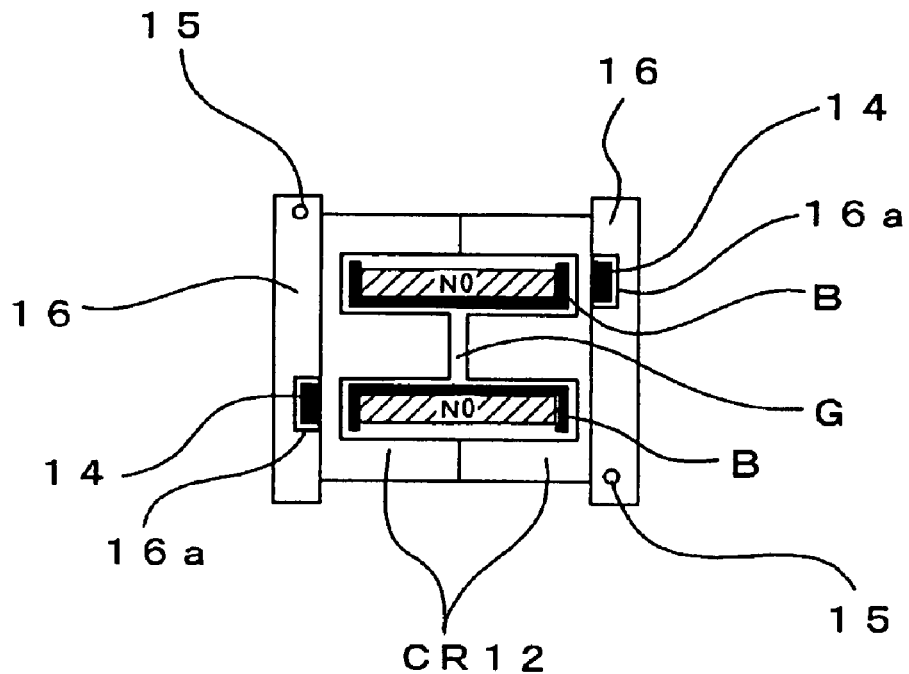
FIG. 25 is a sectional view showing the structure of a choke coil as a modified example, which is provided on the secondary side of the switching power circuit according to the sixth embodiment.

In addition, as the core of the choke coil $L_O$ in this case, a core having an EE sectional shape is used, as shown in the sectional view in FIG. 25.

As the core of the choke coil $L_O$ here, an ER type core CR12 which has the EE sectional shape and in which the center magnetic leg is cylindrical in shape is used.

Besides, in this case also, a gap G is formed at the center magnetic legs of the ER type cores CR12. Further, as the material of the ER type core CR12, a Mn—Zn based ferrite material is selected, in the same manner as for the EE type core CR11 of FIG. 12.

In addition, in the modified example of the sixth embodiment, pin terminal support portions 16, 16 provided at both ends of the outside surface of the ER type cores CR12 are preliminarily provided with groove portions 16a respectively at predetermined positions.

Then, a tip end portion of the lead wire 14 attached to the winding start side end portion of the winding $N_O$ shown in FIG. 25 or 24 is first inserted in the groove portion 16a formed in the pin terminal support portion 16 on one side, and the winding $N_O$ is wound around a bobbin B shown in the figure.

Further, a tip end portion of the lead wire 14 attached to the winding finish side end portion of the winding $N_O$ thus wound is inserted in the groove portion 16a formed in the pin terminal support portion 16 on the other side, to form the choke coil $L_O$.

According to the choke coil $L_O$ as this modified example, also, the winding $N_O$ is obtained by winding the litz wire band 11 or plain weave wire 12 composed of a plurality of litz wires 10, so that the length of wire material can be reduced as compared with the case of the single rectangular wire 5a shown in FIG. 16, and, accordingly, the reactive power in the choke coil $L_O$ can be reduced.

In short, the configuration of this modified example also can give the same effects as in the sixth embodiment.

Furthermore, in this case, the pretinning is applied to the tip end portions of the lead wires 14, 14 attached to both ends of the litz wire band 11 or plain weave wire 12 as above-mentioned, before inserting the tip end portions into the groove portions 16a. This ensures that the pretinned end portions can be attached directly to the wiring board, leading to the merit that it is unnecessary to solder the lead wires 14 to the pin terminals 15 of the choke coil $L_O$.

Figure 26:
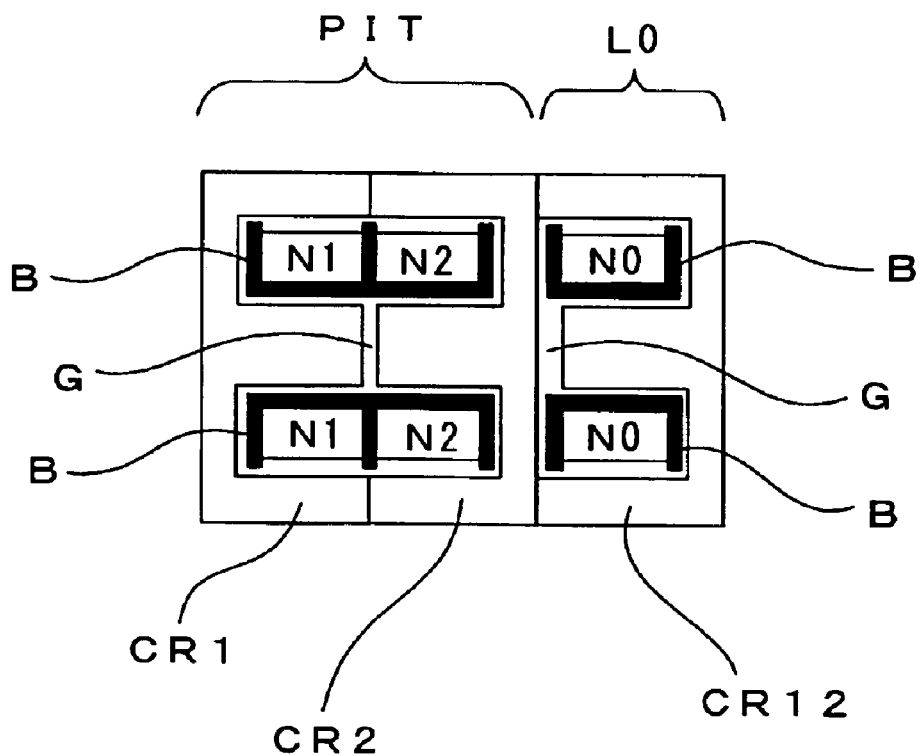
FIG. 26 is a sectional view showing the structure of a choke coil as another modified example, which is provided on the secondary side of the switching power circuit according to the sixth embodiment.

Further, the sectional view in FIG. 26 shows the configuration of another modified example of the choke coil $L_O$ according to the sixth embodiment.

In the another example of the sixth embodiment, as shown in FIG. 26, the core of the choke coil $L_O$ is disposed adjacent to the core located on the secondary side in the insulated converter transformer PIT.

Specifically, the ER type core CR12 of the choke coil $L_O$ is so disposed that the magnetic legs thereof are opposed to an outside surface of the E type core CR2 located on the secondary side in the insulated converter transformer PIT. In this case, a gap G is formed between the outside surface of the E type core CR2 and the center magnetic leg of the ER type core CR12.

Incidentally, the ER type core CR11 may be, for example, of the ER-40 type, the size of which is equal to the size of the E type cores CR1, CR2 of the insulator converter transformer PIT in this case.

According to the another modified example of the sixth embodiment, the same effects as those of the circuit in the sixth embodiment can be obtained, in the case where the winding $N_O$ formed from the litz wire band 11 or plain weave wire 12 is wound by 1 T around the bobbin B provided on the center magnetic leg of the ER type core and where the gap G formed as above-mentioned is set to be G=1 mm.

Incidentally, the present invention is not limited to the power circuit configurations described above.

For example, detailed configurations of the synchronous rectification circuit based on the winding voltage detection system based on the present invention may be modified appropriately. In addition, for example, as the switching device in the primary-side switching converter, other devices than MOS-FET, for example, IGBT (Insulated Gate Bipolar Transistor), may be adopted inasmuch the device can be used in the separately excited system. Besides, the constants of the above-mentioned component devices and the like may be modified according to the actual conditions and the like.

In addition, in the present invention, the switching power circuit may be configured by providing a self-excited current resonance type converter. In this case, for example, a bipolar transistor can be selected as the switching device. Furthermore, a current resonance type converter in which four switching devices are coupled by full-bridge coupling may also be applicable.

Besides, as the rectifying circuit for obtaining a DC input voltage while being supplied with a commercial AC power, other configurations than the double voltage rectification circuit may be contemplated, for example.

The invention claimed is:

1. A switching power circuit comprising:
a switching unit provided with a plurality of switching devices and performing switching by turning ON and OFF a DC input voltage inputted thereto;
a primary-side drive unit for performing switching driving so that said plurality of switching devices are alternately turned ON and OFF;
an insulated converter transformer for transmitting a switching output fed from said switching unit from the primary side to the secondary side thereof, said insulated converter transformer including a primary winding, and a secondary winding having a center-tapped tap output, with a gap length set to be not less than a predetermined value to thereby set the coupling coefficient of said primary winding and said secondary winding to be not more than a predetermined value;
a primary-side resonance capacitor for forming a primary-side resonance circuit for causing the operation of said switching unit to be of a resonance type, at least by the leakage inductance component of said primary winding of said insulated converter transformer and the capacitance thereof; and
a synchronous rectification circuit having a secondary-side smoothing capacitor connected to the tap output of said secondary winding for obtaining a secondary-side DC output voltage as an end-to-end voltage of said secondary-side smoothing capacitor by performing full-wave rectification of an alternating voltage induced in said secondary winding of said insulated converter transformer and charging said secondary-side smoothing capacitor with the rectified current, wherein
numbers of turns of said primary winding and said secondary winding are so set that a secondary-side rectified current caused to flow in said synchronous rectification circuit by said full-wave rectification is in a continuous mode, irrespective of variations in the conditions of a load connected to said secondary-side DC output voltage, and wherein
said synchronous rectification circuit comprises:
a first field effect transistor connected in series to a point between one of end portions divided by the tap output of said secondary winding and a secondary-side reference potential;
a second field effect transistor connected in series to a point between the other of said end portions divided by the tap output of said secondary winding and said secondary-side reference potential;
a first drive circuit for outputting a gate voltage for turning ON said first field effect transistor by detecting, through a resistance device, a secondary winding voltage corresponding to the period of a half wave in which said first field effect transistor should flow a rectified current;
a second drive circuit for outputting a gate voltage for turning ON said second field effect transistor by detecting, through a resistance device, a secondary winding voltage corresponding to the period of a half wave in which said second field effect transistor should flow a rectified current; and
a first inductor device having a predetermined inductance inserted in series respectively between said one of said end portions divided by the tap output of said secondary winding and said first field effect transistor and between said other of said end portions divided by the tap output of said secondary winding and said secondary field effect transistor.

2. The switching power circuit as set forth in claim 1, further comprising a second inductor device inserted in series between the tap output of said secondary winding and said smoothing capacitor.

3. The switching power circuit as set forth in claim 1, wherein said first inductor device is comprised of a tubular magnetic body through which passes a lead wire for a drain electrode of said first or second field effect transistor.

4. The switching power circuit as set forth in claim 1, wherein said first inductor device is formed by making a spiral wiring pattern on a printed wiring board.

5. A switching power circuit comprising:
a switching unit provided with a plurality of switching devices and performing switching by turning ON and OFF a DC input voltage inputted thereto;
a primary-side drive unit for performing switching driving so that said plurality of switching devices are alternately turned ON and OFF;
an insulated converter transformer for transmitting a switching output fed from said switching unit from the primary side to the secondary side, said insulated converter transformer including a primary winding and a secondary winding having a center-tapped tap output, with a gap length set to be not less than a predetermined value to thereby set the coupling coefficient of said primary winding and said secondary winding to be not more than a predetermined value;
a primary-side resonance capacitor for forming a primary-side resonance circuit for causing operation of said switching unit to be of a resonance type, at least by a leakage inductance component of said primary winding of said insulated converter transformer and a capacitance thereof; and
a synchronous rectification circuit having a secondary-side smoothing capacitor connected to the tap output of said secondary winding for obtaining a secondary-side DC output voltage as an end-to-end voltage of said secondary-side smoothing capacitor by performing full-wave rectification of an alternating voltage induced in said secondary winding of said insulated converter transformer to produce a rectified current and charging said secondary-side smoothing capacitor with the rectified current wherein
numbers of turns of said primary winding and said secondary winding are so set that a secondary-side rectified current caused to flow in said synchronous rectification circuit by said full-wave rectification is in a continuous mode, irrespective of variations in conditions of a load connected to said secondary-side DC output voltage, and wherein
said synchronous rectification circuit comprises:
a first field effect transistor connected in series to a point between one of end portions divided by the tap output of said secondary winding and a secondary-side reference potential;
a second field effect transistor connected in series to a point between the other of said end portions divided by the tap output of said secondary winding and said secondary-side reference potential;

a first drive circuit for outputting a gate voltage for turning ON said first field effect transistor by detecting, through a resistance device, a secondary winding voltage corresponding to the period of a half wave in which said first field effect transistor should flow a rectified current;

a second drive circuit for outputting a gate voltage for turning ON said second field effect transistor by detecting, through a resistance device, a secondary winding voltage corresponding to the period of a half wave in which said second field effect transistor should flow a rectified current; and an inductor device having a predetermined inductance inserted in series between the tap output of said secondary winding unit and said smoothing capacitor.

6. The switching power circuit as set forth in claim 5, further comprising a constant-voltage control unit for performing a constant-voltage control of said secondary-side DC output voltage by a variable control of a switching frequency of said switching unit according to a level of said secondary-side DC output voltage.

7. The switching power circuit as set forth in claim 1 or claim 5, further comprising a primary-side partial voltage resonance circuit composed of a capacitance of a partial resonance capacitor connected in parallel to at least one switching device of said plurality of switching devices constituting said switching unit, and a leakage inductance component of said primary winding of said insulated converter transformer, said primary-side partial voltage resonance circuit performing a partial voltage resonance operation in a period for at least which said one switching device is turned OFF.

8. The switching power circuit as set forth in claim 5, wherein said inductor device is a choke coil comprised of a flat plate-like ferrite core having a winding longitudinally wound into a hollow cylindrical form by use of a rectangular wire, and a pot-type metallic dust inserted in said hollow cylindrical winding, and which has a predetermined saturation magnetic flux density and a predetermined inductance.

9. The switching power circuit as set forth in claim 5, wherein said inductor device comprises a choke coil having a predetermined number of turns of a winding on a magnetic leg of an E-shaped core formed of an Mn—Zn based ferrite and which has a predetermined saturation magnetic flux density and a predetermined inductance.

10. The switching power circuit as set forth in claim 9, wherein said winding of said choke coil is formed by winding a litz wire band formed by aligning a plurality of litz wires in parallel to each other into a band form.

11. The switching power circuit as set forth in claim 9, wherein said winding of said choke coil is formed by winding a plain weave wire formed by weaving a plurality of litz wires in plain weave.

* * * * *